US012481616B2

(12) United States Patent
Hausauer et al.

(10) Patent No.: US 12,481,616 B2
(45) Date of Patent: Nov. 25, 2025

(54) RDMA NIC UTILIZING PACKET LEVEL REQUEST AND RESPONSE INTERLEAVING

(71) Applicant: DreamBig Semiconductor, Inc., San Jose, CA (US)

(72) Inventors: Brian Hausauer, Austin, TX (US); David Arditti Ilitzky, Zapopan (MX); Linghe Wang, Austin, TX (US)

(73) Assignee: DreamBig Semiconductor, Inc., San Jose, CA (US)

( * ) Notice: Subject to any disclaimer, the term of this patent is extended or adjusted under 35 U.S.C. 154(b) by 0 days.

(21) Appl. No.: 18/605,520

(22) Filed: Mar. 14, 2024

(65) Prior Publication Data

US 2024/0314203 A1 Sep. 19, 2024

Related U.S. Application Data

(60) Provisional application No. 63/513,873, filed on Jul. 15, 2023, provisional application No. 63/490,660, filed on Mar. 16, 2023.

(51) Int. Cl.
*G06F 15/173* (2006.01)
*G06F 13/28* (2006.01)
(Continued)

(52) U.S. Cl.
CPC ........ *G06F 15/17331* (2013.01); *G06F 13/28* (2013.01); *H04L 67/1097* (2013.01); *H04L 69/161* (2013.01); *H04L 69/22* (2013.01)

(58) Field of Classification Search
None
See application file for complete search history.

(56) References Cited

U.S. PATENT DOCUMENTS 7,107,359 B1 9/2006 Burton et al.
11,765,237 B1 * 9/2023 Liss .......................... H04L 9/14 709/228

(Continued)

FOREIGN PATENT DOCUMENTS

WO 2023016646 A1 2/2023

OTHER PUBLICATIONS

Wang et al., "StaR: Breaking the Scalability Limit for RDMA", Nov. 1, 2021, IEEE, 2021 IEEE 29th International Conference on Network Protocols (ICN P) (2021, pp. 1-11) (Year: 2021).*

(Continued)

*Primary Examiner* — Davoud A Zand
(74) *Attorney, Agent, or Firm* — Keith Lutsch PC

(57) ABSTRACT

A best efforts (BE) hardware remote direct memory access (RDMA) transport being performed by a smart network interface controller (NIC). Elements from RoCEv2 and iWARP are utilized in combination with extensions to improve flexibility and packet error recovery. Flexibility is provided by allowing RDMA roles to be individually specified. Flexibility is also provided by additional packet numbering options to allow interleaving of request and response messages at a packet boundary. Error recovery is improved by utilized new acknowledgement responses, SNAK provided for each new hole detected and RACK for each received packet after a SNAK. SNAK allows the indication of resource exhaustion at the receiver, causing entry into a recovery mode where only packets in a hole are transmitted until resources are recovered.

15 Claims, 64 Drawing Sheets

(51) Int. Cl.
*H04L 67/1097* (2022.01)
*H04L 69/16* (2022.01)
*H04L 69/22* (2022.01)

(56) References Cited

U.S. PATENT DOCUMENTS

| | | | |
|---|---|---|---|
| 12,137,001 B2 | 11/2024 | Debbage et al. | |
| 12,341,687 B2 | 6/2025 | Vegesna et al. | |
| 2016/0248628 A1 | 8/2016 | Pandit et al. | |
| 2020/0236140 A1 | 7/2020 | Srinivasan et al. | |
| 2020/0274832 A1 | 8/2020 | Humphrey et al. | |
| 2022/0404980 A1* | 12/2022 | Brown | G06F 15/17331 |
| 2023/0231811 A1* | 7/2023 | Dalal | G06F 13/1605 710/308 |
| 2023/0344777 A1* | 10/2023 | Brar | H04L 67/1097 |
| 2024/0080379 A1* | 3/2024 | Friedman | G06F 13/28 |
| 2024/0121294 A1* | 4/2024 | Underwood | H04L 67/1004 |

OTHER PUBLICATIONS

Arjun Singhvi, Aditya Akella, Dan Gibson, Thomas F Wenisch, Monica Wong-Chan, Sean Clark, Milo M. K. Martin, Moray McLaren, Prashant Chandra, Rob Cauble, Hassan Mohamed Gamal Wassel, Behnam Montazeri, Simon L Sabato, Joel Scherpelz, Amin M Vahdat, "1RMA: Re-envisioning Remote Memory Access for Multi-tenant Datacenters," SIGCOMM '20: Proceedings of the Annual conference of the ACM Special Interest Group on Data Communication on the applications, technologies, architectures, and protocols for computer communication; Jul. 2020; pp. 708-721.

InfiniBand Trade Association, "Supplement to InfiniBand Architecture Specification vol. 1 Release 1.2.1, Annex A16: RDMA over Converged Ethernet (RoCE)," Apr. 6, 2010.

InfiniBand Trade Association, "Supplement to InfiniBand Architecture Specification vol. 1 Release 1.2.1, Annex A17: RoCEv2," Sep. 2, 2014.

InfiniBand Trade Association, "InfiniBand Architecture Specification vol. 1 Release 1.2.1," Nov. 2007.

Radhika Mittal, Alexander Shpiner, Aurojit Panda, Eitan Zahavi, Arvind Krishnamurthy, Sylvia Ratnasamy, Scott Shenker; "Revisiting Network Support for RDMA;" Association for Computing Machinery, SIGCOMM '18: Proceedings of the 2018 Conference of the ACM Special Interest Group on Data Communication; Aug. 2018; pp. 313-326.

Radhika Mittal, Alexander Shpiner, Aurojit Panda, Eitan Zahavi, Arvind Krishnamurthy, Sylvia Ratnasamy, Scott Shenker; "Revisiting Network Support for RDMA—Extended Version of SIGCOMM 2018 paper;" Jun. 21, 2018, arxiv.org/pdf/1806.08159.pdf.

M. Mathis, J. Mahdavi, S. Floyd, A. Romanow; "RFC 2018—TCP Selective Acknowledgment Options;" Internet Engineering Task Force; Oct. 1996.

E. Blanton, M. Allman, K. Fall, L. Wang; "RFC 3517—A Conservative Selective Acknowledgment (SACK)-based Loss Recovery Algorithm for TCP;" Internet Engineering Task Force; Apr. 2003.

R. Recio, B. Metzler, P. Culley, J. Hilland, D. Garcia; "RFC 5040—A Remote Direct Memory Access Protocol Specification;" Internet Engineering Task Force; Oct. 2007.

H. Shah, J. Pinkerton, R. Recio, P. Culley; "RFC 5041—Direct Data Placement over Reliable Transports;" Internet Engineering Task Force; Oct. 2007.

J. Pinkerton, E. Deleganes; "RFC 5042—Direct Data Placement Protocol (DDP) / Remote Direct Memory Access Protocol (RDMAP) Security;" Internet Engineering Task Force; Oct. 2007.

C. Bestler, R. Stewart; "RFC 5043—Stream Control Transmission Protocol (SCTP) Direct Data Placement (DDP) Adaptation;" Internet Engineering Task Force; Oct. 2007.

P. Culley, U. Elzur, R. Recio, S. Bailey, J. Carrier; "RFC 5044—Marker PDU Aligned Framing for TCP Specification;" Internet Engineering Task Force; Oct. 2007.

C. Bestler, L. Coene; "RFC 5045—Applicability of Remote Direct Memory Access Protocol (RDMA) and Direct Data Placement Protocol (DDP);" Internet Engineering Task Force; Oct. 2007.

A. Kanevsky, C. Bestler, R. Sharp, S. Wise; "RFC 6581—Enhanced Remote Direct Memory Access (RDMA) Connection Establishment;" Internet Engineering Task Force; Apr. 2012.

M. Allman, V. Paxson, E. Blanton; "RFC 5681—TCP Congestion Control;" Internet Engineering Task Force; Sep. 2009.

P. Sarolahti, M. Kojo, K. Yamamoto, M. Hata; "RFC 5682—Forward RTO-Recovery (F-RTO): An Algorithm for Detecting Spurious Retransmission Timeouts with TCP;" Internet Engineering Task Force; Sep. 2009.

V. Paxson, M. Allman, J. Chu, M. Sargent; "RFC 6298—Computing TCP's Retransmission Timer;" Internet Engineering Task Force; Jun. 2011.

M. Ko, D. Black; :RFC 6580—IANA Registries for the Remote Direct Data Placement (RDDP) Protocols; Internet Engineering Task Force; Apr. 2012.

H. Shah, F. Marti, W. Noureddine, A. Eiriksson, R. Sharp; "RFC 7306—Remote Direct Memory Access (RDMA) Protocol Extensions;" Internet Engineering Task Force; Jun. 2014.

Y. Cheng N. Cardwell, N. Dukkipati, P. Jha; "RFC 8985—The RACK-TLP Loss Detection Algorithm for TCP;" Internet Engineering Task Force; Feb. 2021.

J. Iyengar, M. Thomson; "RFC 9000—QUIC: A UDP-Based Multiplexed and Secure Transport;" Internet Engineering Task Force; May 2021.

J. Iyengar, I. Swett; "RFC 9002—QUIC Loss Detection and Congestion Control;" Internet Engineering Task Force; May 2021.

A. Singhvi, A. Akella, D. Gibson, T. F Wenisch, M. Wong-Chan, S. Clark, M. M. K. Martin, M.Mclaren, p. Chandra, R. Cauble, H. Mohamed Gamal Wassel, B. Montazeri, S. L Sabato, J. Scherpelz, A. M Vahdat, "1RMA: Re-envisioning Remote Memory Access for Multi-tenant Datacenters," SIGCOMM '20: Proceedings of the Annual conference of the ACM Special Interest Group on Data Communication on the applications, technologies, architectures, and protocols for computer communication, Jul. 2020, pp. 708-721.

M. Handley, C. Raiciu, A. Agache, A. Voinescu, A. W. Moore, G. Antichi, M. Wójcik, "Re-architecting datacenter networks and stacks for low latency and high performance," Association for Computing Machinery, Proceedings of the Conference of the ACM Special Interest Group on Data Communication (SIGCOMM '17), Aug. 17, 2017, p. 29-42.

* cited by examiner

BE Transport (bidirectional)
Both nodes in the connection are not required to support all roles (Requester, Completer, Responder). The only mandatory role is the Completer. Responder role is only required if the node will accept incoming two-phased requests. Requester role is only required if the node will initiate any requests.

Note: Actions ("entry", "do-first", "do" and "exit" statements) below the dotted line within any superstate represent non-mandatory functionality.

+ enable_tx: Bool [enable transmission of new request/response flow messages]
+ unackd_pid: PID [the oldest unacknowledged pid]
+ inf_pid: PID [a known pid for the start of an infinite-hole]
+ tail_pid: PID [the pid of the tail of a stream]
+ FTO Counter: Counter
+ FTO Timer, RTO Timer: Timer
+ PktStateMachines[N_MAX_PID]: PktSndrState

* is_RTO_running: Bool [indicates the RTO timer is currently running for the connection]
* is_tail_drop: Bool [indicates the connection is in tail drop condition]

Fig. 8B

+ res_max: Integer [maximum number of pid hole tracking resources]
+ res_count: Counter [current available number of pid hole tracking resources]
+ inf_pid: PID [a known pid for the start of an infinite hole]
+ epid: PID [expected pid, the oldest not received pid]
+ next_epid: PID [next expected pid, the second oldest not received pid]
+ max_ooo_rcv_pid: PID [maximum out-of-order received pid]
+ PktStateMachines[N_MAX_PID]: PktRcvrState

* new_point_hole: Bool [a new point-hole created condition]
* new_range_hole: Bool [a new range-hole created condition]
* point_hole_filled: Bool [a point-hole filled condition]
* range_to_point_hole: Bool [a range-hole turned into a point-hole condition]
* range_end_filled: Bool [a range-hole shrink without splitting condition]
* range_split_in_point_holes: Bool [a range-hole split into two point-holes condition]
* range_split_in_range_holes: Bool [a range-hole split into two range-holes condition]
* range_split_in_point_and_range_holes: Bool [a range-hole split into a point-hole and a range-hole condition]
* is_range_split_res_required: Bool = ( range_split_in_range_holes || range_split_in_point_and_range_holes )
* hole_filled: Bool = ( point_hole_filled || range_to_point_hole || range_end_filled || range_split_in_point_holes || range_split_in_range_holes || range_split_in_point_and_range_holes )
* one_res_required: Bool = ( new_point_hole || range_split_in_point_and_range_holes)
* two_res_required: Bool = ( new_range_hole || range_split_in_range_holes )
* is_res_required: Bool = ( one_res_required || two_res_required )
* res_required: Integer = ( two_res_required ? 2 : (one_res_required ? 1 : 0) )
* res_allocated: Integer = ( ( res_count == 0 ) ? 0 : ( (res_count == 1 && is_res_required) ? 1 : ( (res_count > 1 && is_res_required) ? res_required : 0) ) )
* res_depleted: Bool = ( res_count == 0 && (new_point_hole || new_range_hole) ) || ( res_count == 1 && new_range_hole )
* adjust_inf_pid: Bool = ( res_count == 0 && (range_split_in_range_holes || range_split_in_point_and_range_holes) ) || ( res_count == 1 && range_split_in_range_holes )

Fig. 9B

Fig. 9A
BE Receiver - Connection State Machine
ConnSuperState: ACTIVE
entry: res_count = res_max
do-first: RX(pid ≥ epid) → update(PktStateMachines[p ≥ epid], RX)
do: RX(pid < epid) → ACK(epid-1)
do: RX(pid == epid) → { set(epid, next_epid) update(next_epid) set(res_count, res_count+(point_hole_filled || range_to_point_hole)) }
do: RX(pid > epid) && new_point_hole → { set(res_count, res_count-1) update(next_epid) update(max_ooo_rcv_pid) }
do: RX(pid > epid) && new_range_hole → { set(res_count, res_count-2) update(max_ooo_rcv_pid) }
do: RX(pid > epid) && (point_hole_filled || range_to_point_hole) → { set(res_count, res_count+1) update(next_epid) }
do: RX(pid > epid) && range_end_filled → update(next_epid)
do: RX(pid > epid) && (is_range_split_res_required) → { set(res_count, res_count - res_required) }
do-first: RX_FLSH(tail_pid≥epid) → update(PktStateMachines[epid ≤ p ≤ tail_pid], RX_FLSH)
do: RX_FLSH(tail_pid < epid) → ACK(epid-1)
res_count == res_max
res_depleted
ConnSuperState: RECOVERY
entry: update(inf_pid)
do-first: RX(pid ≥ epid) → update(PktStateMachines[p ≥ epid], RX)
do: RX(pid < epid) → ACK(epid-1)
do: RX(pid) → SNAK(inf_pid; inf_hole)
do: RX(pid) && res_depleted && (res_count == 1) → set(res_count, res_count-1)
do: RX(pid) && adjust_inf_pid → { update(inf_pid) update(max_ooo_rcv_pid) update(PktStateMachines[p ≥ inf_pid],RX)}
do: RX(pid == epid) → { set(epid, next_epid) update(next_epid) set(res_count, res_count + (point_hole_filled || range_to_point_hole)) }
do: RX(pid ≠ epid) && (point_hole_filled || range_to_point_hole) → { update(next_epid) set(res_count, res_count+1) }
do: RX(pid ≠ epid) && (range_end_filled || range_split_in_point_holes) → update(next_epid)
do: RX(pid ≠ epid) && !adjust_inf_pid && is_range_split_res_required → { set(res_count, res_count - res_required) }
exit: NAK(inf_pid)
do: RX_FLSH(tail_pid ≥ epid) → update(PktStateMachines[epid ≤ p ≤ tail_pid], RX_FLSH)
do: RX_FLSH(tail_pid < epid) → ACK(epid-1)
exit: ACK(inf_pid-1)

Note: Actions ("entry", "do-first", "do" and "exit" statements) below the dotted line within any superstate represent non-mandatory functionality.

Packet Level Interleaving Case

New Extended Header:

RQPETH (4Bytes)

RQPETH (Received Queue Packet-level-interleaving Extended Transport Header) is mandatory for every Send packet for a multi-packet Send Message. It is optional for a single-packet Send Message. It carries a 24-bit PKTCOUNT field to provide message size in number of packets.

| | |
|---|---|
| Res'd | PKT COUNT[23-0] |

Changes in existing headers:

1. PID becomes {MID, IMPN}, which is 48 bits instead of 24 bits.
    a. MID is a 24-bit Message ID, which is carried in BTH.PSN.
    b. IMPN is a 24-bit Intra Message Packet ID carried in IMETH.IMPN
2. IMETH is required for all Packets for multi-packet Messages.
3. IMETH is optional for Packets for a single-packet Message, e.g., RDMA Read Request. When it is not present, PID is implied to be {MID, 0}.
4. Send Packet for a multi-packet Send Message must carry RQPETH.
5. IMETH is required for all Signaling Packets to correctly indicate the first PID being signalled as {BTH.PSN, IMETH.IMPN}.
6. RAPETH and SNETH grows as PID grows from 24 bits to 48 bits.

Fig. 11D

Legacy Message Level Interleaving

Fig. 12B
Node A (1P Requester, Responder, Req Completer)
Node B (2P Requester, Full Completer)
Send
Send First BTH.Opcode=11100000 (E0), BTH.DestQP=AA, BTH.PSN=0154A7
IMETH.IMPN=0; RQETH.RQMSN=421537; RQPETH.PKTCOUNT=2
Send Last BTH.Opcode 11100010 (E2), BTH.DestQP=AA, BTH.PSN=0154A7
IMETH.IMPN=1; RQETH.RQMSN=421537; RQPETH.PKTCOUNT=2
RDMA Read Req.
RDMA Read Request BTH.Opcode=11101100 (EC), BTH.DestQP=BB, BTH.PSN=5D793F
RETH.DMALength=1000; RSPQETH.RSPQMSN=75873E
RDMA Read Resp.
RDMA Read Response First BTH.Opcode=11101101 (ED), BTH.DestQP=AA, BTH.PSN=0154A8
IMETH.IMPN=0; RSPQETH.RSPQMSN=75873E
Send
Send Only BTH.Opcode=11100100 (E4), BTH.DestQP=AA, BTH.PSN=0154A9
RQETH.RQMSN=421538
RDMA Read Resp.
MsgOffset=1
RDMA Read Response Middle BTH.Opcode=11101110 (EE), BTH.DestQP=AA, BTH.PSN=0154A8
IMETH.IMPN=1; RSPQETH.RSPQMSN=75873E
RDMA Read Response Middle BTH.Opcode=11101110 (EE), BTH.DestQP=AA, BTH.PSN=0154A8
IMETH.IMPN=2; RSPQETH.RSPQMSN=75873E
RDMA Read Response Last BTH.Opcode=11101111 (EF), BTH.DestQP=AA, BTH.PSN=0154A8
IMETH.IMPN=3; RSPQETH.RSPQMSN=75873E

Packet Level Interleaving

Fig. 13A
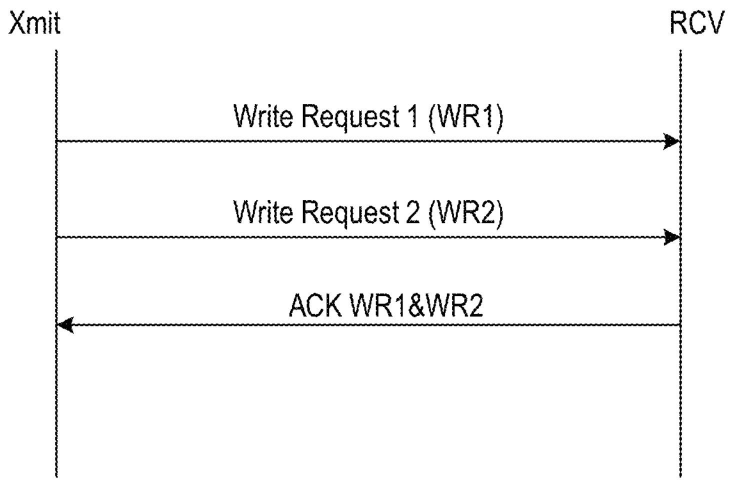
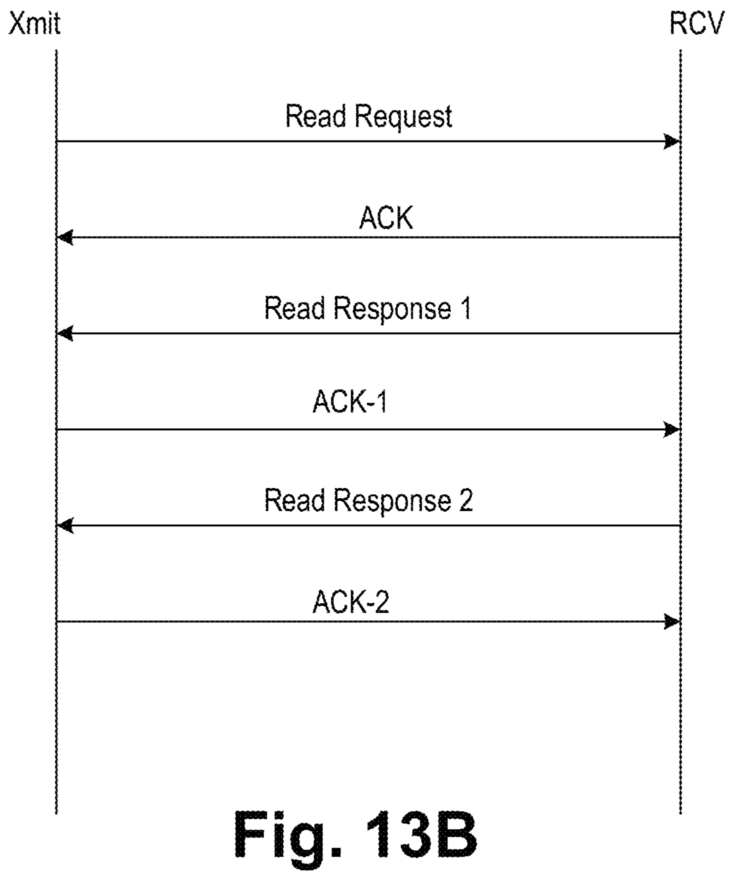
Fig. 13B

RDMA NIC UTILIZING PACKET LEVEL REQUEST AND RESPONSE INTERLEAVING

CROSS-REFERENCE

This application claims priority to U.S. Provisional Application Ser. No. 63/490,660, filed Mar. 16, 2023, and 63/513,873, filed Jul. 15, 2023, the contents of which are incorporated herein in their entirety by reference.

RELATED CASES

This application is related to application Ser. No. 18/605,392, entitled "Merged Hardware RDMA Transport;" application Ser. No. 18/605,440, entitled "RDMA NIC with Selectable RDMA Functions;" application Ser. No. 18/605,469, entitled "Hardware RDMA Transport Including New Hole and Received After a Hole Acknowledgements;" and application Ser. No. 18/605,499, entitled "Hardware RDMA Transport Providing Only Retransmitted Packets After Message Indicating Depletion of Out-of-Order Tracking Resources," all filed concurrently herewith and all hereby incorporated by reference.

TECHNICAL FIELD

This disclosure relates generally to hardware remote direct memory access (RDMA) being performed by a smart network interface controller (NIC).

BACKGROUND

Hardware-based RDMA transport (single-path) goodput suffers from its deployment in best-effort datacenter or cloud networks because of the following reasons:

1. The best-effort network allows for packet loss. These "lost" packets are commonly caused by network congestion. Network congestion in datacenter networks is difficult to control due to the heterogeneity of the transports and workloads deployed on the network and the uncoordinated congestion-control mechanisms deployed for each of them. Some RDMA transports (e.g. RDMA over Converged Ethernet v2 (RoCEv2) Reliable Connection (RC) or Extended Reliable Connection (XRC), hereafter often referred to as just RoCEv2 or ROCE for brevity) were designed for "lossless" L2 networks, and therefore a common mechanism to resolve the best-effort loss problem in Ethernet LANs is the deployment of IEEE802.1Q Priority Flow Control (PFC), which introduces large-scale head-of-line blocking, congestion spreading and may result in deadlocks. Further, Converged Ethernet is extremely difficult to operate in a network having thousands to tens of thousands of servers, as is common in cloud environment. Further, PFC and other link control mechanisms are problematic on links of very high bandwidth, such as 100 Gb.
2. Known transports using the GoBackN reliability protocol (e.g., RoCEv2) force the retransmission of all correctly received packets posterior to a lost packet.
3. Known transports using out-of-order placement (e.g., iWARP's direct data placement (DDP)) and selective acknowledgement reliability protocols (e.g. iWARP over TCP with SACK) have no signaling to notify the sender about the receiver running out of out-of-order tracking resources. Therefore, the unknowing transmitter continues to transmit packets that, even when correctly received by the receiver, must be discarded at the receiving end.
4. Some asymmetric transports (e.g., RoCEv2) provide reliability signaling (ACK/NAK) only for the requester flow (stream of request packets for an associated RC QP), and there is no protocol mandated signaling to protect the responder flow (stream of data-carrying response packets for an associated RC QP). This results in asymmetric goodput for both types of flows (e.g. a responder-only RDMA node receives no transport signaling other than CNP for congestion control).
5. Static/fixed retransmission timeout (RTO) with a maximum number of attempts per packet (e.g., 7 attempts for RoCEv2) which degrades goodput when tail drops occur.

Previous Solutions

1. RoCEv2: Suffers from all goodput loss issues described above (and reliance on PFC).
2. iWARP: TCP/IP based RDMA transport with out-of-order placement and selective acknowledgment. iWARP suffers from a limited reliability protocol (TCP ACK and SACK) and lacks the signaling required to notify depletion of out-of-order tracking resources. Moreover, iWARP's on-chip complexity is increased due to its dependence on TCP.
3. 1RMA (1RMA: Re-envisioning Remote Memory Access for Multi-tenant Datacenters, available at research.google/pubs/pub49377/ or Proceedings of the Annual Conference of the ACM Special Interest Group on Data Communication on the Applications, Technologies, Architectures, and Protocols for Computer Communication, Association for Computing Machinery, (2020), 708-721). 1RMA is not a HW-based transport in its entirety. Reliability, ordering, congestion-control and other transport elements that determine goodput are handled by SW (lower perf, higher power, higher host cycle count consumption). Moreover, the 1RMA transport does not support (at least) the SEND operation nor the Verbs interface (which, at least in the kernel space, required significant time to stabilize in major OSs, Linux/Windows, for other standard RDMA transports). Finally, 1RMA is not a transport with a publicly available specification, to our knowledge it has only been deployed inside Google and only a single publication defines its concept.
4. IRN (Improved ROCE NIC, available at dl.acm.org/doi/10.1145/3230543.3230557 or arxiv.org/pdf/1806.08159.pdf). It is an extension to RoCEv2 RC for best-effort networks with one of its objectives being to "make minimal changes to the ROCE NIC design in order to eliminate its PFC requirement", which solves some (not all) of the goodput optimization gaps with high-cost.

a. IRN proposed ACK/NACK signaling for requester flows (and similarly the receive-ACK/receive-NACK for responder flows), may lead to unnecessary retransmissions because it retransmits all inferred lost packet sequence numbers (PSNs). Because out-of-order received PSNs are signaled only once by a single (receive-)NACK packet, when such a signaling packet is lost, it leads the sender to incorrectly inferring that such a PSN was lost (never received by the receiver). This results in unnecessary retransmissions of previously received packets which degrades goodput.

b. IRN proposed "recovery mode" is triggered by every (receive-)NACK that arrives at the sender, and this mode will stop transmission of new packets while it retransmits every PSN marked as lost (both inferred and true lost PSNs). Therefore, every new incoming (receive-)NACK results in the retransmission of every PSN marked as lost. This can result in the same PSNs being retransmitted multiple times within a round trip time (RTT) due to multiple (receive-) NACKs being received within the RTT (when a flow suffers multiple drops within an RTT, e.g., with tail-drops in switches). These multiple retransmissions are unnecessary and degrade goodput.
c. IRN also extends the transport with basic end-to-end flow-control (i.e., BDP-FC) by assuming a constant bandwidth-delay product (BDP) for all connections and dividing it by the maximum transmission unit (MTU) to get the maximum number of outstanding packets per connection, which is tracked by the sender to flow-control itself. This end-to-end flow-control will not be fine-tuned for each connection or requires characterization of the path per connection in order to fine-tune it. Untuned BDPs may either result in oversubscribed connections or undersubscribed connections, and in the oversubscribed case it may result in increased congestion (i.e. IRN with overestimated BDP will heavily rely on congestion-control to maintain the goodput), while IRN with underestimated BDP will not achieve the maximum exploitable goodput.
d. IRN requires a large state extension per connection on both the sender and receiver sides, which does not resolve the feasibility of scaling challenges as the number of connections scale to public cloud levels.
i. IRN requires bitmaps to track received/acknowledged status for each packet in a BDP flight of packets, which is one of the most state-hungry options to solve the goodput problem.
ii. IRN requires timers on the responder side. Typically, transports use timers on the requester side only, as timers are a costly resource to scale, therefore IRN transport duplicates this scaling cost.
e. Finally, IRN is not a transport with publicly available specification, to our knowledge it has only been described a single publication which defines its concept.

5. QUIC Transport Protocol: QUIC is SW transport protocol over UDP, which lacks RDMA operations as such (transport was not designed for HW implementation, initially implemented as userspace library with kernel implementation as a future option). QUIC defines a Probe Timeout (PTO) feature, as a tail-dropping avoidance feature which in turn would reduce the likelihood of Retransmission Timeouts (RTO), which are usually a major contribution to goodput reduction. PTO triggers sending probe datagrams when ACK-eliciting packets are not acknowledged within the expected period of time. The QUIC PTO algorithm implementation is based on the reliability functions of Tail Loss Probe (TLP), RTO, and F-RTO algorithms for TCP.
6. Current ROCE/IRN and iWARP Verbs have limitations on RNIC's resource allocation granularity. HW resources related to a QP are forced to be allocated during QP creation or QP modification (before the QP is ready to exchange bidirectional traffic). HW resources include SQ, RQ, CQ, RSPQ (Responder Resource for processing inbound RDMA READ/ATOMIC requests), inbound request tracking and inbound response tracking (to support out-of-order data placement).

When a QP is created (via CreateQP Verb), a pair of queues (SQ and RQ) would always be created and be associated with their CQ(s). Note that CQ(s) need to be created prior to QP creation via CreateCQ Verb. On ModifyQP (when changing states as follows: Init→Init, Init→RTR, RTR→RTS, RTS→RTS, SQD→SQD, SQD→RTS), incoming RDMA READs, RDMA WRITEs, and ATOMIC Operations can be independently enabled/disabled.

IB Verbs allow end users to query the attributes for a specified Host Channel Adapter (HCA) via the QueryHCA Verb. Max Responder Resources per QP and Max Responder Resources per HCA are among the attributes that could be queried. On ModifyQP, Responder Resources (number of responder resources for handling incoming RDMA READs & ATOMIC operations) can also be specified. This cannot exceed the maximum value allowable for QPs for this HCA.

The imposed limitations from the standpoint of resources are listed below:

a. An RQ is always created with the CreateQP Verb. If a node on a connection is expected to receive no Send/RDMA WRITE w/IMMEDIATE messages, the RQ will never be used. The CQ entries assigned for the RQ would be wasted as well.
b. A SQ is always created with the CreateQP Verb. If a node on a connection is expected to be a receiver-only (or responder-only) node, the SQ will never be used. The CQ entries assigned for the SQ would be wasted as well.
c. The existing Verbs do not provide an explicit way to not allocate RSPQ when it's not required (i.e. RDMA READ/ATOMIC are not expected to be received by a node on the connection). A smart application could figure out that a QP will not receive any inbound RDMA READ/ATOMIC requests (when its peer advertises Initiator Depth as 0) and commands the Adapter to not allocate RSPQ via ModifyQP Verb by specifying 0 Responder Resources. It is still up to the device whether it will allocate RSPQ or not since it is not a strict requirement from the Verbs.
d. The existing Verbs do not cover out-of-order tracking resources since RoCEv2 is proposed to be used in lossless networks with PFC enabled. Any out-of-order tracking resources implemented by RoCE/IRN or iWARP are therefore not controllable by the user which could result in overallocation even when unnecessary.

The described limitations for each known RDMA transport result in reduced goodput. Improvement in goodput over that provided by the RDMA transports is desirable.

BRIEF DESCRIPTION OF THE DRAWINGS

For illustration, there are shown in the drawings certain examples described in the present disclosure. In the drawings, like numerals indicate like elements throughout. The full scope of the inventions disclosed herein are not limited to the precise arrangements, dimensions, and instruments shown. In the drawings:

FIGS. 8A and 8B illustrate a Sender connection-level state machine according to examples of the present invention.

FIGS. 9A and 9B illustrate a Receiver connection-level state machine according to examples of the present invention.

FIGS. 11D and 11E illustrate packet formats for transaction packets using packet level interleaving according to examples of the present invention.

FIG. 13A is a ladder diagram of RDMA WRITE operations according to examples of the present invention.

FIG. 13B is a ladder diagram of RDMA READ operations according to examples of the present invention.

DETAILED DESCRIPTION OF THE EXAMPLES

A feasible HW-based RDMA transport that resolves the goodput issue (described above) should guarantee at least the same performance as the canonical transport (e.g., RoCEv2 or iWARP) in pathological cases.

A feasible HW-based RDMA transport that resolves the goodput issue (described above) should minimize the added on-chip complexity and resources, by avoiding the use of data-reorder-buffers as well as minimizing connection state (including out-of-order tracking resources) in order to make the transport scalable.

It is desirable for the HW-based RDMA transport definition to be decoupled from (impose no restrictions over) the congestion-control solution, to enable known good congestion-control algorithms to be used with the new transport and even enable future innovation in the congestion-control algorithm domain minimizing the imposed constrains.

It is preferable for the HW-based RDMA transport definition to support all commonly used RDMA operations (SEND, WRITE, READ, ATOMICs, etc.) and also preferable for the HW-based RDMA transport to support the standard Verbs interface.

Figure 1:
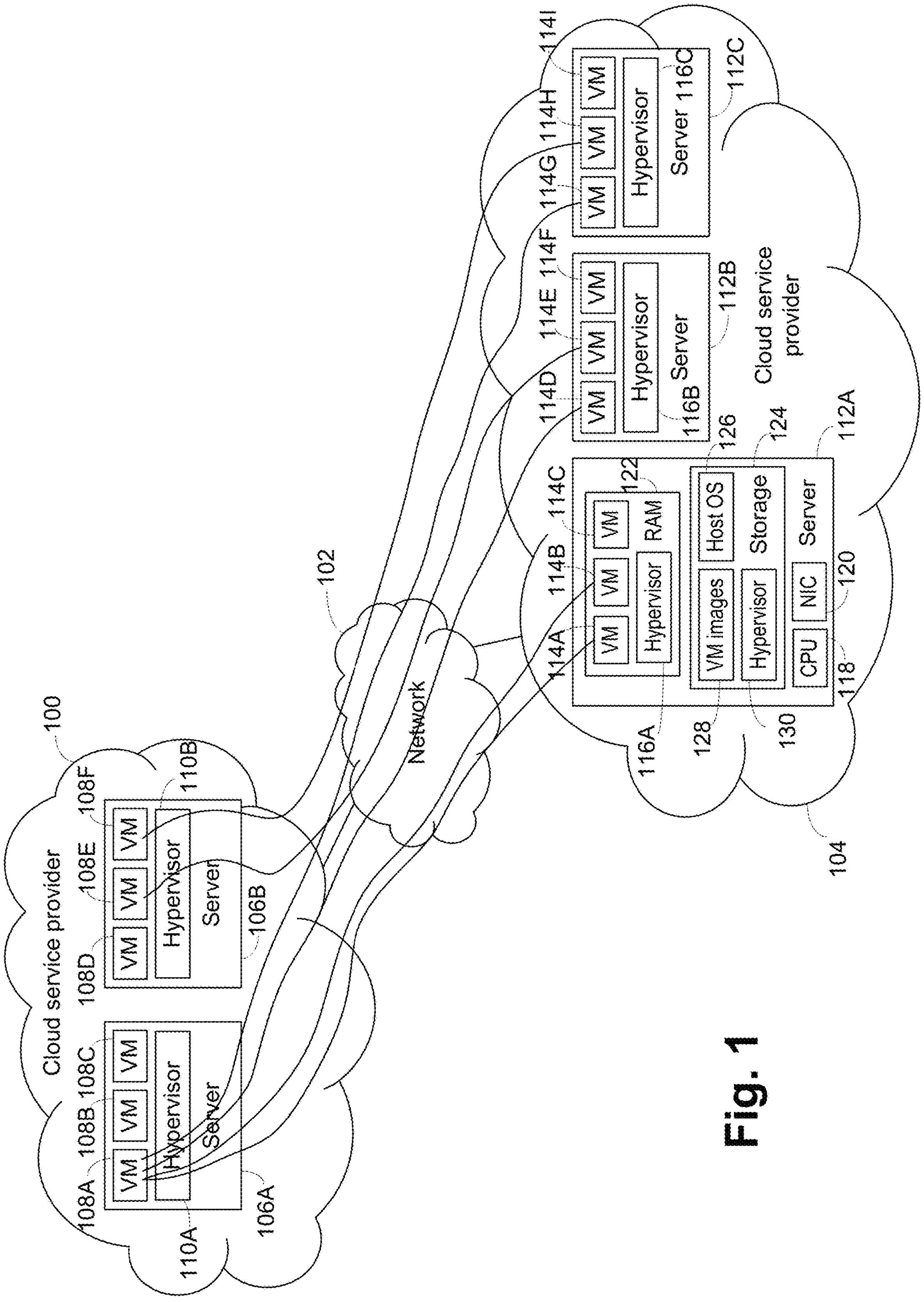
FIG. 1 is a block diagram of a cloud service provider environment where virtual machines at one cloud service provider location connect to various virtual machines in another cloud service provider location.

Referring now to FIG. 1, a cloud service provider environment is illustrated. A first cloud service provider 100 is connected through a lossy Ethernet network 102, such as the Internet or other wide area network (WAN), to a second cloud service provider 104. The first cloud service provider 100 is illustrated as having first and second servers 106A and 106B. Each server 106A, 106B includes three virtual machines (VM) 108, with server 106A including VMs 108A-108C and server 106B including VMs 108D-108F, and a hypervisor 110A, 110B. While VMs are used as the example environments in this description, it is understood that containers or other similar items operate similarly, so that VM is used in this description to represent any of VMs, containers or similar entities. The second cloud service provider 104 is illustrated as having three servers 112A, 112B and 112C. Each server 112A-112C includes three virtual machines 114, with server 112A including VMs 114A-114C, server 112B including VMs 114D-114F and server 112 including VMs 114G-114I; and a hypervisor 116A-116C. More detail is provided of server 112A as exemplary of the servers 106A, 106B, 112B and 112C. The server 112A includes a processing unit 118, a NIC 120, RAM 122 and non-transitory storage 124. The RAM 122 includes the operating virtual machines 114A-114C and the operating hypervisor 116. The non-transitory storage 124 includes stored versions of the host operating system 126, the virtual machine images 128 and the hypervisor 130.

The servers 106A and 106B are connected inside the first cloud service provider 100 by a lossy Ethernet network which allows connectivity to the network 102 and to the second cloud service provider 104. Similarly, the servers 112A, 112B and 112C are connected by a lossy Ethernet network in the second cloud service provider 104 to allow access to the network 102 and the first cloud service provider 100.

FIG. 1 is illustrative of the complex environment of the VMs. A VM 108A in the server 106A is connected to VM 114A and VM 114B in the server 112A, VM 114D in the server 112B and VM 114G in the server 112C. VM 108E in the server 106B is connected to a VM 114E in the server 112B. VM 108F in the server 106B is connected to VM 114H in the server 112C. Thus, VM 108A is connected to four different VMs in three different servers, while servers 112B and 112C each have two VMs connected to two different servers. For purposes of this description, any of the VM-to-VM connections could include RDMA connections. This is a very simple example for explanation purposes. In common environments, there are hundreds of VMs running on a single server and individual VMs are connected to thousands of remote VMs on thousands of servers. This means that any given VM could have a very large number of RDMA connections. This environment is a target environment for the HW RDMA transport over a best efforts (BE) network described herein.

For reference in this description, each NIC 120 is a smart NIC that can perform RDMA operations as described below.

Terminology

RDMA NIC (RNIC): A Network Interface Controller (NIC) with RDMA transport capabilities.

Packet ID (PID): A unique packet identifier used for all non-signaling packets. A generalization of the Packet Sequence Number (PSN) concept.

Requester role: A connected network node's role that issues request messages (e.g., SEND, WRITE, READ REQ, etc.) to the peer node of the connection. This role also handles request packet retransmissions as required by the reliability protocol in response to the signaling packets received from the peer node of the connection.

Responder role: A connected network node's role that issues response messages (e.g. READ RSP, etc.) to the peer node of the connection. This role also handles response packet retransmissions as required by the reliability protocol in response to the signaling packets received from the peer node of the connection.

Completer role: A connected network node's role that issues signaling packets (as required by the reliability protocol) to the peer node of the connection. Signaling packets are issued for received packets belonging to either request messages or response messages. This role can be further subdivided into two sub-roles:

1. Inbound Request Tracking sub-role: This sub-role handles the reliability protocol for the inbound request flow.
2. Inbound Response Tracking sub-role: This sub-role handles the reliability protocol for the inbound response flow.

Initiator Node: A connected network node that initiates a transaction by sending a request message over the network transport towards the target node.

Target Node: A connected network node that services a transaction associated to a request message received over the network transport from the initiator node.

Request flow: Sequence of packets transporting request messages (e.g. SEND, WRITE, READ REQ, ATOMIC REQ, etc.) from the requester role of an initiator node to the completer role of the target node (i.e. in the peer node for the connection).

Response flow: Sequence of packets transporting response messages (e.g. READ RSP, ATOMIC RSP, etc.) from the responder role of a target node to the completer role of its initiator node (i.e. in the peer node for the connection).

Sender: A connected network node that transmits messages (decomposed into non-signaling packets) and receives signaling packets in return. The requester role of an initiator node is a sender of request messages. The responder role of a target node is a sender of response messages.

Receiver: A connected network node that receives messages (decomposed into non-signaling packets) and transmits signaling packets in return.

1. The completer role of an initiator node is a receiver of response messages.
2. The completer role of a target node is a receiver of request messages.

Signaling packet: A non-data carrying packet generated by the receiver node of a request or response flow conveying the reception status for the packets in the flow.

One-Phase Transaction (1P_Transaction): A transaction consisting of a single request message from the requester role of the initiator node to the completer role of the target node (including the associated signaling from completer back to requester).

Two-Phase Transaction (2P_Transaction): A transaction consisting of a request message from requester role of the initiator node to the completer role of the target node (including the associated signaling from completer back to requester) and a response message from the responder role of the target node to the completer role of the initiator node (including the associated signaling from completer back to responder).

Single-Sided Transaction: A transaction that requires a host process involvement only at the initiator node with requester role (e.g., RDMA WRITE—without IMMEDIATE—does not require the involvement of any host process on the target side).

Dual-Sided Transaction: A transaction that requires a host process involvement at both the initiator node and target node (e.g., SEND and RDMA WRITE with IMMEDIATE require the involvement of the host at both the initiator and the target nodes).

Response Queue (RSPQ): A work queue internal to the RNIC which holds WQEs which represent response messages pending to be transported to the initiator node for the associated two-phase transaction. RSPQ-WQEs are auto-generated within the RNIC in reaction to a received request message for a two-phase transaction.

Packet Received (Pkt-Rcvd): Transport state for request and response (non-signaling) packets. For request flow, this state indicates the request packet has been successfully received (either in-order or out-of-order) at the target node. For response flow, this state indicates the response packet has been successfully received (either in-order or out-of-order) at the initiator node. Pkt-Rcvd does not imply any placement, execution, delivery, nor completion. This state applies to non-signaling packets of all transaction types (one-phase and two-phase, single-sided and dual-sided), all flow types (request flow and response flow), and on both sender and receiver nodes.

Packet Delivered (Pkt-Dlvr): Transport state for request or response (non-signaling) packets. For request flow, this state indicates the request packet has been in-order received (i.e., all prior packets have been received as well) at the target node, which permits its execution and/or completion at the target node. For response flow, this state indicates the response packet has been in-order received at the initiator node. The pre-condition for this state is that the packet must have been in Pkt-Rcvd state prior to being in Pkt-Dlvr state (this condition encompasses the immediate transition from Pkt-Rcvd to Pkt-Dlvr, when the packet is received exactly in-order), thus delivery implies reception. This state applies to packets of all transaction types (one-phase and two-phase, single-sided and dual-sided), all flow types (request flow and response flow), and on both sender and receiver nodes.

Packet Placed (Pkt-Plcd): Transport state for data payloads carried by request or response packets. The packet's data payload has been successfully placed in memory at the target node. The pre-condition for this state is that the packet carrying the data payload must have been either in Pkt-Rcvd state (out-of-order placed) or Pkt-Dlvr state (in-order placed) prior to the data payload being placed. Placement does not imply delivery nor completion of the associated packets and messages. This state applies to data payloads for the following packet types:

1. Single-sided one-phase transaction request flow, on the receiver (target) node.
2. Dual-sided one-phase transaction request flow, on the receiver (target) node.
3. Single-sided two-phase transaction response flow only, on the receiver (initiator) node.

Packet Lost (Pkt-Lost): Transport state for request or response (non-signaling) packets. It indicates that the request or response packet has not been received while a posterior packet was received (out-of-order) by the receiver node. This state applies to packets of all transaction types (one-phase and two-phase, single-sided and dual-sided), all flow types (request flow and response flow), and on both sender and receiver nodes.

Message Executed (Msg-Exec): Transport state associated with request messages from the perspective of the receiving target node. The state indicates that the request message has been executed at the target node. The pre-conditions for this state are: 1) the complete message must have been delivered (i.e., all packets composing the message must have been in Pkt-Dlvr state), and 2) the requested operation must have been completely executed by the target node. This state applies to messages of the following types:

1. Single-sided one-phase transaction request messages: once the complete message has been delivered (all packets associated with the request message are in the Pkt-Dlvr state), and optionally (for some operation types e.g., persistent memory operations) once the complete message payload has been placed (all the data payloads associated with the request message are in the Pkt-Pled state).
2. Dual-sided one-phase transaction request messages: once the complete message has been delivered (all packets associated with the request message are in the Pkt-Dlvr state) and the complete message payload has been placed (all the data payloads associated with the request message are in the Pkt-Plcd state). A completion (CQE) can be issued to the associated host process on the target node.
3. Single-sided two-phase transaction request message: once the requested operation has been executed at the target node (e.g., READ, FETCHADD, etc. has been executed and the corresponding response transmission job has been queued for transmission scheduling).

Transaction Completed (Xact-Cmpl): Transport state associated with a transaction from the initiator node perspective. The transaction has been completed. When a transaction enters the Xact-Cmpl state, a completion (CQE) can be issued to the associated host process on the initiator node. This state applies to all transaction types. This state is applied to transaction as follows:

1. A single-sided one-phase transaction enters Xact-Cmpl state after the outbound request message has been completely signaled back for delivery (all packets in the request message are in the Pkt-Dlvr state).
2. A dual-sided one-phase transaction enters Xact-Cmpl state after the outbound request message has been completely signaled back for delivery (all packets in the request message are in the Pkt-Dlvr state).
3. A single-sided two-phase transaction enters Xact-Cmpl state after the following conditions are met:
   a. The outbound request message has been completely signaled back for delivery (all packets in the request message are in the Pkt-Dlvr state)
   b. The associated inbound response message has been completely delivered (all packets in the response message are in the Pkt-Dlvr state). Transition to this state could (but is not required to) wait until the delivery for the associated response message has been signaled to the target node (i.e. sender of the inbound response message).
   c. Optional—for some operation types (e.g., persistent memory operations) a third condition might be that the associated inbound response message has been completely placed (all the data payloads associated with the response message are in the Pkt-Plcd state)

Examples of the present Best-Effort Connected HW RDMA Transport (in the following abbreviated as BE transport or simply BE) are described in two steps:

1. Describe a "baseline" transport as the integration of pre-existing transport features to address some, but not all, of the previously stated problems.
2. Describe an "extended" transport with features (to extend the baseline transport) to further improve the goodput above what can be achieved by the integration of the pre-existing transport features.

Baseline BE Transport

Semantics

A transport can be divided into three categories: Operation, Reliability and Interleaving.

1. Operation semantics define what is the operation and how it should be processed.
   a. 1P request has two sub-categories: single-sided and dual-sided.
      i. Single-sided (RDMA WRITE): data transfer operation that allows a local peer to transfer data into a previously advertised buffer (iWarp calls it a Tagged buffer). This advertised buffer is carried as a remote key in the packet header. Local peer can gather from multiple local source buffers and scatter to a single remote sink buffer.
         (a). Note that RDMA WRITE w/IMMEDIATE operates similarly as RDMA WRITE, but it carries IMMEDIATE data which requires consumption of a RQ WQE. Thus, RDMA WRITE w/IMMEDIATE is categorized as dual-sided 1P request.
      ii. Dual-sided (Send): data transfer that allows a local peer to transfer data into buffers that are not explicitly advertised (iWarp calls it Untagged buffers). Local peer can gather from multiple local source buffers and scatter to multiple remote sink buffers.

b. 2P request (RDMA READ, ATOMIC) and 2P response (RDMA READ response, ATOMIC response): data transfer operation that allows a local peer to retrieve data from a previously advertised buffer (Tagged buffer). This advertised buffer is carried as a remote key in the packet header. Local (initiator) peer can gather from a single remote (target) source buffer and scatter to multiple local (initiator) sink buffers.

c. In all cases, memory buffers are handed out as memory keys which need to be pre-registered. Key validation is required before any data transfer from/to the memory buffer.

d. RoCE supports exactly the same operation semantics. iWarp supports the same 1P request operation semantics, but different 2P request operation semantics, as there can be only one sink buffer.

2. Reliability semantics define how reliability is achieved with signaling packets.

a. All signaling packets carry packet-level PID.

b. ACK cumulatively acknowledges all packets up to PID it carries.

c. SACK selectively acknowledges packets that have been received and implicitly signals packet loss. Selective retransmission could be triggered based on the implicit packet loss information.

d. NAK cumulatively acknowledges all packets up to PID-1 it carries. It explicitly signals packet at PID is lost and GoBackN retransmission needs to be triggered at PID.

3. Interleaving semantics define how outbound request flows and outbound response flows can be interleaved on the same connection.

a. In message level interleaving, one message of either flow must complete before a next message of either flow can proceed. For example, an outbound RDMA READ response multi-packet message must complete before a new request message, such as a SEND request, can be issued.

b. RoCE does not have interleaving as the outbound response flow uses the same PID space as the inbound request flow of the same connection.

The baseline BE transport integrates the following pre-existing transport features with the stated modifications:

1. The baseline BE transport takes the following features from InfiniBand ROCE-RC:

a. Verbs as an application programming interface (API) for interacting with the RNIC as required by the OpenFabrics Interface/OpenFabrics Enterprise Distribution (OFI/OFED) open fabrics distributions. This API requires the concepts of QueuePairs (QP), SendQueue (SQ), ReceiveQueue (RQ) and CompletionQueue (CQ) used as the foundations of the HW/SW interface for work submission and completion reporting.

b. Messages are split into packets (every packet except for the last packet in the message having MTU size) and reliability is applied at packet level (not byte level, not message level). Each packet is identified by a unique PID (PacketID), a generalization of the Packet Sequence Number-PSN-concept).

c. NAK signaling packets with the same reliability semantics as in RoCE-RC.

2. The baseline BE transport takes the following features from both ROCE-RC and iWARP:

a. Single-sided one-phase transactions (e.g., RDMA WRITE) have the same semantic data packaging and acknowledgements, as in RoCE-RC (ROCE Reliable Connection) and iWARP.

b. Dual-sided one-phase transactions (e.g., SEND) have the same operation semantics as in RoCE-RC and iWARP.

c. RoCE-RC exclusions:

i. Single-sided two-phase transaction (e.g. RDMA READ Request/Response pair) have the same operation semantics as RoCE-RC but reliability semantics in BE transport are not taken from ROCE-RC, as ROCE-RC requires data-carrying response messages with signaling attributes (i.e., instead of ACK packets, a response packet which carries data also has an implicit acknowledging property), so that the acknowledgement mechanism is different.

ii. If RoCE compatibility is desired from a Verbs standpoint, distinct/unique mnemonics/opcodes can be defined for each of the pre-existing single-sided two-phase operations, e.g., RDMA PULL (used as the equivalent of RDMA READ for BE), RDMA PullAdd (used as the equivalent of RDMA FetchAdd for BE), etc.

3. The baseline BE transport takes the following features from iWARP:

a. Single-sided two-phase transactions which require responses that may be data-carrying (e.g., RDMA READ Response for non-zero length read) or non-data-carrying (e.g., RDMA READ Response for a zero-length read) have the same reliability semantics as iWARP:

i. Response flow packets do not have an implicit acknowledgement/signaling aspect.

ii. Response flow packets are covered by the reliability protocol (same protocol that is used for the request flow), thus the receiver of the response packet (i.e., the initiator node that sent the initial request, e.g., a RDMA READ Request) must acknowledge their reception by signaling the sender of the response packet (i.e., the target node).

iii. Reponses are submitted to a Response Queue (RSPQ) to be scheduled for egress, therefore the outbound request and response flows associated to the same BE connection must be interleaved for transmission by the same node. As a reference, iWARP supports interleaving semantics for request flow and response flow only at message boundaries (i.e., all packets of a message must be transmitted before a message of the opposite flow can initiate transmission).

b. Response and request interleaving includes message level interleaving semantics according to iWarp.

4. The baseline BE transport incorporates a mix of iWARP's direct data placement (DDP) messaging and constructs with RoCE-RC scattered placement messaging and constructs to enable out-of-order packet reception with out-of-order scattered data placement (with in-order completion). This feature is supported in request flows and response flows.

a. The baseline BE transport supports in-order and out-of-order packet reception by employing a reliability protocol with selective signaling, inspired in iWARP's reliability semantics of ACK and selective-ACK (SACK) for signaling.

b. The baseline BE transport supports out-of-order placement inspired by iWARP's DDP messaging and constructs but combined with RoCE-RC scattered placement messaging and constructs (by use of concepts like Memory Regions, Memory Windows, Memory Keys). The key differences with iWARP DDP are:

i. BE transport does not include the local sink address and length in the request message (which are required iWARP in some instances).

ii. BE transport includes control information in the request message that is echoed back to the initiator node within the response. This control information is used by the initiator node to find the local placement information for the response, i.e., the information must allow the initiator node to find the associated SQ-WQE and obtain the local placement information from it.

c. Enabling the out-of-order and scattered data placement feature requires the following new control information to be added to the packet's headers, i.e., the following set of control information is distinct from what the iWARP and RoCE-RC protocols specify:

i. For all request flow and response flow packets: a PacketID (PID) is added to each and every packet, allowing the receiver for the flow to unequivocally detect holes (lost packets) in the flow's packet stream. Distinct formats for the PID can be supported (enabling distinct trade-offs for the interleaving of request flow and response flow over the same connection as described below). In a first format, the PID is equivalent to the conventional PSN. In a second format, the PID is the combination of a Message ID (MID) and an Intra Message Packet Number (IMPN). Note that a single (chosen) PID format should be used for all packets in a particular deployment of the BE transport.

ii. For single-sided one-phase transactions: the RDMA addressing information (for the target node) used for placement is to be added to every request packet. An IMPN can be optionally added to facilitate message tracking. The option is on a connection basis, not a packet-by-packet basis. Note that the IMPN can be inferred from the packet's PID (depending on the PID's format chosen for the BE deployment), in such a case, no duplication is required.

iii. For dual-sided one-phase transaction except RDMA WRITE with IMMEDIATE: a RQMSN and IMPN are used in every request packet to enable out-of-order placement into the RQ. Note that the IMPN can be inferable from the packet's PID (depending on the PID's format chosen for the BE deployment), in such a case, no duplication is required. For RDMA WRITE with IMMEDIATE, the RQMSN is required while the IMPN is optional.

iv. For single-sided two-phase transaction requests: a RSPQ Message Sequence Number (RSPQMSN) and the RDMA addressing information (for the target node) is used in every request message to enable out-of-order placement into the RSPQ.

v. For single-sided two-phase transaction responses: The RSPQMSN and an Intra Message Packet Number (IMPN) are used in every response packet to enable out-of-order placement of the response data, and for tracking completion of the transaction. The requester maps the RSPQMSN to the associated SQ-MSN (SQ-WQE) to retrieve the scattered placement information (translating IMPN to scattered RDMA addresses on the initiator node). Note that the IMPN can be inferable from the packet's PID (depending on the PID's format chosen for the BE deployment), in such a case, no duplication is required.

Note: Memory write consistency is lost due to this out-of-order placement (as in iWARP).

5. The baseline BE transport can optionally incorporate, as an optimization, a Flush feature based on a Flush Timeout (FTO) for early detection of tail packet loss to effectively reduce the RTO probability. The FTO is inspired in QUIC's PTO concept. The Flush feature works as follows:

a. A Flush Packet (FLSH) is introduced as a special type of transport signaling packet.

i. The FLSH packet indicates the PID for the expected tail packet in the BE connection being flushed.

b. A Sender needs to maintain a Flush Timer and a Flush Counter which are used in a Flush loop as follows:

i. A FTO threshold (based on the Flush Counter reaching a cap value) can be configured to exit the Flush loop.

ii. Sender starts the Flush Timer if it is not currently running, or restarts the Flush Timer if it is currently running, upon transmitting a tail packet for a BE connection, i.e., whenever the BE connection is in a tail-drop condition.

(a). A tail-drop condition for the BE connection is whenever the connection is susceptible to an RTO due to a potential tail-drop.

iii. The Flush Timer is cleared upon receiving a signaling packet associated to the tail packet.

iv. If the Flush Timer expires, a FLSH packet (with the PID for the tail packet of the BE connection) is sent on the same network path as the tail packet was sent on. The Flush Counter is incremented.

(a). If the FTO threshold is not reached, the Flush Timer is restarted.

(b). If the FTO threshold is reached, the connection now relies on RTO.

v. If the RTO Transport Timer is restarted (because of a received ACK packet), the Flush Counter is reset.

(a). If the BE connection is in a tail-drop condition, the Flush Timer is restarted automatically.

vi. Sender may share a single timer for both functions, the FTO Flush Timer and the RTO Transport Timer, as follows:

(a). When there is no tail-drop condition, the timer is used as the RTO Transport Timer.

(b). When there is a tail-drop condition, the timer is used as the FTO Flush Timer. Once the FTO threshold expires, the timer is used as the RTO Transport Timer (set to the "remaining" RTO time, i.e., after discounting all the FTO timeout repetitions). If the RTO Transport Timer is reset (because of a received ACK), the timer may be reset again and used as the FTO Flush Timer (if a tail-drop condition exists).

c. The receiver responds upon receiving a FLSH packet.

i. The receiver sends the appropriate signaling packet to indicate the status of the queried tail packet (the PID carried by the FLSH packet) or the connection as a whole.

Summarizing, the features used in BE Baseline are from ROCE-RC, iWarp and QUIC.

1. From RoCE-RC:

a. Standard Verbs API for interacting with RNIC.

b. Reliability is applied at packet level. iWarp applies reliability at byte level because it runs on top of TCP and TCP works on a byte stream.

c. Adopt NAK to explicitly signal packet loss. iWarp doesn't support NAK and sender needs to infer packet loss from ACK/SACK.
d. Scatter capability on local initiator host memory, i.e. Read response data could be scattered into multiple local buffers. iWarp can only scatter read response data into a single local buffer.
2. From iWarp:
a. DDP to enable out-of-order data placement on receiver side.
b. Receiver sends ACK/SACK to signal in-order and out-of-order received packets such that sender could do selective retransmission.
c. Adopt symmetric reliability protocol for request and response flows. Response flow is covered by the same reliability protocol as request flow.
i. Responder can initiate selective retransmission of response packets upon receiving SACKs.
ii. In RoCE-RC, response packets don't get acknowledged and response packets loss need to rely on requester retransmitting request packets.
3. From QUIC:
a. Probe packets and probe timeout (PTO), renamed as Flush packet and FTO.

Figure 2A:
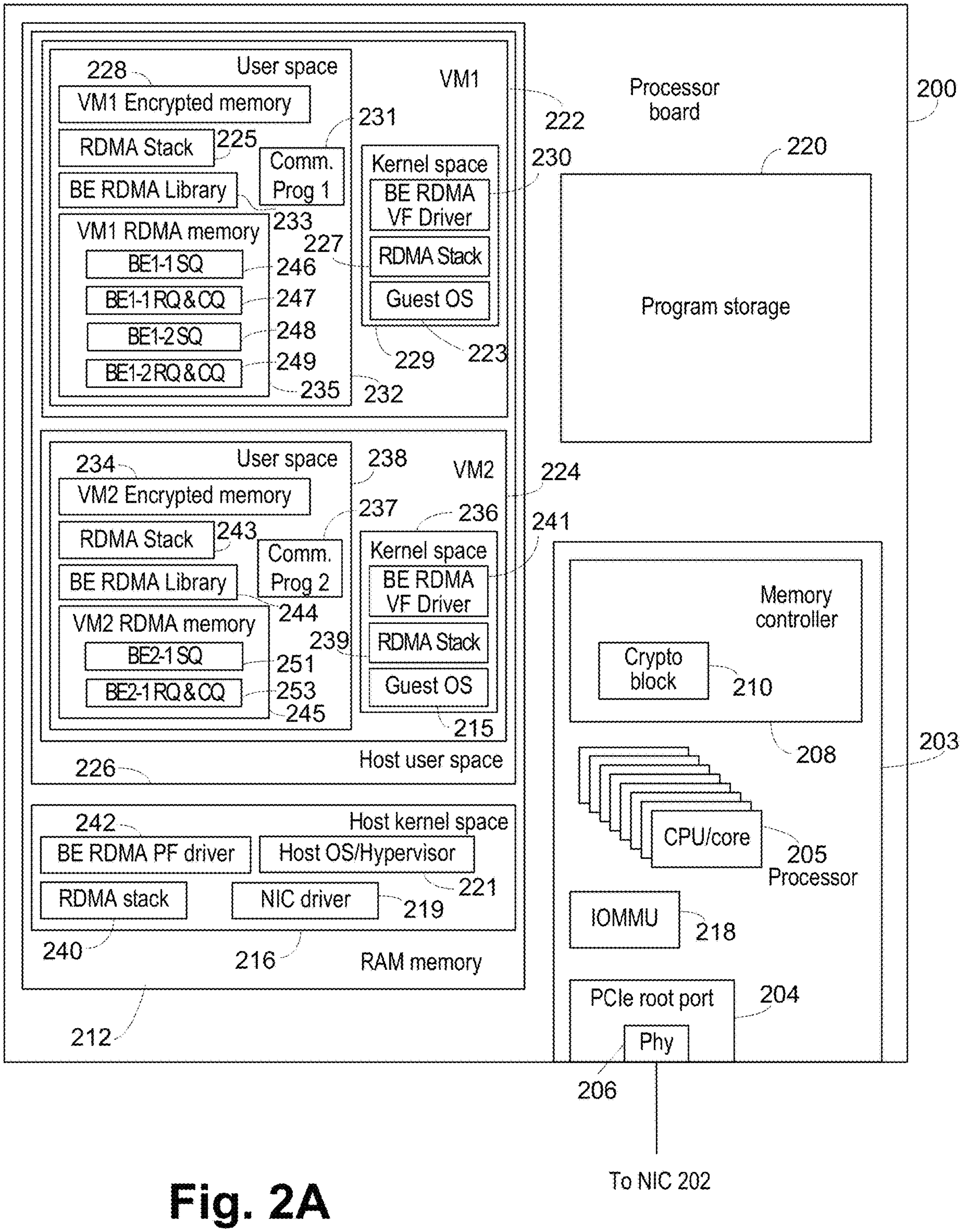
FIG. 2A illustrates a block diagram of a processor board of a server present in a cloud service provider environment according to examples of the present invention.
Figure 2B:
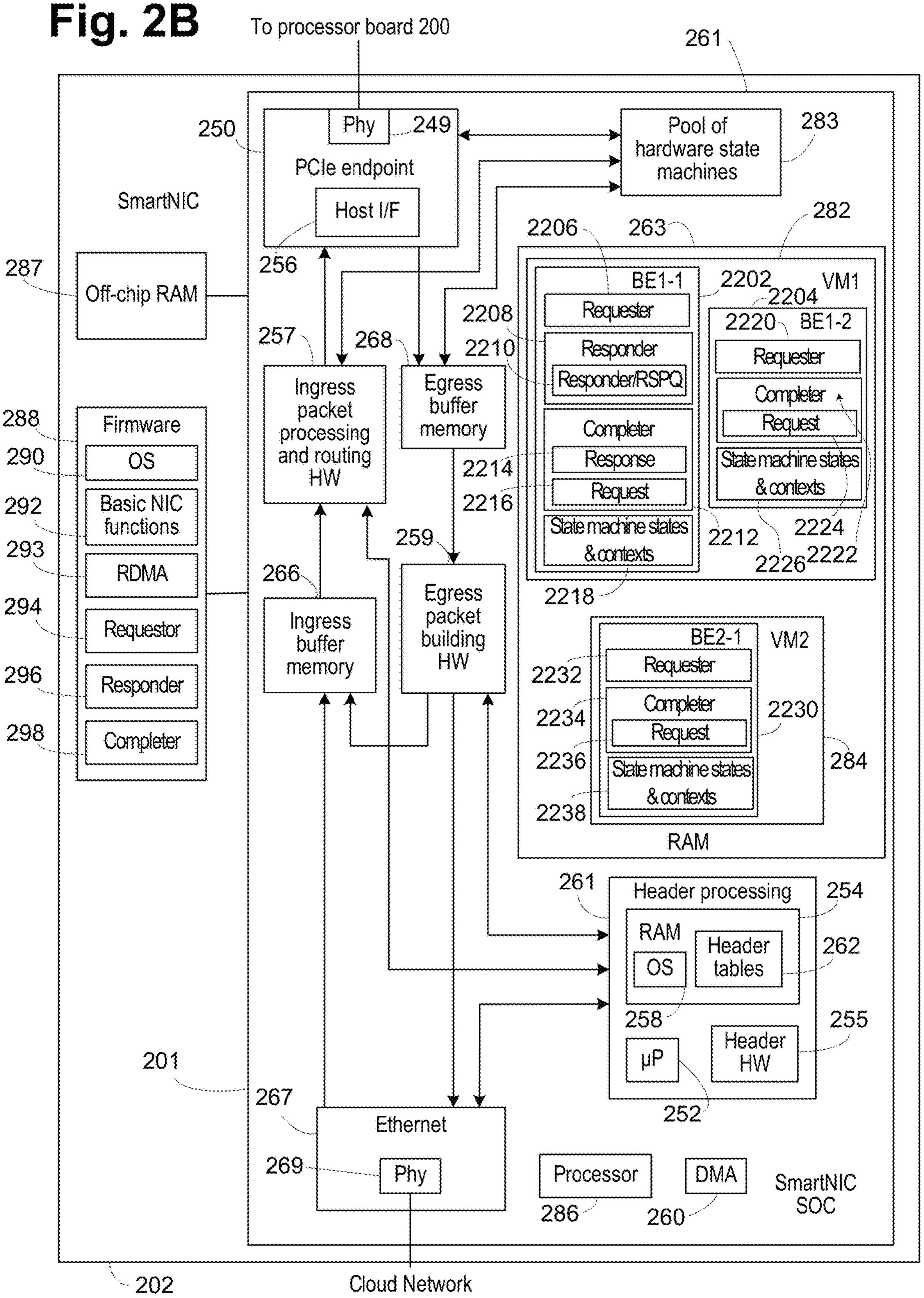
FIG. 2B illustrates a block diagram of a network interface card (NIC) of a server present in a cloud service provider environment according to examples of the present invention.

FIGS. 2A and 2B illustrate a processor board 200 and a NIC 202 used in a cloud service environment according to the present invention. The processor board 200 includes one or more of processors 203 to perform the computing. Each processor 203 includes CPUs or cores 205, a PCIe root port module 204 which includes a phy 206 to allow the processor 203 to communicate with peripherals such as the NIC 202. The processor 203 includes an enhanced memory controller 208. The enhanced memory controller 208 includes a crypto block 210 to perform encryption and decryption of data resident in the RAM memory 212. An IOMMU 218 is present to monitor and control I/O operations between the NIC 202 and the VM memory of the processor board 200.

Figure 3:
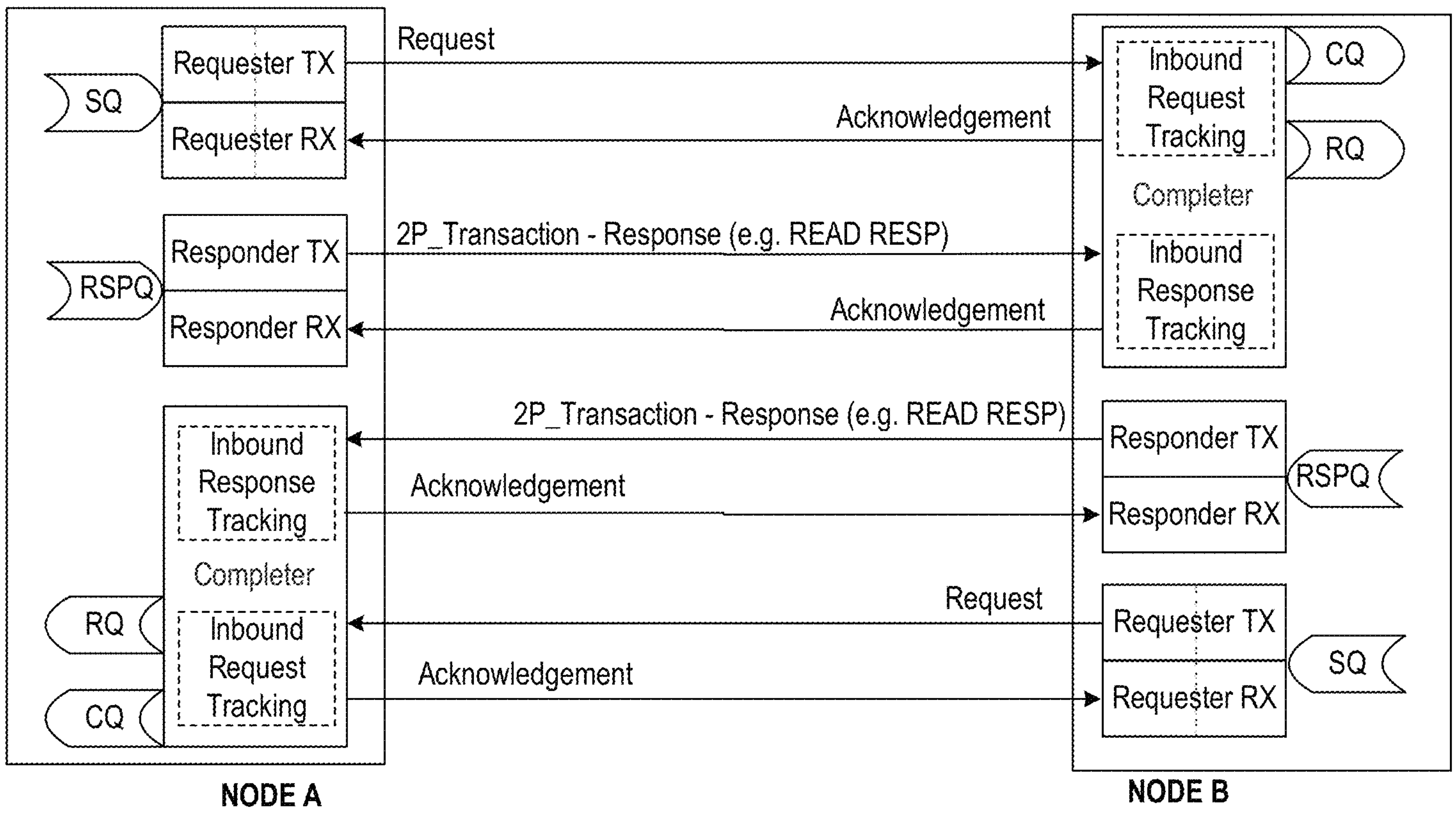
FIG. 3 illustrates all roles of a BE transport according to examples of the present invention.
Figure 4:
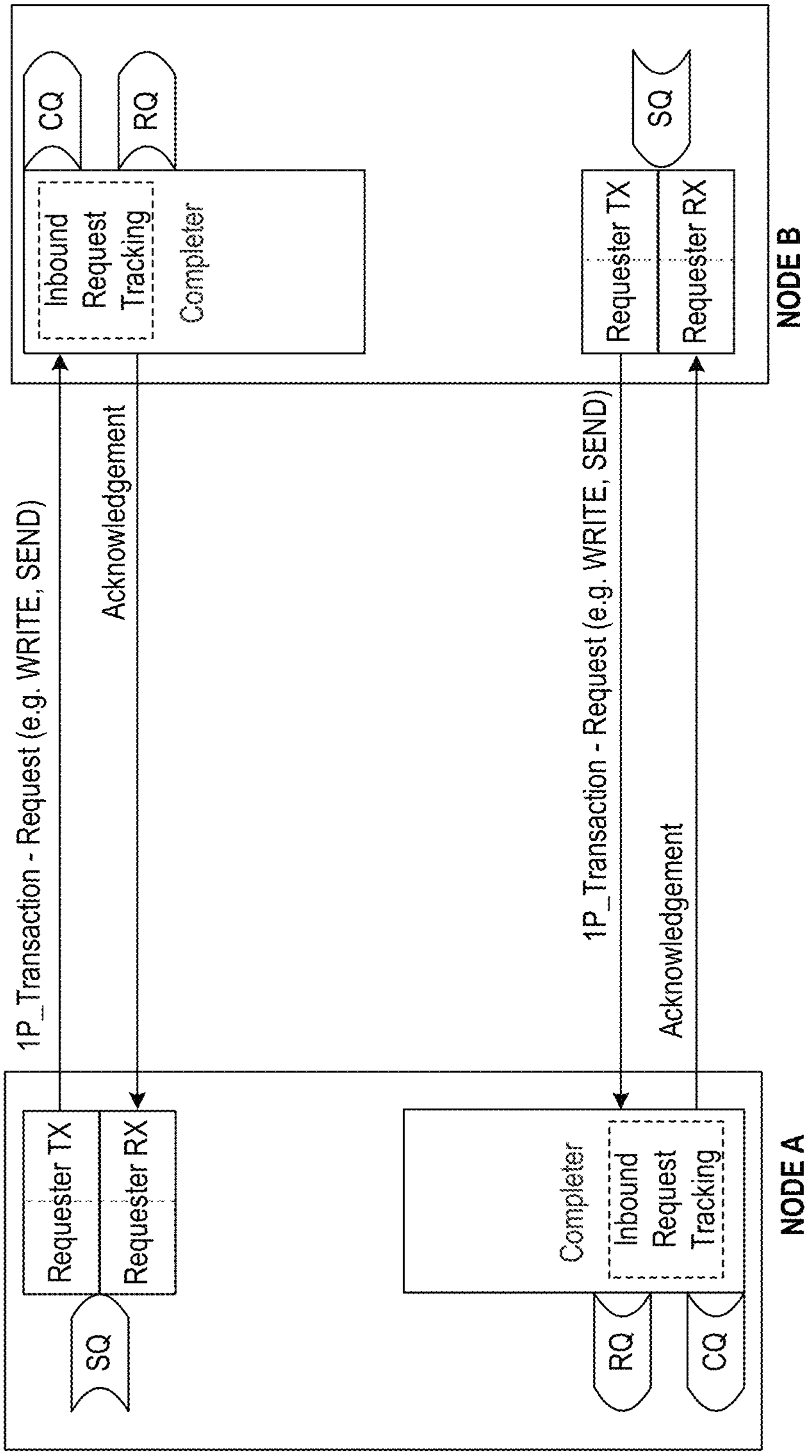
FIG. 4 illustrates nodes A and B just having requester roles of a BE transport according to examples of the present invention.

Processor board 200 includes program storage 220, such as that illustrated in non-transitory storage 124. The RAM memory 212 is divided into host kernel space 216 and host user space 226. The host kernel space 216 includes the operating system and hypervisor 221, NIC driver 219, an RDMA stack 240 and a BE RDMA physical function (PF) driver 242. The host user space 226 includes VM1 222 and VM2 224. VM1 222 has kernel space 229 and user space 232. VM1 kernel space 229 includes a guest operating system 223, an RDMA stack 227 and a BE RDMA virtual function (VF) driver 230. VM1 user space 232 includes an area of encrypted memory 228, a communication program 1 231 to cooperate with the remote VM, an RDMA stack 225, a BE RDMA library 233 and RDMA memory 235. The VM1 RDMA memory 235 includes a BE1-1 SQ 246, BE1-1 RQ and CQ 247, BE1-2 SQ 248 and BE1-2 RQ and CQ. BE1-1 represents a first BE RDMA connection of VM1 222 and BE1-2 represents a second BE RDMA connection of VM1 222. Connection BE1-1 exemplifies a full bidirectional transport configuration, as illustrated in FIG. 3. Connection BE1-2 exemplifies a 1P_Transaction only Requester transport configuration, as illustrated in FIG. 4.

Similarly, VM2 224 includes kernel space 236 and user space 238. The kernel space 236 includes a guest operating system 215, an RDMA stack 239 and a BE RDMA VF driver 241. VM2 user space 238 includes encrypted memory 234, communication program 2 237, an RDMA stack 243, a BE RDMA library 244 and VM2 RDMA memory 245. The VM2 RDMA memory 245 includes a BE2-1 SQ 251 and BE2-1 RQ and CQ 253. Connection BE2-1 also exemplifies a 1P_Transaction only Requester transport configuration, as illustrated in FIG. 4.

The NIC 202 includes a SmartNIC system on a chip (SOC) 201, off-chip RAM 287, and SmartNIC firmware 288. While shown as a single chip, the SOC 201 can also be multiple interconnected chips that operate together. The SOC 201 includes a PCIe endpoint module 250 which includes a phy 249 and a host interface 256. The host interface 256 performs translations of data payloads between PCIe and the ingress packet processing hardware 27, the egress buffer memory 268 and the hardware state machines in the pool of hardware state machines 283. A DMA controller 260 is provided in the SOC 201 to perform automated transfers between the processor board 200 and the NIC 202 and inside the NIC 202. An egress buffer memory 268 and ingress packet processing and routing hardware 257 are connected to the PCIe endpoint module 250. While shown as separate egress and ingress buffer memories, this is a logical illustration and the egress buffer memory 268 and ingress buffer memory 266 can be contained in a single memory. The ingress packet processing and routing hardware 257 is connected to ingress buffer memory 266, which receives packets from an Ethernet module 267 on the SOC 201. The ingress packet processing and routing hardware 257 strips received packets of underlay headers and provides metadata used to route the packet to the proper PF or VF. The egress buffer memory 268 is connected to egress packet building hardware 259, which builds packets provided to the Ethernet module 267. The Ethernet module 267 includes a phy 269, which is connected to the lossy Ethernet cloud network.

In RDMA transports using the Verbs API, as used in examples according to the present invention, only data payload is exchanged between the VMs and the NIC 202, so connection context information and packet specific information must be provided for each packet, whether data, request or response. The connection context information and packet specific information, as used by and updated by the processing of the hardware state machines 283, which in turn received the connection context information and packet state for the packet based on the connection and flow information associated with the packet, are used by the egress packet building hardware 259 and a header processing module 261 connected to the egress packet building hardware 259. Utilizing the connection context information and the packet specific information the egress packet building hardware 259 and the header processing module 261 develop the proper RDMA header stack, such as Ethernet, IP, UDP, BTH and BE headers, for the packet. The developed header stack is combined with any data being transferred in the packet by the egress packet building hardware 259 and then provided to the Ethernet module 267 for transmission. The above header stack with a single Ethernet header and the like is satisfactory for use in conventional data centers. In a cloud network environment, the outer or underlay header used by the cloud network to route the packet in the cloud network must be added. The header processing module 261 utilizes the connection context information to build this second layer of headers in a cloud network environment. The egress packet building hardware then combines both sets of headers, the RDMA header and the cloud network header, when assembling the packet for provision to the Ethernet module 267.

The header processing module 261 is illustrated including a processor 252, RAM 254 and header hardware 255. A header processing operating system 258 is provided in the RAM 254 to control the operation of the processor 252. While a conventional processor and operating system are illustrated, in some examples a special function processor, configured to directly perform the needed header operations in response to an input command, can be used. The RAM 254 includes various header tables 262 used by the header hardware 255 to determine the proper outer headers. The header hardware 255 acts as a match/action block, matching on header values and performing a resultant action. While the header tables are illustrated as being contained in RAM 254, the header tables 262 may also be stored in the off-chip RAM 287 to reduce the size of the RAM 254. The header processing module 261 can also directly receive packets from the Ethernet module 267 and provide packets to the Ethernet module 267 for communication with the cloud network for management operations.

In ingress operation, the packet is provided to the ingress packet processing and routing hardware 257. The ingress packet processing and routing hardware 257 analyzes the packet to check validity. The ingress packet processing and routing hardware 257 provides the packet header to the header processing module 261. The header processing module 261, using the header hardware 255, uses the virtual network identifier (VNI) or virtual subnet identifier (VSID) and underlay header values in a cloud network environment or the RDMA header in a data center environment to determine the appropriate PF or VF and connection context information. The RDMA and BE headers are processed to develop packet specific information used by the pool of hardware state machines 283 to manage the BE protocol for the packet. The header processing module 261 returns a data payload, PF or VF metadata, connection context information and packet specific information to the ingress packet processing and routing hardware 257. The connection context information and the packet state are provided to the state machine in the pool of state machines 283 to process the packet as described below. The packet specific information is used to manage the BE protocol for the packet as described below. After BE protocol processing, the ingress packet processing and routing hardware 257 then uses the PF or VF metadata and connection context information for internal queuing information; and places the packet in the proper output queue in the PCIe endpoint module 250. From the PCIe endpoint module 250 the payload or message information are provided to the designated host memory buffer or queue.

A VM1 block 282 and a VM2 block 284 are contained in on-chip RAM 263, though the VM1 block 282, VM2 block 284 and other VM blocks can be stored in the off-chip RAM 287. The ingress buffer memory 266 and the egress buffer memory 268 may be contained in the on-chip RAM 263 or may be dedicated memory areas in the SOC 201.

The SOC 201 includes a processor 286 to perform processing operations as controlled by firmware 288, a type of non-transitory storage, which includes operating system 290, basic NIC function modules 292, RDMA functions 293, requestor functions 294, responder functions module 296 and completer functions 298. The tasks of the requestor, responder and completer are described below. The SOC 201 further includes a pool of hardware state machines 283. The individual state machines in the pool of hardware state machines 283 are allocated to packets in process, such as packets that have been transmitted but not yet acknowledged or received and not yet signaled complete.

VM1 block 282 includes a BE1-1 portion 2202 and a BE1-2 portion 2204. BE1-1 portion 2202 includes a requester instantiation 2206, a responder instantiation 2208 with RSPQ 2210, a completer instantiation 2212 with response table 2214 and request table 2216 and state machine states and contexts 2218, as described in more detail below. The request table 2216 includes an allocated amount of resources provided for out-of-order tracking. In operation, a given state machine state and context is retrieved and combined with selected packet header information and provided to an allocated hardware state machine to determine next state and appropriate outputs when a packet is to be processed. Various state machines in examples according to the present invention are described below. BE1-2 portion 2204 includes a requester instantiation 2220, a completer instantiation 2222 with request table 2224 and state machine states and contexts 2226. The request table 2224 includes an allocated amount of resources provided for out-of-order tracking.

It is understood that this combination of a pool of hardware state machines used with state and context data and packet header data is one example of state machine design and use. Other state machine designs, such as firmware used with state, context and header information, more fixed designs not using a pool of hardware state machines, pipelining of hardware state machines and so on can be utilized according to the teachings provided herein.

VM2 block 284 includes a BE2-1 portion 2230. BE2-1 portion 2230 includes a requester instantiation 2232, a completer instantiation 2234 with request table 2236 and state machine states and contexts 2238.

The presence of the three BE portions BE1-1 2202, BE1-2 2204 and BE2-1 2230 illustrates that a BE portion is developed for each BE RDMA connection.

While the header processing module 261 is shown as having a separate processor 252 and RAM 254, in some examples the processor 286 and on-chip RAM 263 can be used. Thus, the physical separation illustrated in FIG. 2B becomes a logical separation of the processor, RAM and firmware in the integrated examples. The header hardware 255 remains and is accessible only by the header processing module 261. The tradeoff is program development time versus silicon cost for the processor 252 and RAM 254.

Figure 2C:
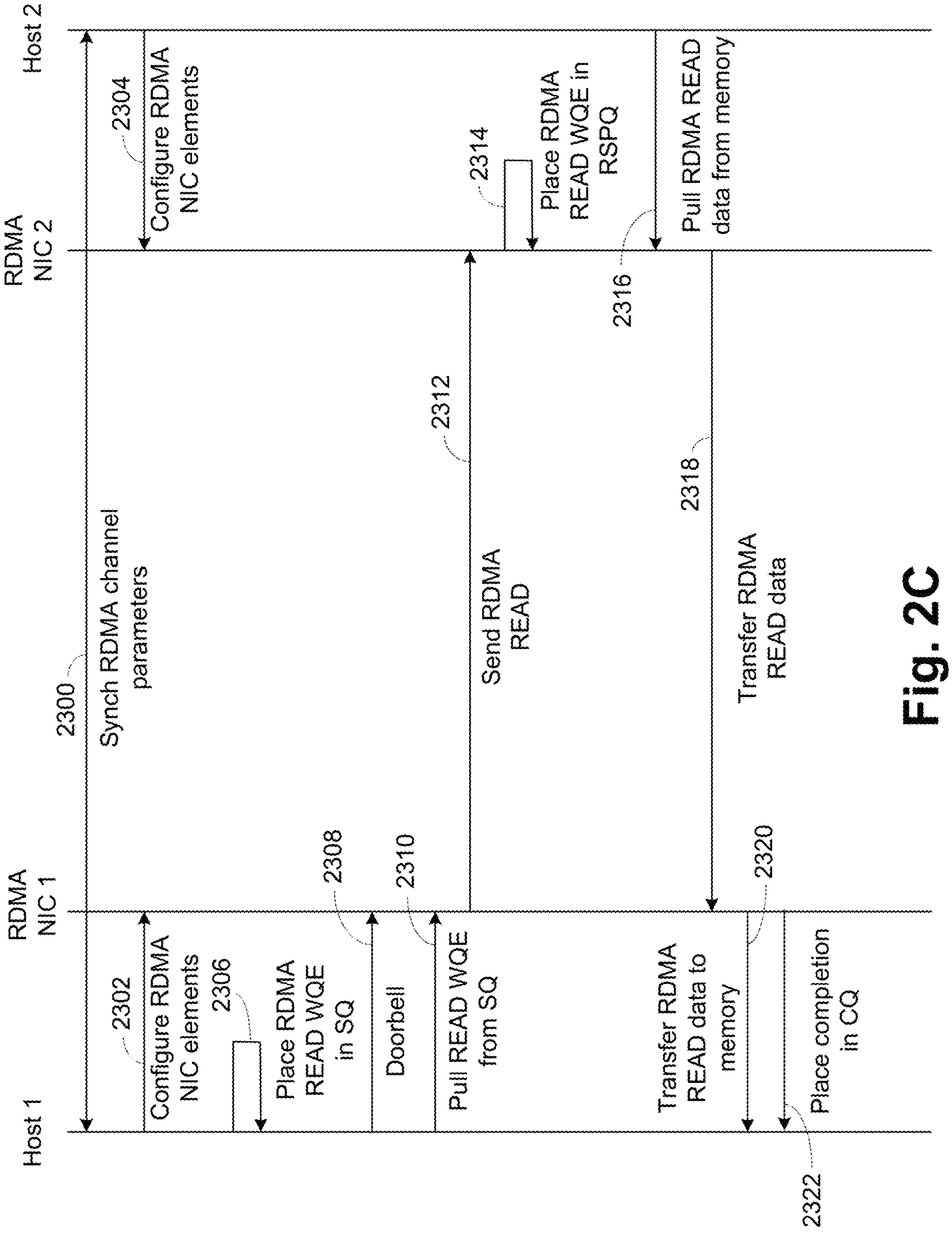
FIG. 2C is a ladder diagram of RDMA operations of sender and receiver hosts and NICs according to examples of the present invention.

FIG. 2C illustrates initialization of an RDMA connection and operation of a READ operation using BE RDMA NICs such as NIC 202 described above. In operation 2300, host 1 and host 2 communicate to determine the parameters of the RDMA connection, such as MAC/IP addresses, buffer keys, and the like. These values form part of the context for the RDMA connection. In operation 2302, host 1 configures the connected BE RDMA NIC 1 to include the proper functions and queues. This operation is illustrated in more detail in FIG. 2D. In operation 2304, host 2 configures the connected BE RDMA NIC 2. In operation 2306, the application in host 1 places an RDMA READ WQE in the SQ, so that the RDMA NIC 1 will be an initiator and RDMA NIC 2 will be a target. The WQE includes the RDMA opcode and buffer locations. For a SEND, initiator local gather buffers are included, as the target remote buffers will be developed from a WQE in the RQ of the remote or target node. For RDMA WRITE, the initiator local gather buffers and target remote buffer are included in the WQE. For RDMA READ, the initiator local scatter buffers and target remote buffer are included in the WQE. In operation 2308, the application in host 1 rings the doorbell of the BE RDMA NIC 1. In operation 2310, the BE RDMA NIC 1 pulls the RDMA READ WQE from the SQ. The requester, such as requestor 2206 for BE1-1, obtains the RDMA READ WQE and parses the WQE to configure the requestor and completer for the read operation. This parsing includes determining the RDMA opcode, buffers as appropriate for the opcode, transfer length and any data or immediate data. For egress messages, the requestor uses the provided data from the WQE and from the connection context to set up header processing. For example, the transfer length can be used to program the header processing to break up the transfer into FIRST, MIDDLE and LAST values used in the BTH opcode field. For SENDs and RDMA WRITES, the requestor builds DMA commands to be used to transfer the data. The completer, such as completer 2212, is configured to develop and provide a CQ CQE when the message is completed. In operation 2312, the RDMA NIC 1 sends an RDMA READ packet to the RDMA NIC 2.

The RDMA NIC 2 receives the RDMA READ packet. In the case of the first packet of a message requiring a response, such as the example RDMA READ, the completer, such as completer 2212, can develop a RSPQ WQE including necessary information for the read operation to occur, such as the known opcode, the message number, buffer and key carried in the RDMA READ request packet. In operation 2314 the completer places an RSPQ-WQE in the RSPQ. The RDMA READ target or destination QP and other information in the RSPQ-WQE is used by the responder, such as responder 2208, to obtain the proper connection context for configuring the DMA controller and header processing. If this had been a SEND or RDMA WRITE operation, the completer would use the QP and opcode in the initial packet of the message to obtain the proper connection context. For a SEND, the completer fetches the relevant WQE from the RQ based on the message number in the SEND packet. With the WQE, the completer can program the DMA controller to place the incoming data in the proper buffer. For a RDMA WRITE, the completer uses the buffer in the received RDMA WRITE packet to set up the DMA controller to transfer the incoming data to the proper buffer.

In operation 2316, the BE RDMA NIC 2 responder, such as responder 2208, obtains the RSPQ-WQE just placed in the RSPQ in a similar fashion to the requester processing the WQE from the SQ and programs the DMA controller to pull the requested data from host 2 memory based on the buffers in the WQE. The responder also configures the header processing to properly develop the packet headers. In operation 2318, the RDMA NIC 2 sends the requested data in a series of RDMA READ RESPONSE packets. In operation 2320, the RDMA NIC 1 receives the RDMA READ RESPONSE packets. The completer uses packet header information to program the DMA controller to transfer the RDMA READ data to host 1 memory. In operation 2322, when the response is finished, the completer develops a CQE to be placed in the CQ and the RDMA READ operation is complete.

While the above example has described the message level operations as being performed using the firmware requester, responder and completer, in other examples the message level operation is also configured into hardware associated with the hardware state machines to perform the same operations.

Figure 2D:
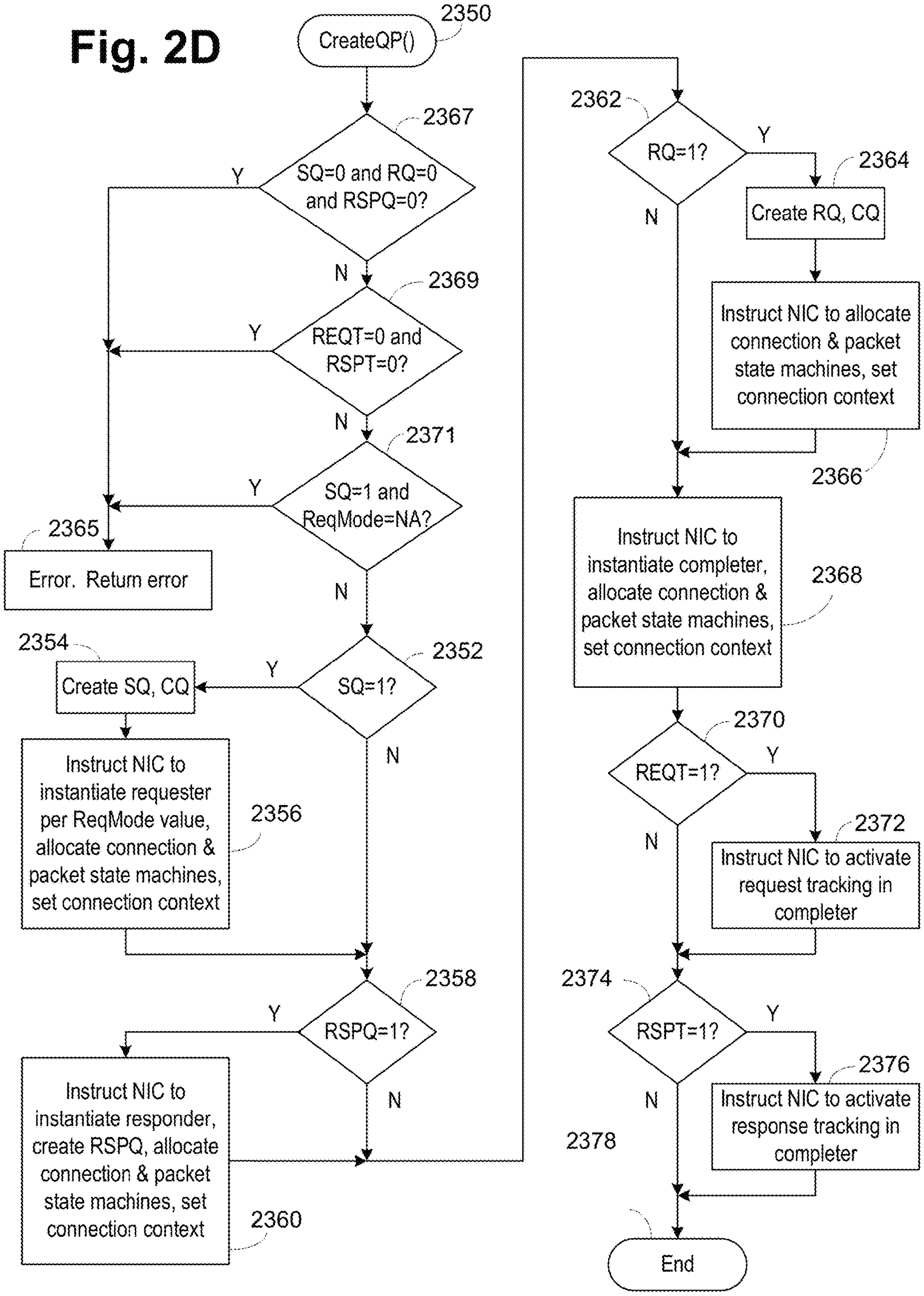
FIG. 2D is a flowchart of NIC and host RDMA initialization operations according to examples of the present invention.

In FIG. 2D, the operation of the CreateQP( ) verb is illustrated. In examples according to the present invention, the CreateQP( ) verb has a number of possible arguments. An example syntax is CreateQP (ReqMode=FULL, 1P, 2P or NA, SQ=0 or 1, RQ=0 or 1, RSPQ=0 or 1, REQT=0 or 1, RSPT=0 or 1). ReqMode=FULL represents Full Requester which supports both one-phase and two-phase transactions. ReqMode=1P represents 1P Requester which supports one-phase transactions only. ReqMode=2P represents 2P Requester which supports two-phase transactions only. ReqMode=NA represents no Requester support (SQ must not be instantiated). SQ=1 indicates the creation of an SQ. RQ=1 indicates the creation of an RQ. RSPQ=1 indicates the creation of an RSPQ. REQT=1 indicates the need to track out-of-order inbound request packets. RSPT=1 indicates the need to track out-of-order inbound response packets.

CreateQP( ) 2350 begins in step 2367 where it is determined if RQ, SQ and RSPQ are all 0. This is an improper condition, so if true, operation proceeds to step 2365, where operation ends and an error condition is Returned. If no error in step 2367, in step 2369, it is determined if both REQT and RSPT equal zero. This is an error condition and if met, operation proceeds to step 2365. If no error in step 2369, in step 2371 it is determined if SQ equals one and ReqMode is NA. This is an error condition, and if met, operation proceeds to step 2365. If no error in step 2371, in step 2352 the SQ value is evaluated and a determination is made if SQ=1. If so, in step 2354 SQ is created and CQ is associated. Each newly created SQ or RQ must be associated with a CQ, either a pre-existing CQ or a newly created CQ for this purpose. In step 2356, the NIC 202 is instructed to instantiate a requester according to the ReqMode value and allocate connection and packet state machines and set connection context using the instantiated requester. After step 2356 or if SQ=0 in step 2352, in step 2358 the RSPQ value is evaluated and a determination is made if RSPQ=1. If so, in step 2360 the NIC 202 is instructed to instantiate a responder and allocate the connection and packet state machines if not already done and set connection context if not already done using the instantiated responder. After step 2360 or if RSPQ=0 in step 2358, in step 2362 the RQ value is evaluated and a determination is made if RQ=1. If so, in step 2364 RQ is created and CQ is associated, as with the SQ. In step 2366, the NIC 202 is instructed to allocate the connection and packet state machines and set connection context if not already done using the requester and responder instantiations. After step 2366 or if RQ=0 in step 2362, in step 2368 the NIC 202 is instructed to instantiate a completer and allocate the connection and packet state machines if not already done and set connection context if not already done using the completer instantiation.

After step 2368, in step 2370 the REQT value is evaluated and a determination is made if REQT=1. If so, in step 2372 the NIC 202 is instructed to activate request tracking in the completer. After step 2372 or if REQT=0 in step 2370, in step 2374 the RSPT value is evaluated and a determination is made if RSPT=1. If so, in step 2376 the NIC 202 is instructed to activate response tracking in the completer. After step 2376 or if RSPT=0 in step 2374, operation completes at step 2378 and a success response is returned. It is understood that this is one example flowchart and others can readily be developed that provide the same ultimate functionality.

Extended BE Transport

The complete or extended BE transport extends the baseline BE transport with the following transport features: Transport Roles 1. Decoupled transport roles: The functionality of the BE transport can be split into multiple distinct roles: Completer, Requester, and Responder as depicted in FIG. 3.

a. Requester role: handles the transport functionality required to execute SQ-WQEs for the BE RDMA connection. Note the SQ-WQEs held in the SQ are produced by an external entity to the BE RDMA NIC (or to a BE Transport IP block integrated into a larger SoC), such as host 1 in FIG. 2C posting SQ-WQEs for the BE RDMA NIC (or an SoC integrated accelerator/GPGPU posting SQ-WQEs to an integrated BE Transport IP). The requester role responsibilities are:

i. Generation of outbound request messages for all transaction types (source for the request flow).

ii. Segmentation of outbound request messages into request packets with unique PIDs and tracking all the outstanding request packets based on the received signaling for the request flow.

iii. Handling retransmission of request packets based on the received signaling for the request flow, i.e., tracking the state of each packet belonging to an outbound request message (Pkt-Rcvd, Pkt-Lost, Pkt-Dlvr, etc.).

iv. Handling the retirement of fully delivered and placed SQ-WQEs (i.e. pop completed WQEs from the SQ) when all the packets forming the outbound request messages reach Pkt-Dlvr state.

v. Directing the local Completer to complete (generate associated CQE) SQ-WQEs associated with transactions once the transactions reach the Xact-Cmpl state, for one-phase and two-phase transactions initiated by the Requester.

(a). On one-phase transactions, the CQE can be generated as soon as the associated SQ-WQE has been retired from the SQ.

(b). On two-phase transactions, the CQE can be generated once the associated SQ-WQE has been retired from the SQ and the associated inbound response message has been completely delivered.

vi. The Requester role functionality can be split into two capabilities:

(a). One-phase requester capability: Enables support for one-phase transaction.

(b). Two-phase requester capability: Enables support for two-phase transactions.

b. Responder role: handles the transport functionality required to execute RSPQ-WQEs for the BE connection. Note the RSPQ-WQEs held in the RSPQ are produced by the Completer role for the same BE connection, in response to a received request message for a two-phase transaction. The responder role responsibilities are:

i. Generation of outbound response messages for two-phase transactions (source for the response flow).

ii. Segmentation of outbound response messages into response packets with unique PIDs and tracking all the outstanding response packets based on the received signaling for the response flow.

iii. Handling retransmission of response packets based on the received signaling for the response flow, i.e., tracking the state of each packet belonging to an outbound response message (Pkt-Rcvd, Pkt-Lost, Pkt-Dlvr, etc.).

iv. Handling the retirement of fully delivered and placed RSPQ-WQEs (i.e. pop completed WQEs from the RSPQ) when all the packets forming the outbound response messages reach Pkt-Dlvr state.

c. Completer role: handles the reception of request flows and response flows and the reliability protocol signaling functions (which enable the out-of-order reception requirements for BE). The completer role responsibilities are:

i. Reassembly of inbound request/response messages from the received request/response packets.

ii. Generation of signaling packets (according to the reliability protocol in use) for the inbound request/response flows.

iii. Handling the execution (take inbound request message to Msg-Exec state) of single-sided one-phase/two-phase transactions at the target node.

(a). Note that for two-phase transactions, the generation of a RSPQ-WQE and its submission to the local RSQP are required actions for the complete execution of the inbound request message at the target node.

iv. Handling the execution (take inbound request message to Msg-Exec state) and completion (generate CQE) of dual-sided one-phase transactions at the target node, i.e. placing and generating local completions for inbound request messages.

v. Handling the placement of single-sided two-phase transactions at the initiator node, i.e. the placement of inbound response messages.

vi. Handling the completion (generate CQE) of single-sided one-phase/two-phase transactions on the initiator node, as directed by the local Requester and handling the completion (generate CQE) of dual-sided one-phase transactions at the initiator node, as directed by the local Requester.

(a). One-phase transactions can be completed immediately when directed by the Requester.

(b). Two-phase transactions can be completed only after being directed by the Requester and having completely placed the associated inbound response message.

vii. The Completer role functionality can be split into two capabilities:

(a). Inbound request tracker: Enables support for request flow signaling on one-phase and two-phase transactions.

(b). Inbound response tracker: Enables support for response flow signaling on two-phase transactions.

Figure 5:
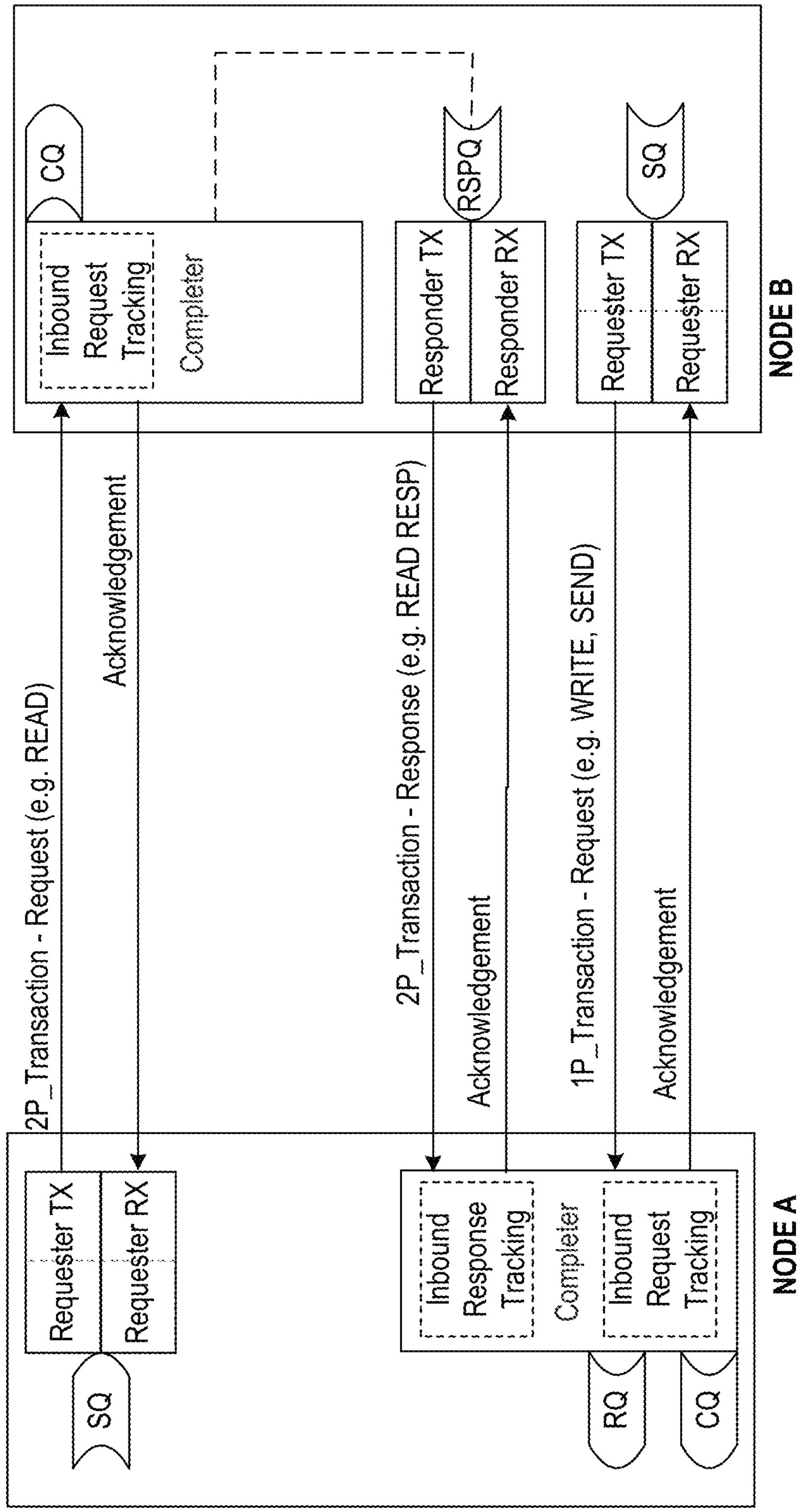
FIG. 5 illustrates nodes A and B having requester roles and node B having a responder role of a BE transport according to examples of the present invention.

2. The complete or extended BE transport may include an optional enhanced Verbs interface that allows end users to explicitly specify which one of the 15 node configurations for a BE connection, listed in Table 1, is to be supported on each created BE connection (see FIG. 4 and FIG. 5 for examples). Table 1 is meant to convey the resource requirements ('=0' indicates no resource is required, '=1' indicates resource is required). An extension to allow specifying the requester mode has been added: ReqMode: enum{FULL, 1P, 2P, NA}. ReqMode=FULL represents Full Requester which supports both one-phase and two-phase transactions. ReqMode=1P represents 1P Requester which supports one-phase transactions only. ReqMode=2P represents 2P Requester which supports two-phase transactions only. ReqMode=NA represents no Requester support (SQ must not be instantiated). Table 1 is not implying the actual Verbs API implementation.

TABLE 1

| BE Connection Configurations Enumerated Table | | | | | | |
|---|---|---|---|---|---|---|
| BE Node Configuration per Connection | Roles | Supported Operations | Required Resources | Verbs-extensions | Peer-node roles | Peer-node Operations |
| Full Bi-directional | Full Requester, Full Completer, Responder | Send, RDMA WRITE, RDMA READ/ATOMIC, RDMA READ/ATOMIC Response | SQ, RQ, RSPQ, CQ, Inbound request tracking, Inbound response tracking | CreateQP (ReqMode = FULL, SQ = 1, RQ = 1, RSPQ = 1, REQT = 1, RSPT = 1) | Full Completer, Responder, Full Requester | Send, RDMA WRITE, RDMA READ/ATOMIC, RDMA READ/ATOMIC Response |
| | Full Requester, Full Completer, Responder | Send, RDMA WRITE, RDMA READ/ATOMIC, RDMA READ/ATOMIC Response | SQ, RSPQ, CQ, Inbound request tracking, Inbound response tracking | CreateQP (ReqMode = FULL, SQ = 1, RQ = 0, RSPQ = 1, REQT = 1, RSPT = 1) | Full Completer, Responder, 2P Requester | RDMA READ/ATOMIC, RDMA READ/ATOMIC Response |
| Full Requester, Full Completer, Bi-directional | Full Requester, Full Completer | Send, RDMA WRITE, RDMA READ/ATOMIC | SQ, RQ, CQ, Inbound request tracking, Inbound response tracking | CreateQP (ReqMode = FULL, SQ = 1, RQ = 1, RSPQ = 0, REQT = 1, RSPT = 1) | Inbound request only Completer, Responder, 1P Requester | Send, RDMA WRITE, RDMA READ/ATOMIC Response |
| Full Requester, Rsp Completer, Bi-directional | Full Requester, Inbound response only Completer | Send, RDMA WRITE, RDMA READ/ATOMIC | SQ, CQ, Inbound response tracking | CreateQP (ReqMode = FULL, SQ = 1, RQ = 0, RSPQ = 0, REQT = 0, RSPT = 1) | Inbound request only Completer, Responder | RDMA READ/ATOMIC Response |
| 1P Requester, Responder, Req | 1P Requester, Inbound request only Completer, Responder | Send, RDMA WRITE, RDMA READ/ATOMIC Response | SQ, RQ, RSPQ, CQ, Inbound request tracking | CreateQP (ReqMode = P, SQ = 1, RQ = 1, RSPQ = 1, REQT = 1, RSPT = 0) | Full Completer, Full Requester | Send, RDMA WRITE, RDMA READ/ATOMIC |
| Completer, Bi-directional | 1P Requester, Inbound request only Completer, Responder | Send, RDMA WRITE, RDMA READ/ATOMIC Response | SQ, RSPQ, CQ, Inbound request tracking | CreateQP (ReqMode = 1P, SQ = 1, RQ = 0, RSPQ = 1, REQT = 1, RSPT = 0) | Full Completer, 2P Requester | RDMA READ/ATOMIC |
| 1P Requester, Req Completer, Bi-directional | 1P Requester, Inbound request only Completer | Send, RDMA WRITE | SQ, RQ, CQ, Inbound request tracking | CreateQP (ReqMode = 1P, SQ = 1, RQ = 1, RSPQ = 0, REQT = 1, RSPT = 0) | Inbound request only Completer, 1P Requester | Send, RDMA WRITE |
| 2P Requester, Responder, Full Completer, Bi-directional | 2P Requester, Full Completer, Responder | RDMA READ/ATOMIC, RDMA READ/ATOMIC Response | SQ, RQ, RSPQ, CQ, Inbound request tracking, Inbound response tracking | CreateQP (ReqMode = 2P, SQ = 1, RQ = 1, RSPQ = 1, REQT = 1, RSPT = 1) | Full Completer, Responder, Full Requester | Send, RDMA WRITE, RDMA READ/, ATOMIC RDMA READ/ATOMIC Response |
| | 2P Requester, Full Completer, Responder | RDMA READ/ATOMIC, RDMA READ/ATOMIC Response | SQ, RSPQ, CQ, Inbound request tracking, Inbound response tracking | CreateQP (ReqMode = 2P, SQ = 1, RQ = 0, RSPQ = 1, REQT = 1, RSPT = 1) | Full Completer, Responder, 2P Requester | RDMA READ/ATOMIC, RDMA READ/ATOMIC Response |

TABLE 1-continued

BE Connection Configurations Enumerated Table

| BE Node Configuration per Connection | Roles | Supported Operations | Required Resources | Verbs-extensions | Peer-node roles | Peer-node Operations |
|---|---|---|---|---|---|---|
| 2P Requester, Full Completer, Bi-directional | 2P Requester, Full Completer | RDMA READ/ ATOMIC | SQ, RQ, CQ, Inbound request tracking, inbound response tracking | CreateQP (ReqMode = 2P, SQ = 1, RQ = 1, RSPQ = 0, REQT = 1, RSPT = 1) | Inbound request only Completer, Responder, 1P Requester | Send, RDMA WRITE, RDMA READ/ ATOMIC Response |
| 2P Requester, Rsp Completer, Bi-directional | 2P Requester, Inbound response only Completer | RDMA READ/ ATOMIC | SQ, CQ, Inbound response tracking | CreateQP (ReqMode = 2P, SQ = 1, RQ = 0, RSPQ = 0, REQT = 0, RSPT = 1) | Inbound request only Completer, Responder | RDMA READ/ ATOMIC Response |
| Responder, Req Completer, Bi-directional | Inbound request only Completer, Responder | RDMA READ/ ATOMIC Response | RQ, RSPQ, CQ, Inbound request tracking | CreateQP (ReqMode = NA, SQ = 0, RQ = 1, RSPQ = 1, REQT = 1, RSPT = 0) | Full Requester, Inbound response only Completer | Send, RDMA WRITE, RDMA READ/ ATOMIC |
| Responder, Req Completer, Bi-directional | Inbound request only Completer, Responder | RDMA READ/ ATOMIC Response | RSPQ, Inbound request tracking | CreateQP (ReqMode = NA, SQ = 0, RQ = 0, RSPQ = 1, REQT = 1, RSPT = 0) | 2P Requester, Inbound response only Completer | RDMA READ/ ATOMIC |
| 1P Requester, Req Completer, Single direction | 1P Requester, Inbound request only Completer | Send, RDMA WRITE | SQ, CQ, Inbound request tracking | CreateQP (ReqMode = 1P, SQ = 1, RQ = 0, RSPQ = 0, REQT = 1, RSPT = 0) | Inbound request only Completer | N/A |
| Req Completer, Single direction | Inbound request only Completer | N/A | RQ, CQ, Inbound request tracking | CreateQP (ReqMode = NA, SQ = 0, RQ = 1, RSPQ = 0, REQT = 1, RSPT = 0) | 1P Requester, Inbound request only Completer | Send, RDMA WRITE |

Referring to FIG. 3, a CreateQP( ) command to produce the full capabilities would be CreateQP (ReqMode=Full, SQ=1, RQ=1, RSPQ=1, REQT=1, RSPT=1), provided by the host to the BE RDMA NIC at each peer node of the connection, which would result in a full Completer, a Responder, and a full Requester. The simplified 1P Requester, Request Completer, Bi-directional structure of FIG. 4 would be formed using a CreateQP (ReqMode=1P, SQ=1, RQ=1, RSPQ=0, REQT=1, RSPT=0) command provided by each host. The structure of FIG. 5 would be produced using a CreateQP (ReqMode=2P, SQ=1, RQ=1, RSPQ=0, REQT=1, RSPT=1) command at Node A for a 2P Requester, Full Completer, Bi-directional and a CreateQP (ReqMode=1P, SQ=1, RQ=0, RSPQ=1, REQT=1, RSPT=0) command at Node B for a 1P Requester, Inbound request only Completer, Responder. The use of the enhanced CreateQP( ) verb and operation according to FIG. 2D provides full flexibility of instantiated roles in the BE RDMA NIC.

Resources are allocated on demand, as illustrated by FIG. 2D. During the BE connection establishment, as in step 2300 of FIG. 2C, the two BE-capable nodes need to communicate and negotiate the required resources for the BE connection (note that BE connection establishment may be in-band, i.e. handled by the ROCE Communication Manager (CM) interacting with peer node via QP1, or out-of-band, i.e. through some alternate method like using LAN UDP packet exchange to setup the BE connection).

a. Requester role is optional. When it is required, depending on the need, there are three types to choose from. In any case, SQ resource is required to support a Requester role.

i. 1P Requester: Enables support for initiating one-phase transactions (e.g., Send, RDMA WRITE) by transmitting a request message.

ii. 2P Requester: Enables support for initiating two-phase transactions (e.g., RDMA READ/ATOMIC) by transmitting a request message.

iii. Full Requester: Enables support for initiating both one-phase and two-phase transactions by transmitting a request message.

b. Responder role is optional. When it is required, RSPQ is required for transmitting response messages for two-phase response transactions.

c. Completer role is mandatory. There are three types of Completer. In any case, at least one CQ and one or both inbound tracking resources are required to support a Completer role. When a BE node is set up to receive inbound dual-sided transactions, RQ resource is also required.

i. Inbound request only Completer: Supports local completions, remote completions for dual-sided transactions and inbound request tracking and its associated outbound signaling only.

ii. Inbound response only Completer: Supports local completions and in bound response tracking and its associated outbound signaling only.

iii. Full Completer: Supports local completions, remote completions for dual-sided transactions, inbound requests tracking, inbound responses tracking and their associated outbound signaling.

d. REQT: inbound requests tracking resource e. RSPT: inbound response tracking resource The operation of the enhanced CreateQP( )command allows full control over the functions present for the designated RDMA connection, allowing each RDMA connection to be optimized to minimize used NIC resources.

Flow Interleaving

The complete or extended BE transport may include BE connection flow interleaving, where the BE transport interleaves the request flow and the response flow transmission over the same connection protected by the same reliability protocol. This interleaving is only supported when the local node's connection is set up to include both the Requester role and the Responder role. The following interleaving options are supported by the BE transport:

1. Interleave at message boundary (legacy): This interleaving mode is taken from iWARP. An example is provided in FIG. 12A. It utilizes sharing PID space between both flows. The PID format for this mode is equivalent to the legacy PSN (packet sequence number), so at the receiver of the peer node only a single stream of packets must be tracked. Note that in this mode, packets belonging to dual-sided one-phase request messages and single-sided two-phase response messages will need to carry an IMPN field to enable out-of-order placement (single-sided one-phase/two-phase request messages won't need IMPN).
2. Interleave at packet boundary (extended): This interleaving mode allows for one request flow message and one response flow message to be streamed out simultaneously by interleaving them at the packet level while sharing the PID space. An example is provided in FIG. 12B. This mode requires higher complexity at the receiver node of a flow as it needs to track two interleaved packet streams over the same PID space which need to be demultiplexed. Given that the PID space is shared, cumulative signaling packets (i.e. ACK and NAK) can carry independent PIDs for the request and response flows. The PID format for this mode requires three data fields:

a. MID: message identifier. Each new message to transmit (be it request or response message) shall allocate the immediate next MID. (MIDs are incremental).

b. IMPN: intra message packet number.

i. For valid packets, IMPN must be less than PKTCOUNT.

c. PKTCOUNT: message packet count for messages.

Note that in this mode, packets will not need to carry extra control information to enable out-of-order placement (i.e. dual-sided one-phase request messages and single-sided two-phase response messages).

Note that this mode may be modified in alternate examples by removing PKTCOUNT from every request packet and including PKTCOUNT only in the first packet of the message (i.e. IMPN=0). This would lead to bandwidth savings but could imply a longer latency to detect a packet drop for the last packet in a message (i.e. IMPN=PKTCOUNT-1) when the first packet is lost (e.g. the device needs to request the retransmission of the first packet in the message in order to figure out the packet count of the message, to finally verify that there is no last packet dropped in the message).

3. Independent PID spaces: This interleaving mode allows for one request flow message and one response flow message to be streamed out simultaneously by interleaving them at the packet level while each flow uses an independent PID space. An example is provided in FIG. 12C. This duplicates the state tracking required when both flows (request flows and response flows) to be supported in a node, either as a sender or as a receiver. Given that the PID spaces are independent, cumulative signaling packets (i.e. ACK and NAK) must carry independent PIDs for the request and response flows. The PID format for this mode utilizes the PSN and infers a FlowID from the BTH.OPCODE:

PID: {FlowID, PSN}, where FlowID can be inferred from the BTH.OPCODE, as selected opcodes are requester only opcodes and selection opcodes are responder only opcodes.

Note that a single (chosen) interleaving option shall be used in any particular BE connection. In some examples the interleaving option may vary between individual BE connections of a BE RDMA NIC and in other examples the interleaving option is the same for all individual BE connections of a BE RDMA NIC.

With the use of additional header fields and alternative meanings of other header fields, interleaving of request and response packets can be done at the packet level, not the message level, reducing blocking latency between outbound request flow messages and outbound response flow messages.

Reliability Protocol

The complete or extended BE transport includes a new reliability protocol based on four signaling packets (feedback from receiver to sender), namely Acknowledge (ACK), Reception-Acknowledge (RACK), Not-Acknowledge (NAK), and Selective Not-Acknowledge (SNAK):

1. NAK is legacy and signals GoBackN with implicit (cumulative) delivery acknowledgement for one PID prior to the indicated PID. NAK can only be issued once (and relies on RTO if lost).
2. SNAK signals holes (packet loss) in the received PID stream, i.e. transition to Pkt-Lost state, without any implicit acknowledgement context and it can be issued multiple times to prevent RTO. The Pkt-Lost state implies eligibility for retransmission for the associated PID.

a. SNAK packets can carry a finite number of PID fields, which can be flexibly allocated to indicate the existence of multiple disjoint holes in the PID stream. The SNAK packet may signal each of the holes in three modes: point-hole (single PID hole, which consumes one PID field in the SNAK packet), range-hole (multiple contiguous PIDs in the hole, which consumes two PID fields in the SNAK packet), and infinite-hole, which represents a range-hole for a left-closed and right-open interval (BTH's PID/PSN field consumed to indicate the left-side closed boundary of the infinite-hole, i.e. the first PID in the infinite-hole, with another field explicitly indicating this PID field should be considered an infinite-hole start PID) and consumes a single PID field in the SNAK packet. Note that this document uses the term 'non-infinite-holes' to refer to hole of either point-hole type or range-hole type.

i. Receiver must issue SNAKs indicating the single newest hole in the PID stream while in ACTIVE superstate and must issue SNAKs indicating infinite-hole in RECOVERY superstate. Receiver may include in the SNAKs as many as possible of the older holes in the PID stream. The number of holes indicated in the SNAK packet beyond the single newest hole in ACTIVE superstate or the infinite-hole in RECOVERY superstate can be set based on a policy present in the BE RDMA NIC.

ii. Sender, upon receiving a SNAK for a new non-infinite-hole in the PID stream, can selectively retransmit the packets associated with the hole in the PID stream.

b. SNAKs with an infinite-hole indication signal the depletion of the Receiver's out-of-order (OOO)-tracking resources for its inbound (request or response) flow. Out-of-order tracking resources are limited as the SOC 201 has a finite of memory that can be allocated for this purpose.

i. Receiver must issue a SNAK with infinite-hole when its OOO-tracking resources are depleted, indicating the first PID for the infinite-hole.

ii. Sender must stop tracking PIDs within the infinite-hole (as these are not tracked by the Receiver and if received by Receiver would result in the packet being dropped):

(a). New PIDs (i.e. traffic that has not been transmitted before) always belong to the infinite-hole and therefore shall not be eligible for first-time transmission while the infinite-hole exists.

(b) Previously transmitted PIDs which are within the infinite-hole should not be tracked in Pkt-Lost state as they should not be eligible for retransmission.

c. SNAK packet can signal point-holes, range-holes, an infinite-hole or a mixture of them, i.e. the SNAK packet fields can be allocated flexibly for either case.

i. Note that the same PID may be signaled differently in SNAKs at distinct times, e.g. it may be signaled as a point-hole first and later as either an end of a range-hole or be implicitly covered by the range-hole (without it being any of the end points of the range).

3. ACK is legacy and signals multi-packet (cumulative) in-order delivery, i.e., transition to the Pkt-Dlvr state (which implies reception, i.e. an implied transition to the Pkt-Rcvd state followed by an immediate transitioning to the Pkt-Dlvr state).

4. RACK signals multi-packet (non-cumulative) out-of-order reception, i.e., transition to Pkt-Rcvd state only.

a. RACK shall be signaled for each OOO-received packet, once and only once with a byte count greater than zero. RACK can repeat signaling of an OOO-received packet but the byte count of the repeat signaling shall be zero.

b. RACK indicates the amount of bytes that have been OOO-received, which informs the sender about the amount of traffic that has stopped being inflight (has made it out of the network).

i. The sender's congestion control (CC) may use the RACK information towards enabling the transport to continue forward progress (i.e., inform CC about packets that have made it out of the network successfully, e.g. to replenish congestion window). There are no requirements whatsoever to the CC mechanisms.

c. RACK signaling is best-effort (may be lost in the network). Even when the RACK may be lost, eventually an ACK will implicitly signal the same reception (because delivery implies reception) once prior holes have been delivered. This guarantees that the sender will (eventually) receive notification of all packets that left the network even if RACKs are lost.

i. If the sender's CC is configured to use the RACK's bytecounts, e.g. to replenish the congestion window, then it must also use the ACK information to prevent congestion window leakage due to RACK loss, while avoiding duplicate congestion window replenishment.

d. The RACK packet can optionally indicate multiple OOO-received PIDs (requiring a larger packet to carry this information). Again, the option is on a connection basis, not a packet-by-packet basis. There are two modes to encode PIDs in the RACK packet: point-PID receptions (single received packet, consumes one PID field in the RACK packet) or range-PID receptions (multiple contiguous received packets, consumes two PID fields in the RACK packet). Note that a single RACK packet can provide a mixture of the modes, e.g. the PID fields for OOO-received packets can be allocated flexibly for either case.

i. RACK carried PIDs allow for the Sender to track which packets have been OOO-received by Receiver. There are two (non-mandatory) uses for this optional feature in the Sender side:

(a). Optimizing selective retransmissions (stop retransmitting a previously lost packet once it has been RACKed) by transitioning the state for the tracked PID from Pkt-Lost to Pkt-Rcvd, thus ignoring posteriorly received SNAKs with non-infinite-holes covering the same PID (these would be a protocol error or a network flow reordering issue).

(b). Allows for updating the tracked PID for the tail packet, i.e. if the old tail packet's PID has been RACKed and a prior PID has been SNAKed, then the SNAKed PID becomes the new tail packet's PID.

ii. RACK's multi-packet characteristic allows for the Receiver (issuer of RACK packets) to coalesce OOO-received packets before issuing a RACK, if so desired, in order to reduce the BW consumption used for signaling.

e. Sender is free to decide when to selectively retransmit packets signaled (SNAKed) as holes in the PID stream. Some options are offered as examples:

i. Sender decides to retransmit every signaled hole on every received SNAK packet.

(a). This option does not require any new state tracking in the Sender side.

(b). This option provides the highest possible redundancy that can be driven by the protocol signaling only, thus increasing the likelihood of delivery for a hole in the PID stream.

(c). This option results in high potential wasted bandwidth by duplicated retransmissions of the same packet.

ii. Sender may decide to retransmit signaled holes received in SNAK packets at most a configurable number of times per RTT.

(a). This option uses new state for tracking PIDs that have outstanding retransmissions in the sender side.

(b). An elapsed RTT-interval can be approximated by receiving a signaling packet (ACK/RACK/SNAK) for the highest transmitted PID prior to the first retransmission of the hole.

(i). This option provides a limited redundancy driven by the protocol signaling only.

(ii). This option provides an upper-bound to the wasted bandwidth by duplicated retransmissions of the same packet.

(c). An elapsed RTT-interval can be approximated by using timers or timewheels.

(i). This option provides a deterministic redundancy independent of the protocol signaling.

(ii). This option provides a deterministic bandwidth utilization by duplicated retransmissions of the same packet.

(iii). This option requires extra time-keeping state or mechanisms.

f. Optionally, Sender and Receiver may negotiate the number of tracking resources at each peer (hole tracking at Receiver, retransmission tracking at Sender) in order choose the optimal packet-format for RACKs and SNAKs (carrying enough PIDs but not more than what can be exploited at both ends).

Packet Formats

Example packet formats for request and response packets and reliability signaling packets are provided in FIGS. 10A-10F and 11A-11F. FIGS. 12A-12C are example packets containing relevant numerical values for various header fields to illustrate the interleaving options.

Figure 10:
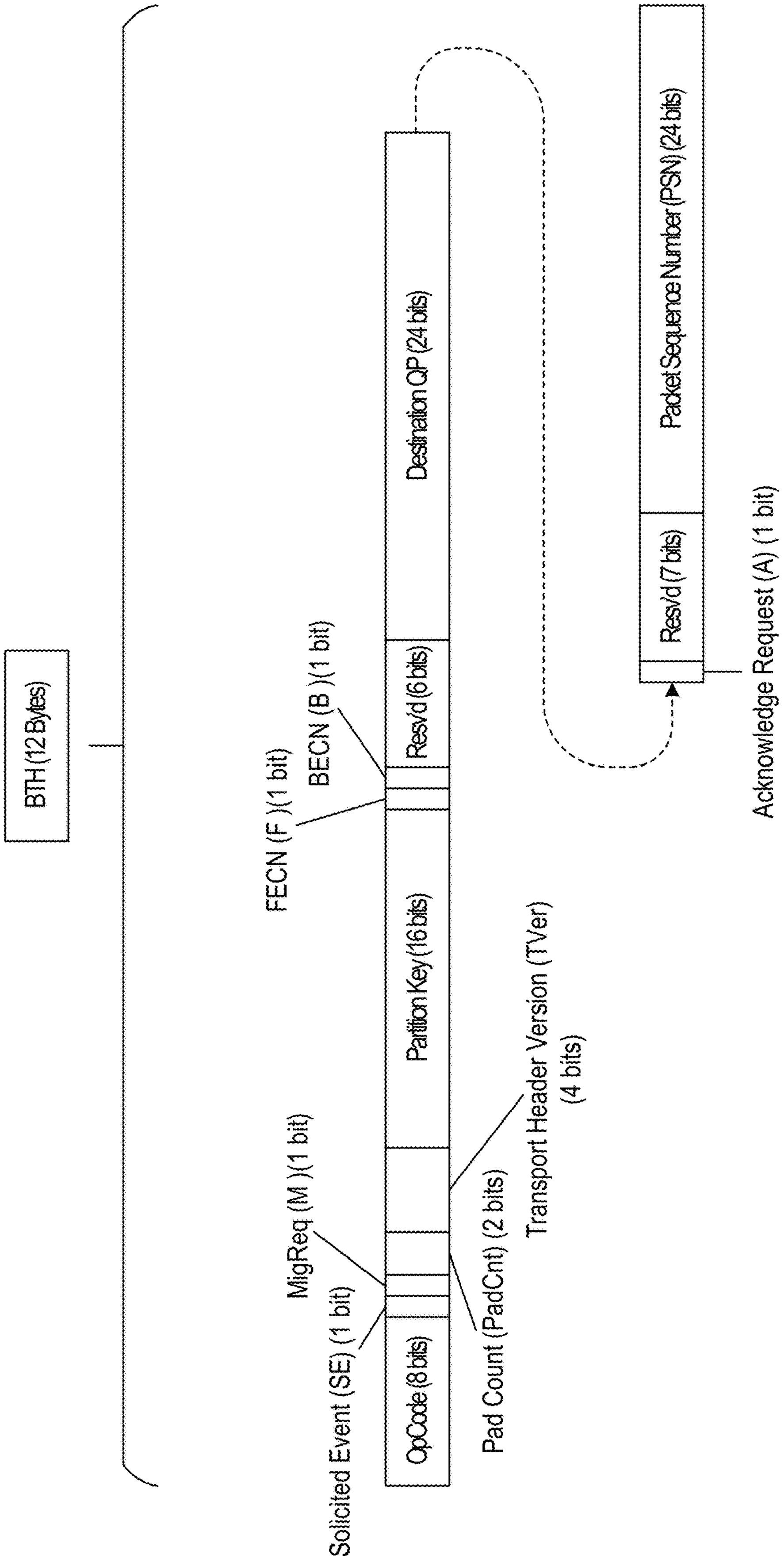
FIG. 10 is an illustration of a base transport header (BTH) as used in RDMA operations.

Details on the base transport header (BTH) are illustrated in FIG. 10. All fields except for the PSN field are used conventionally in BE RDMA operations. As discussed above, in some instances the PSN field can indicate PID and in other instances can represent MID.

Figure 10A:
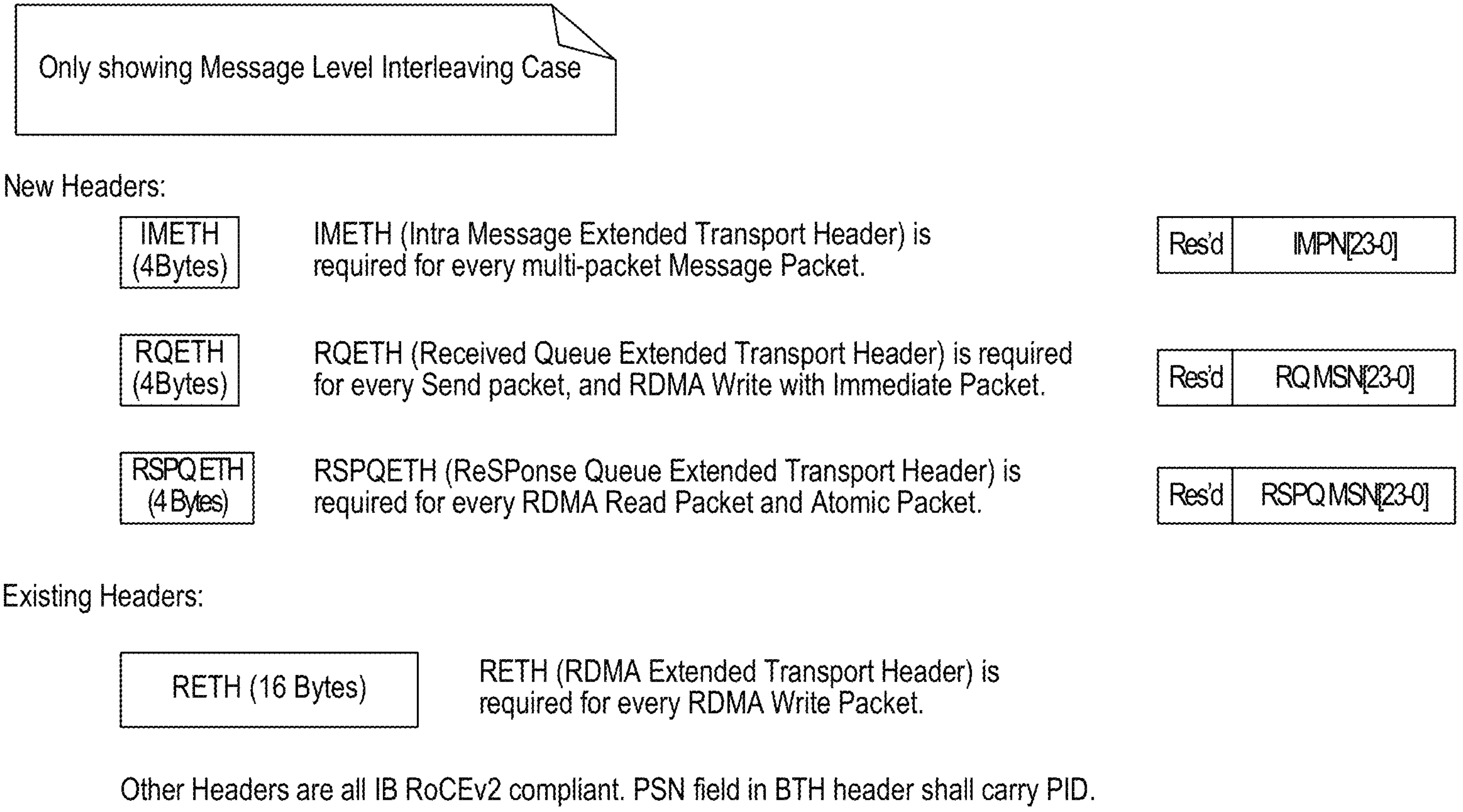
FIGS. 10A-10F illustrate packet formats for transaction packets using message level interleaving according to examples of the present invention.

Referring to FIGS. 10A-10F and 11A-11C, legacy or message level interleaving headers are illustrated. Referring to FIG. 10A, three new headers are provided, IMETH, RQETH and RSPQETH. The IMETH (Intra Message Extended Transport Header) is required for every multi-packet Message Packet whose current header fields cannot provide hints on "offset" for a certain packet within a message and carries the IMPN. The RQETH (Received Queue Extended Transport Header) is required for every operation that requires consumption of an RQ WQE on the target, such as SEND packets and RDMA WRITE with IMMEDIATE Packets, and carries the RQMSN. The RSPQETH (ReSPonse Queue Extended Transport Header) is required for any request message that would require responses, with examples being RDMA READ Packet and ATOMIC Packet, and carries the RSPQMSN. In addition, the RETH (RDMA Extended Transport Header) is required for every RDMA WRITE and RDMA READ Request Packet and carries the virtual address of the RDMA operation, the remote key and the DMA length.

Figure 10B:
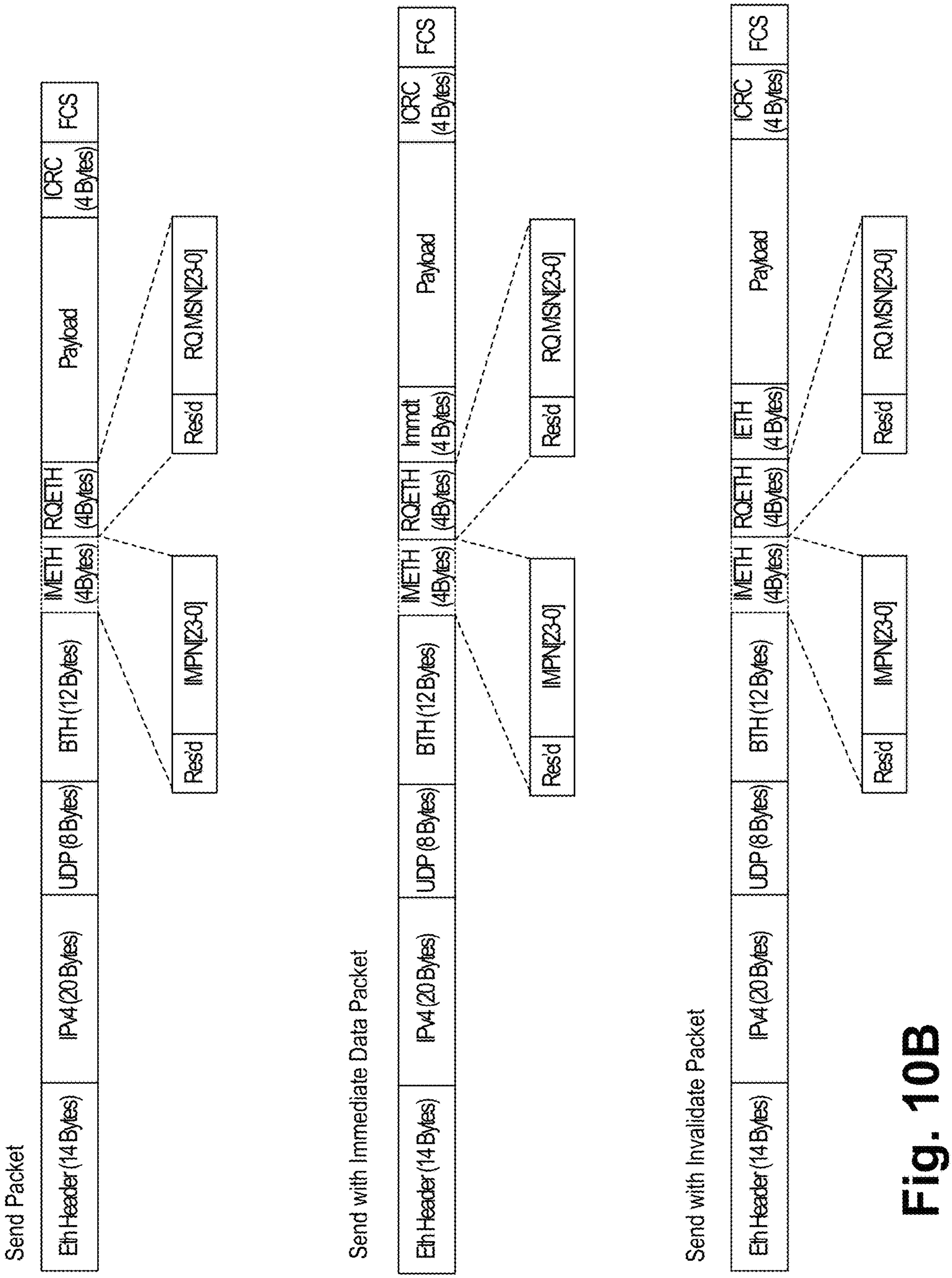
Figure 10C:
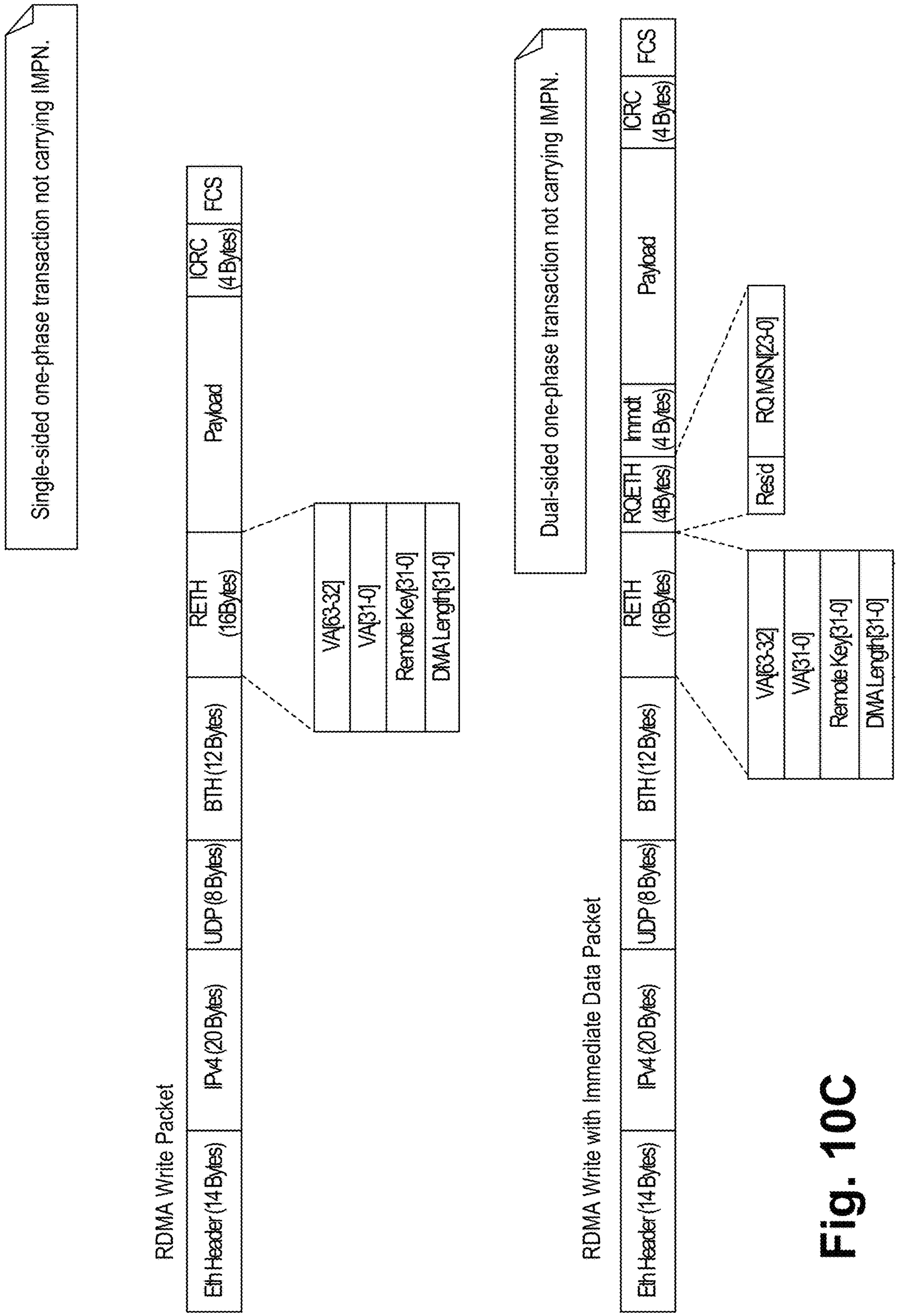
Figure 10D:
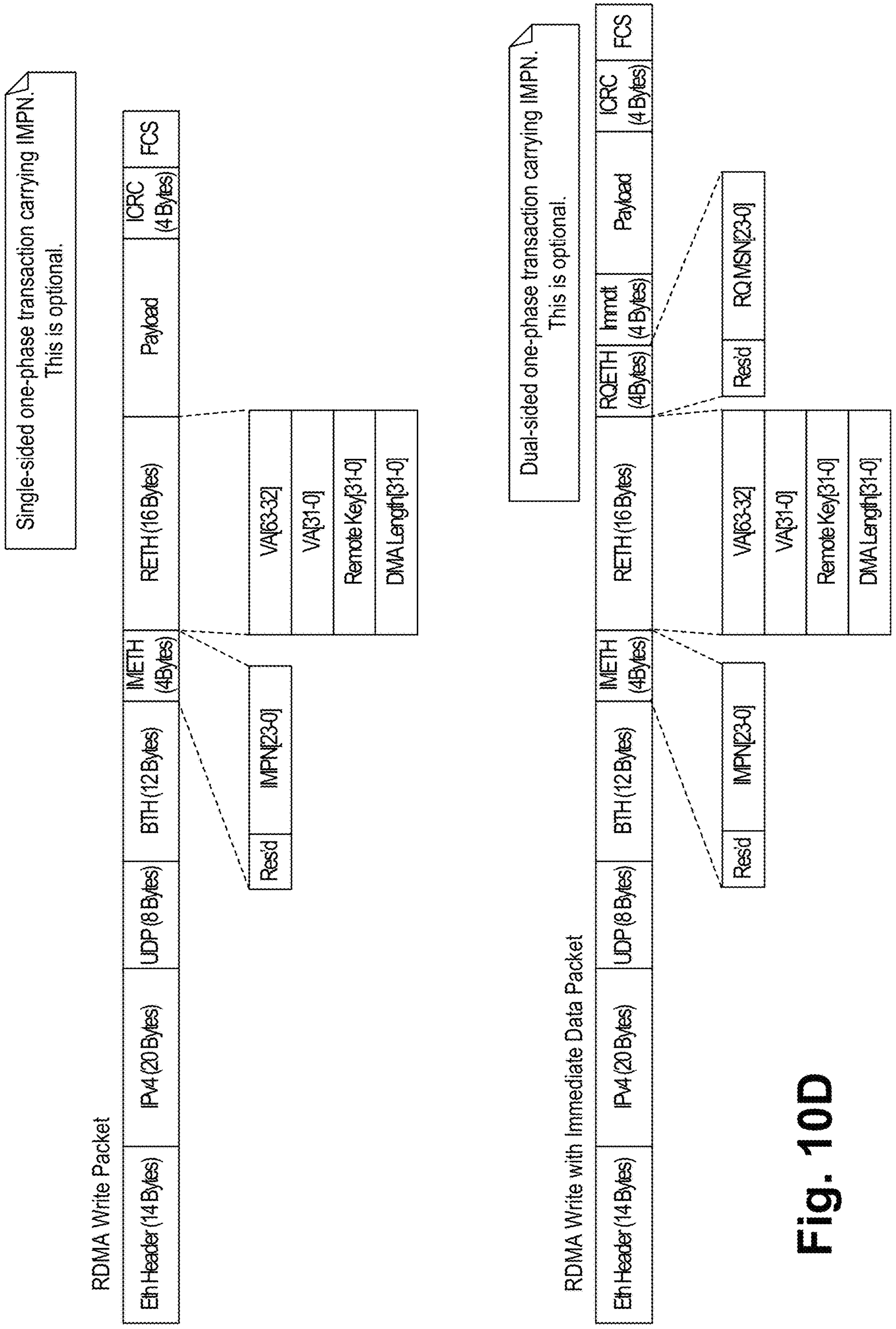
Figure 10E:
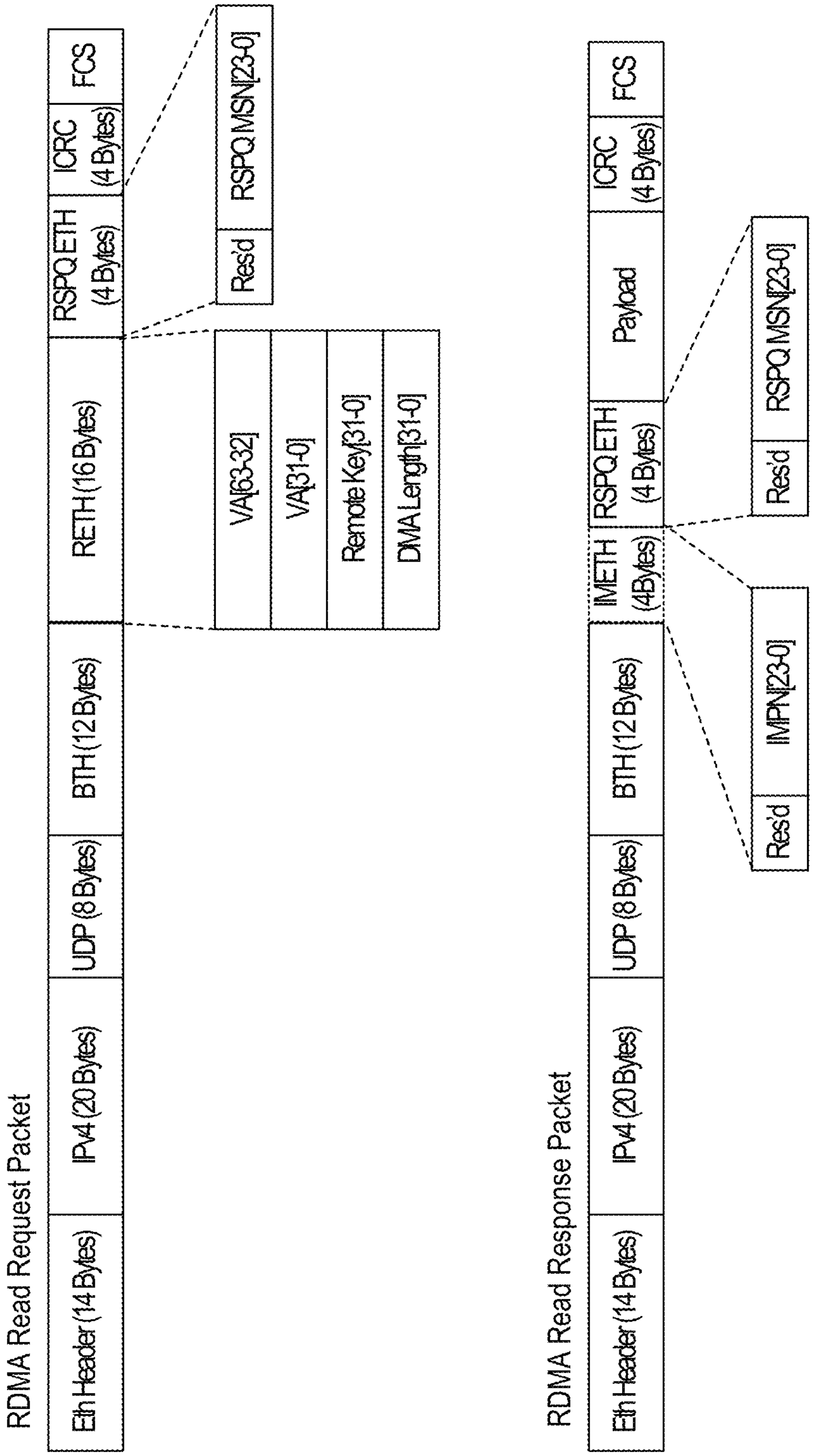
Figure 10F:
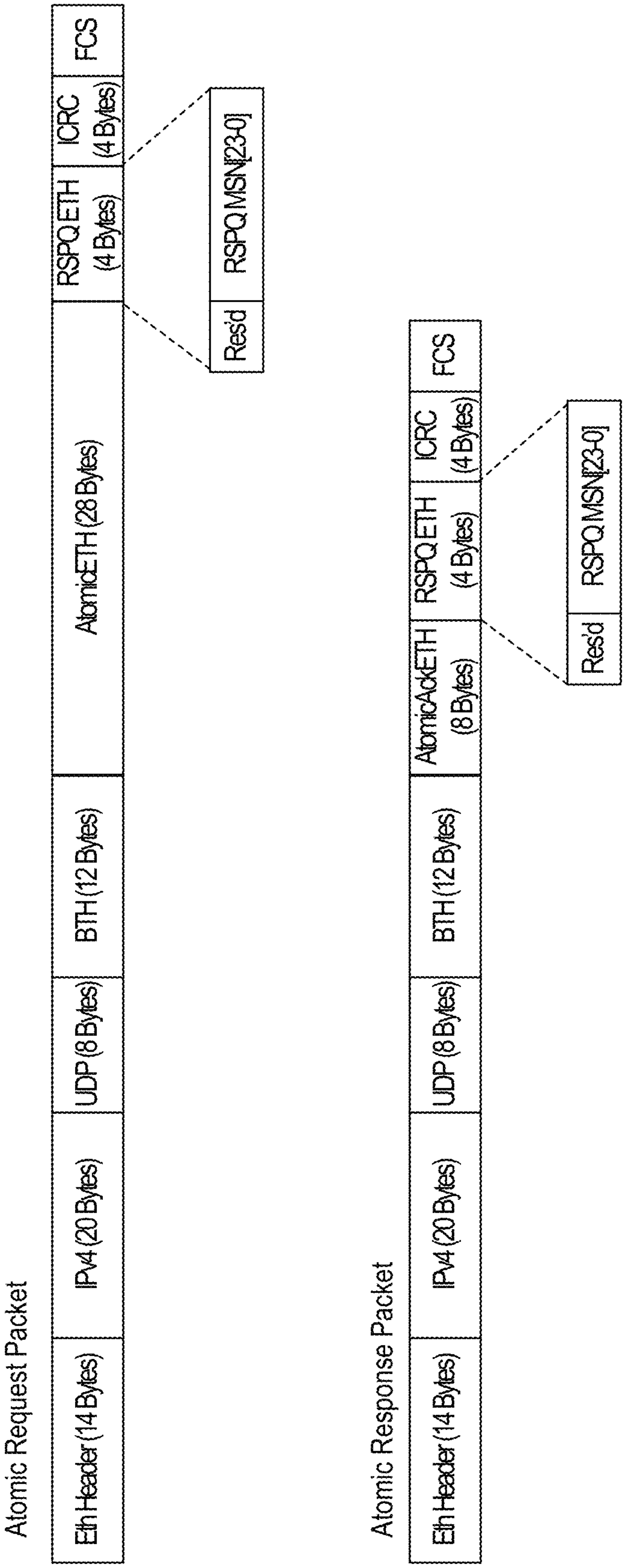

FIG. 10B illustrates three variations of SEND packets. The RQETH header is required in all three variations, but the IMETH header is optional for single packet messages. Again, the option is on a connection basis, not a packet-by-packet basis. FIGS. 10C and 10D illustrate two variations of RDMA WRITE packets. The packets in FIG. 10C do not include the IMETH header, while the packets in FIG. 10D include the IMETH header. Use of the IMETH header is optional. As above, IMETH header is optional in single packet messages. Again, the option is on a connection basis, not a packet-by-packet basis. FIG. 10E illustrates the RDMA READ request and RDMA READ Response packets. The RSPQETH header is used to provide the RSPQMSN used to match the response packets to the request packet. FIG. 10F illustrates the ATOMIC Request and Response packets. Here also the RSPQETH header is used to provide the RSPQMSN used to match the response packets to the request packet.

Figure 11A:
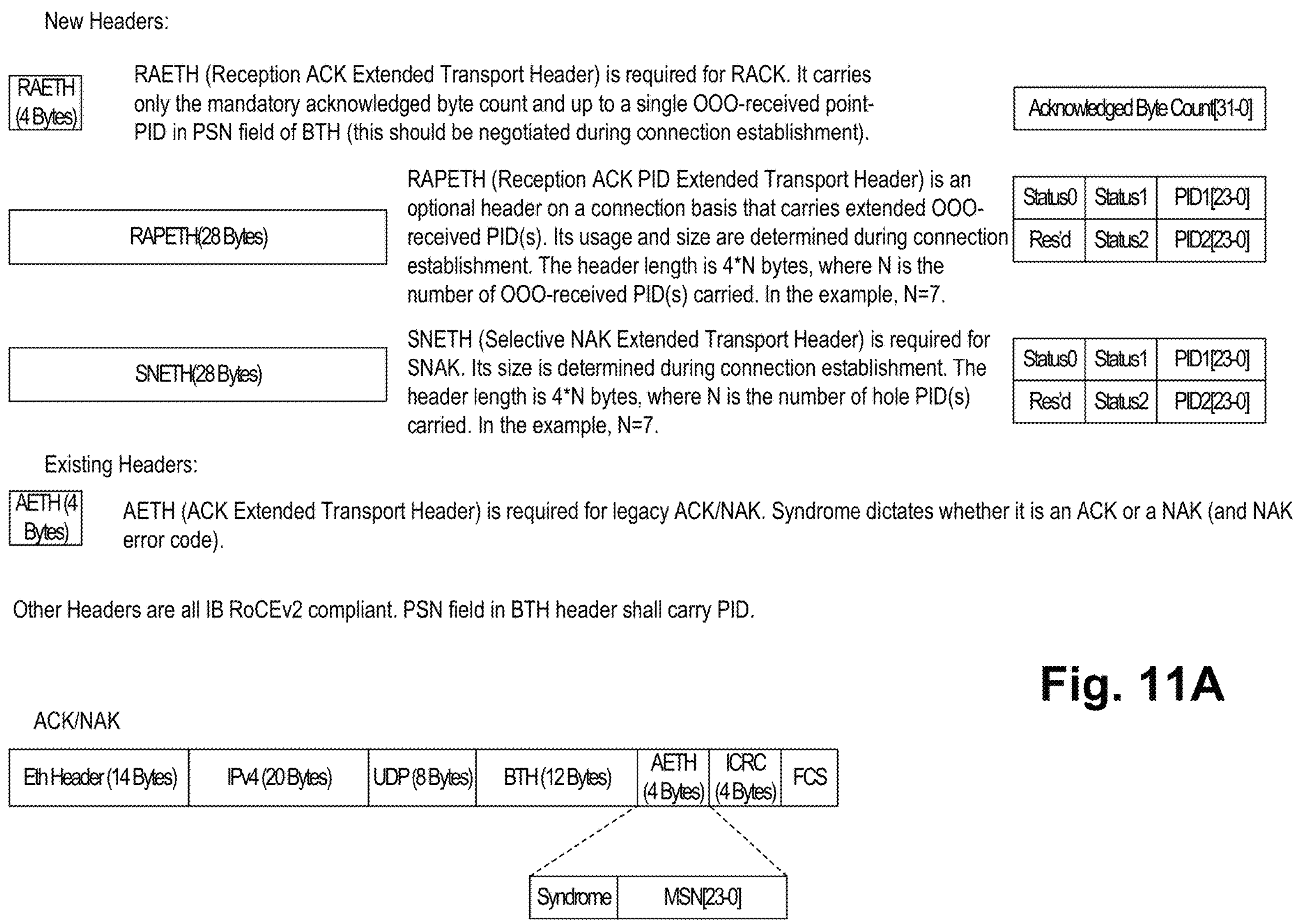
FIGS. 11A-11C illustrate packet formats for reliability protocol packets using message level interleaving according to examples of the present invention.
Figure 12A:
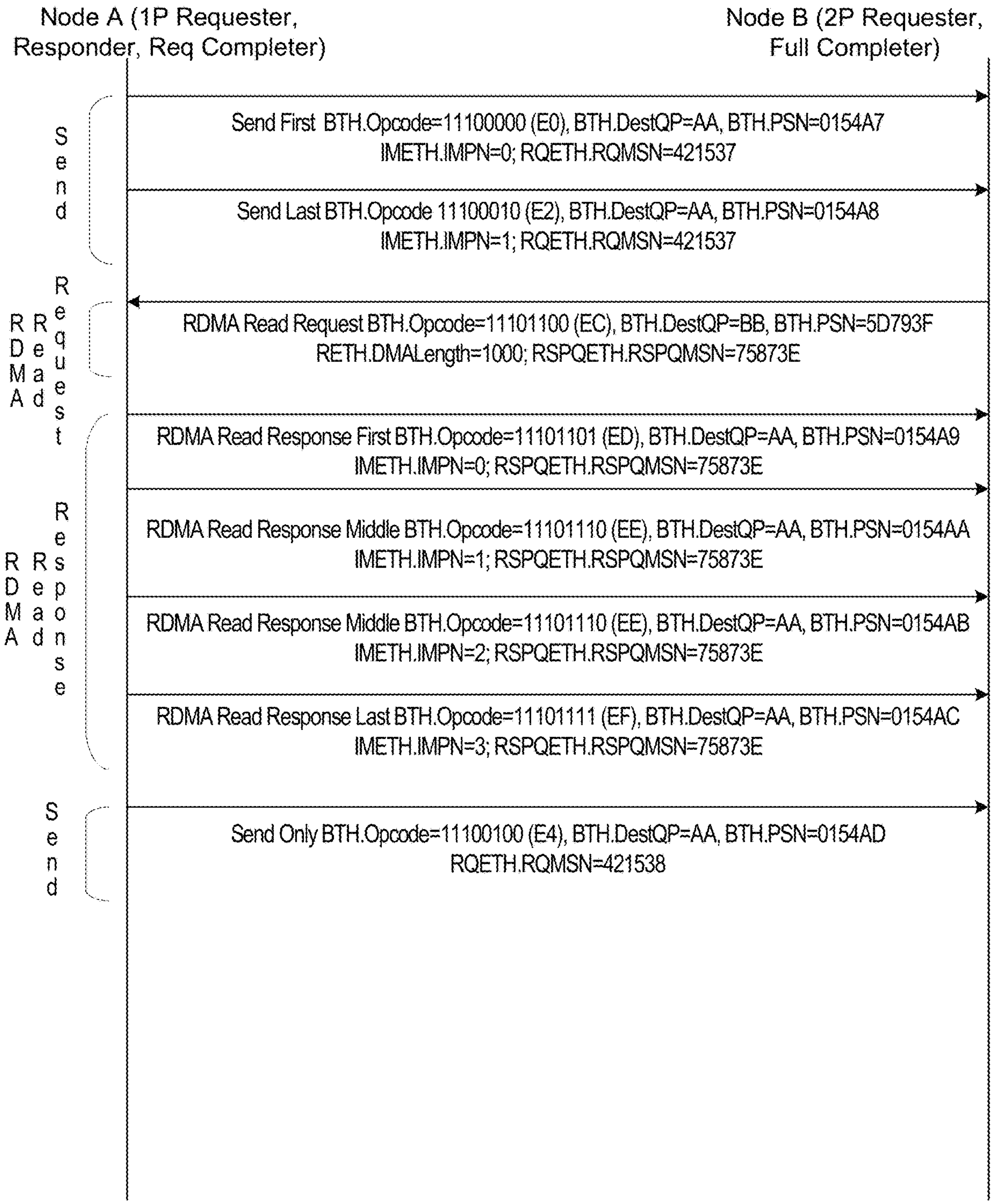
FIG. 12A is an illustration of certain header values in example packets used in message level interleaving RDMA operations according to examples of the present invention.
Figure 12B:
FIG. 12B is an illustration of certain header values in example packets used in packet level interleaving RDMA operations according to examples of the present invention.
Figure 12C:
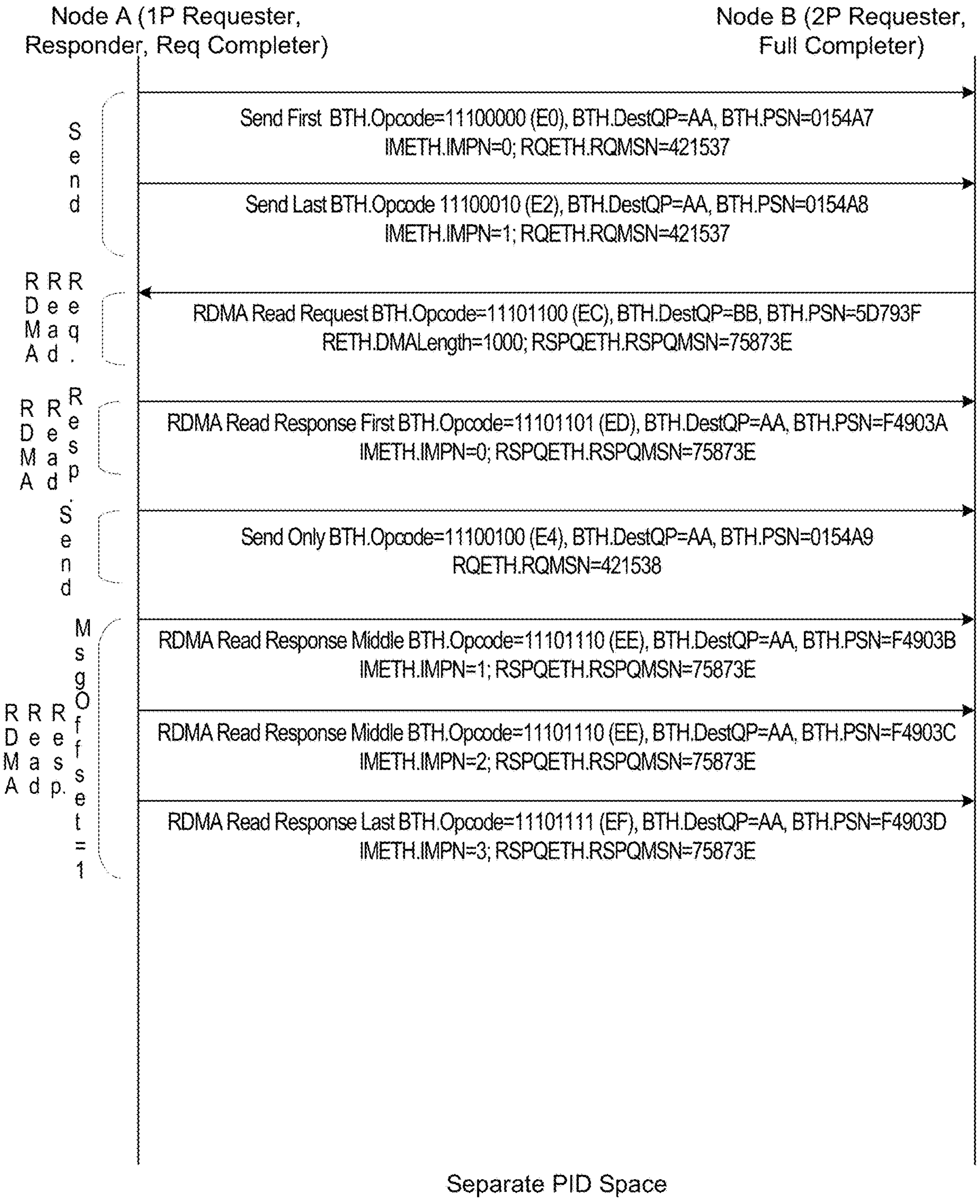
FIG. 12C is an illustration of certain header values in example packets used in separate PID space interleaving RDMA operations according to examples of the present invention.

Referring to FIG. 11A, three new headers used in the reliability signaling packets are illustrated, RAETH, RAPETH and SNETH. The RAETH (Reception ACK Extended Transport Header) is required for RACK. It carries only the mandatory acknowledged byte count and up to a single OOO-received point-PID in PSN field of BTH (this should be negotiated during connection establishment). Acknowledged byte count indicates the amount of payload bytes that have been OOO-received at the Receiver node. The byte count could coalesce the payloads of multiple OOO-received packets, typically received back-to-back in a burst. The RAPETH (Reception ACK PID Extended Transport Header) is an optional header on a connection basis that carries extended OOO-received PID(s). Its optional usage and size are determined during connection establishment. The header length is 4*N bytes, where N is the number of OOO-received PID(s) carried. Each Status(n) [3-0] field provides {Valid(1), Rsvd(1), PIDType(2)}, where PIDType: enum{POINT, RANGE-START, RANGE-END}. The status0 field relates to the PID carried in the BTH field of the header. The SNETH (Selective NAK Extended Transport Header) is required for SNAK. Its size is determined during connection establishment. The header length is 4*N bytes, where N is the number of hole PID(s) carried. Each Status(n) [3-0] field provides {Valid(1), Rsvd(1), PIDType(2)}, where PIDType: enum{POINT, RANGE-START, RANGE-END, INFINITE-START} for the related PID. The status0 field relates to the PID carried in the BTH field of the header.

Figure 11B:
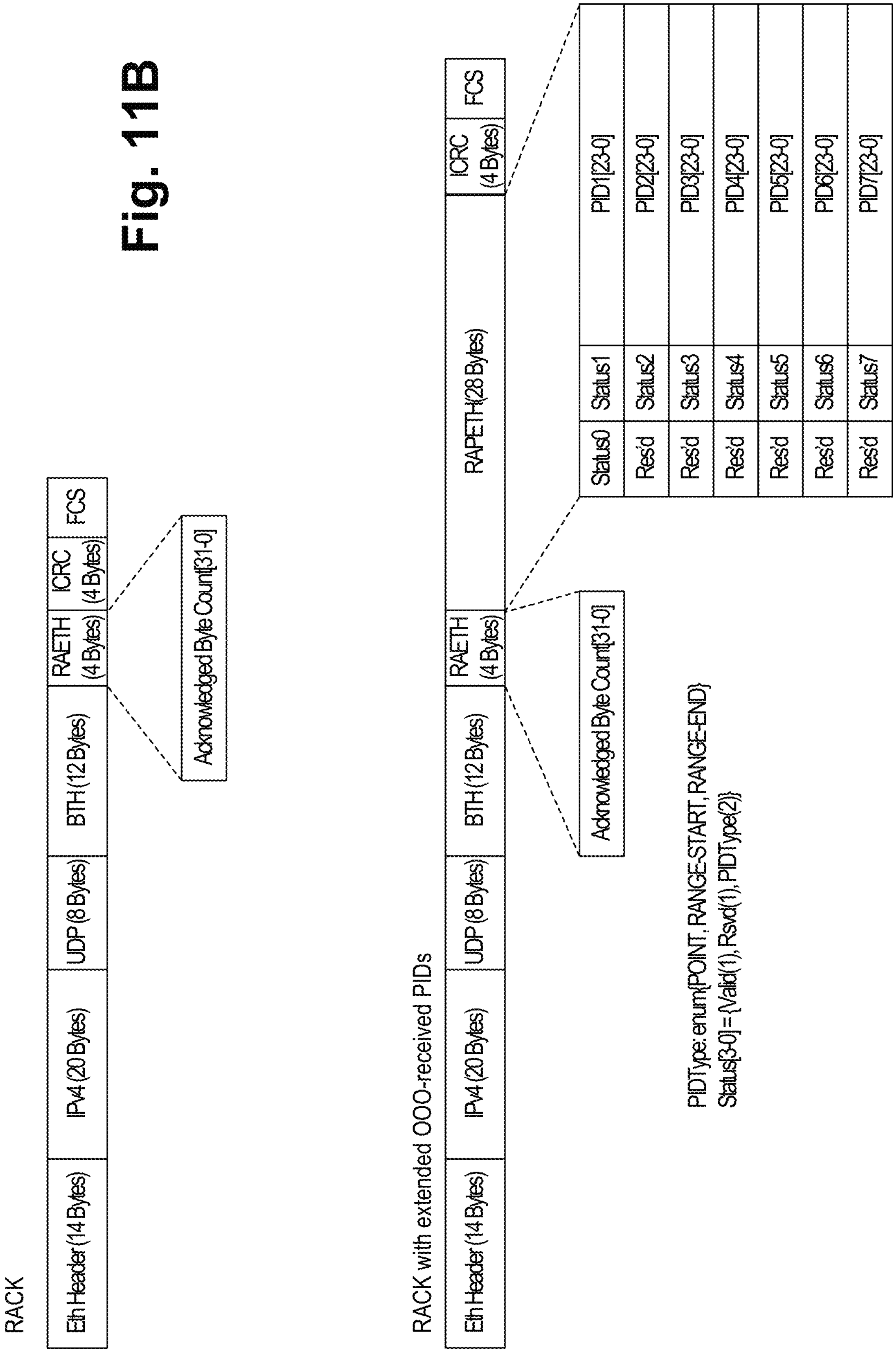
Figure 11C:
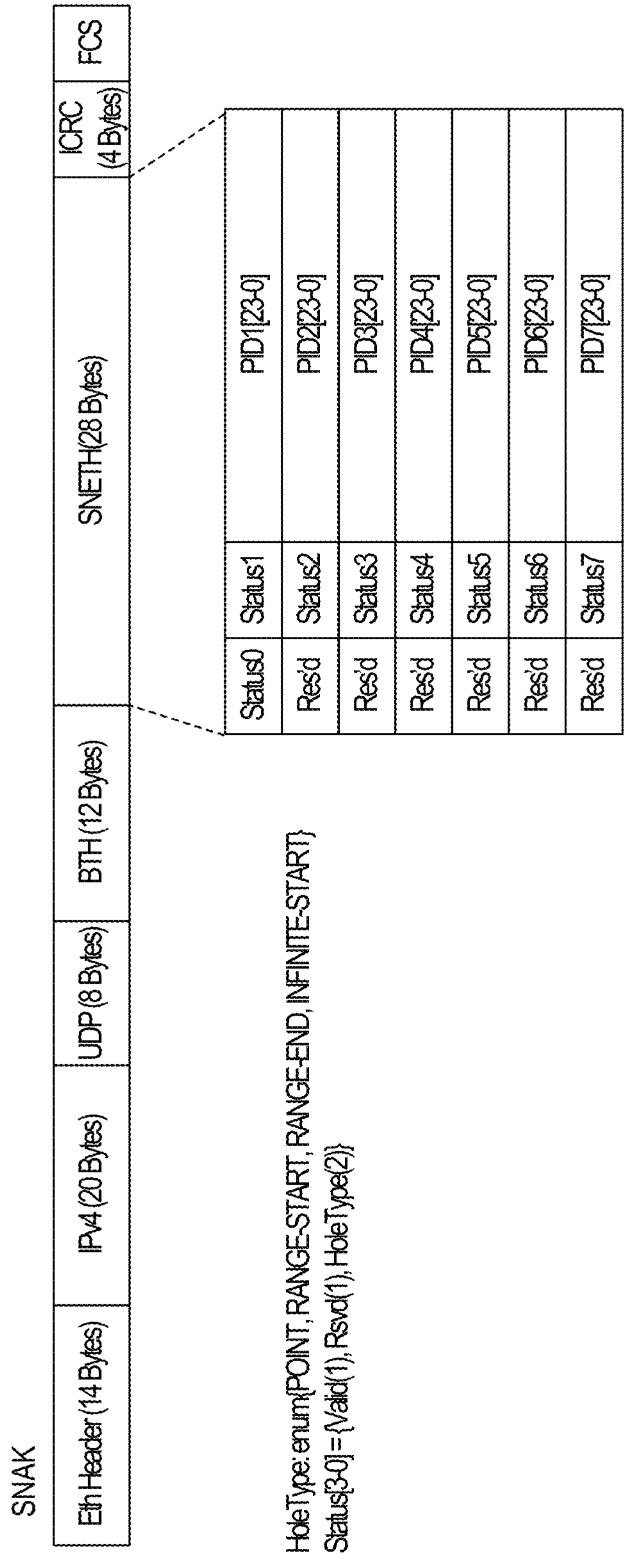

FIG. 11A also illustrates an ACK/NAK packet, which is conventional. FIG. 11B illustrates two versions of RACK. The top version provides a single packet acknowledgement, while the lower version is used for acknowledging a series of packets with included point OOO-received PIDs or range OOO-received PIDs. FIG. 11C illustrates the SNAK. A SNAK always indicates the newest hole and as many prior holes or ranges as desired. In most examples, SNAK is also used to indicate an infinite-hole, with the PID value being the first packet in the infinite-hole. In some examples a different, dedicated packet type instead of SNAK can be used to indicate infinite-holes, a value such as IHAK for infinite-hole acknowledge, along with the relevant starting PID.

Figure 11E:
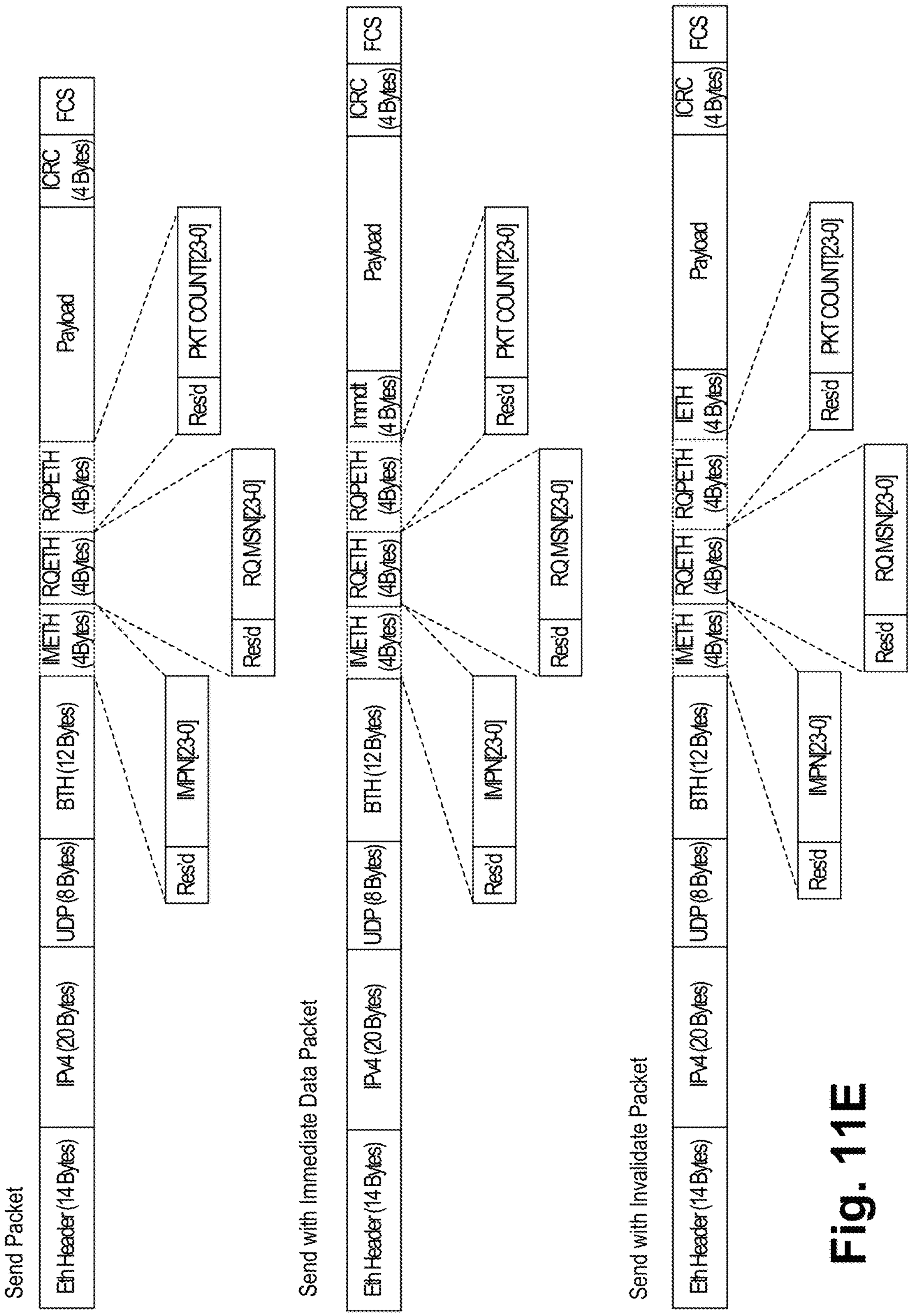
Figure 11F:
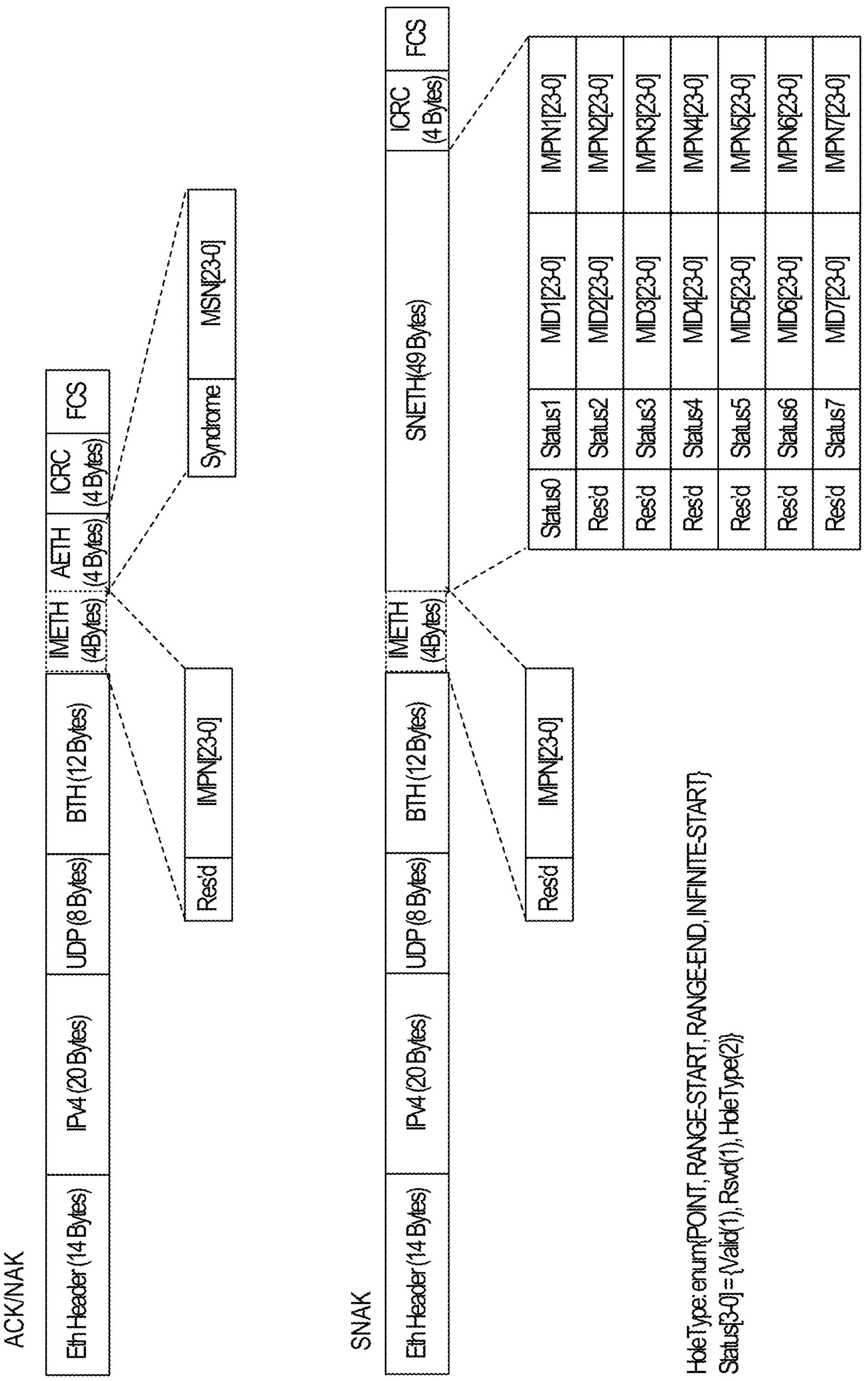
FIGS. 11F and 11G illustrate packet formats for reliability protocol packets using packet level interleaving according to examples of the present invention.

Referring to FIGS. 11D-11F, header changes for packet level interleaving are illustrated. A new header, RQPETH is utilized. The RQPETH (Received Queue Packet-level-interleaving Extended Transport Header) is mandatory for any data-carrying multi-packet message, either request-flow or response-flow, packets that do not already include message size information, an example being SEND packets for a multi-packet SEND Message. It is optional for a single-packet SEND Message. Again, the option is on a connection basis, not a packet-by-packet basis. It carries a 24-bit PKTCOUNT field to provide message size in number of packets. In addition, fields in existing headers have changed meanings. PID becomes {MID, IMPN}, which is 48 bits instead of 24 bits. MID is a 24-bit Message ID, which is carried in BTH.PSN. IMPN is a 24-bit Intra Message Packet ID carried in IMETH. IMETH is required for all packets for multi-packet messages. IMETH is optional for packets for a single-packet message, e.g., RDMA READ Request. When it is not present, PID is implied to be {MID, 0}. Operations that do not include a message size or length information in pre-existing headers, such as a SEND Packet for a multi-packet SEND Message, must carry RQPETH. IMETH is required for all Signaling Packets to correctly indicate the first PID being signaled as {BTH.PSN, IMETH.IMPN}. RAPETH and SNETH grow as PID grows from 24 bits to 48 bits.

Figure 11G:
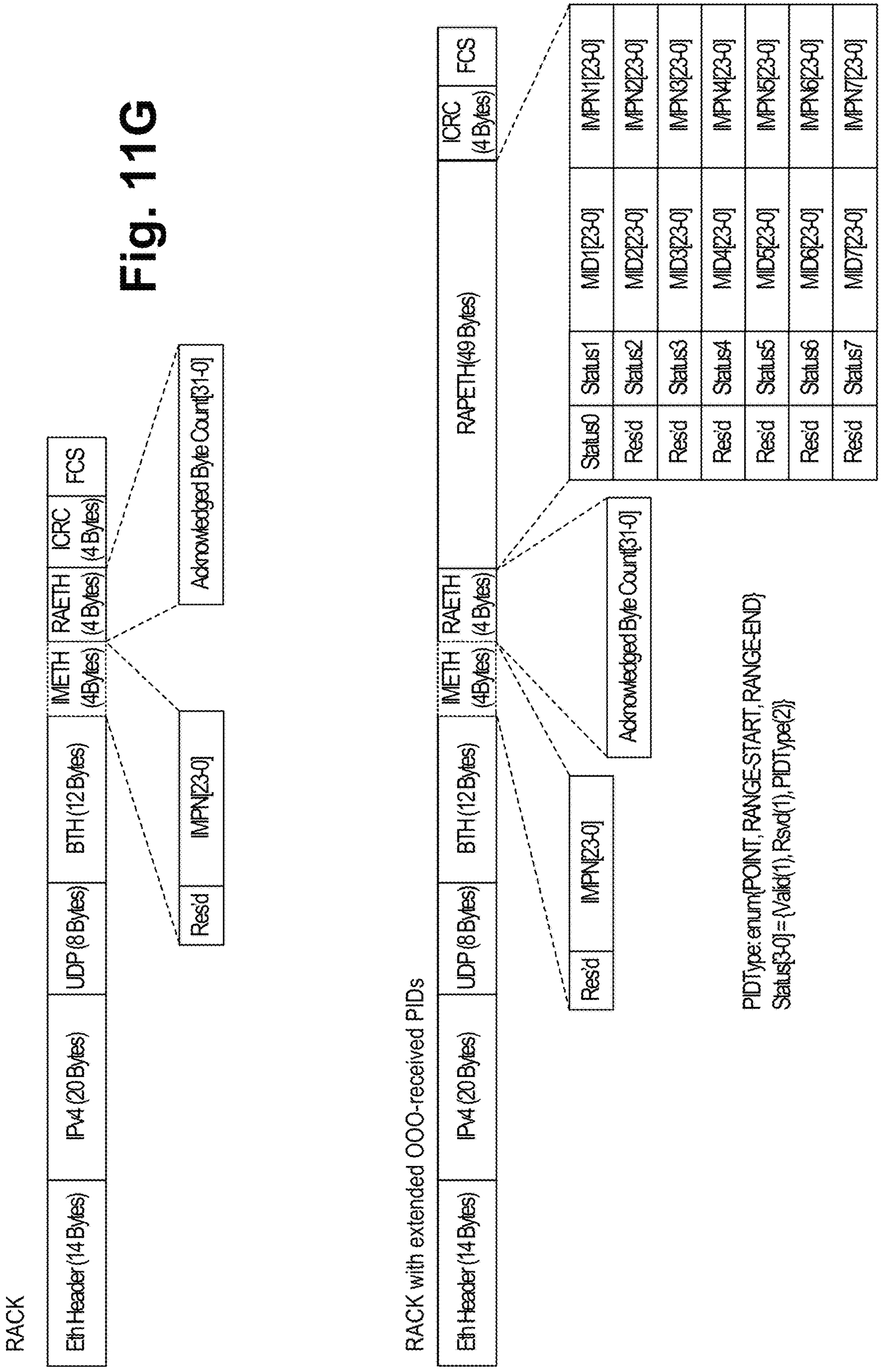

FIG. 11E illustrates the changes to the three types of SEND packets. The inclusion of the RQPETH header is illustrated, as also apparent with a comparison to FIG. 10B. FIG. 11F illustrates the changes to the ACK/NAK and SNAK packets. Both include an IMETH header to provide the packet number in the message as the PSN field is the message number and does not change for the entire message. The SNETH has grown to 49 bytes to incorporate the change in the PID value to {MID, IMPN}. FIG. 11G illustrates the two types of RACK. Each includes an IMETH to provide the packet number. RAPETH has grown to 49 bytes to reflect the change in the PID value.

FIGS. 12A-12C provide examples of an outbound SEND message, an inbound RDMA READ Request message with an associated outbound RDMA READ Response message and finally a second outbound SEND message, from the perspective of Node A. FIG. 12A is message level interleaving, so the second SEND message must be delayed until the RDMA READ RESPONSE message is completed. FIG. 12B is packet level interleaving and the second SEND message has moved up after the first RDMA READ RESPONSE packet and the RDMA READ RESPONSE message completes after the second SEND message. FIG. 12C uses separate PID spaces, so again the second SEND message has moved up to after the first RDMA READ RESPONSE packet.

Looking at FIG. 12A in more detail, the first operation is a two packet SEND. The PSN, which represents the complete PID, is 0154A7, IMPN is 0 and RQMSN is 421537 for the first packet. The second packet has a PID of 0154A8 and an IMPN of 1, both incremented from the first packet, with the RQMSN staying the same. The second operation is an RDMA READ, with the RDMA READ request packet having a PID of 5D793F, DMALength of 1000 and RSPQMSN of 75873E. The next four packets are the RDMA READ response packets. PIDs start at 0154A9 and increment through 0154AC. IMPN values start at 0 and increment to 3. The RSPQMSN is 75873E for all four response packets. The RSPQMSN allows the requestor to match the response to the request. The PIDs increment in the normal course for the sender, incrementing with each packet. The final operation is a SEND ONLY. The PID is 0154AD, incremented from the last PID of the READ response. The RQMSN is a 421538, incrementing from the prior SEND message. This illustrates PID, IMPN and MSN operation in message level interleaving.

Referring to FIG. 12B, packet level interleaving is shown. The first packet of the first SEND operation uses the same PSN, which represents the MID component of the PID, IMPN and RQMSN values as in the example of FIG. 12A, noting that the PID for the first packet is given by {PSN, IMNP} ({0154A7, 0}). A PKTCOUNT value of 2 is added to the packet in the RQPETH header. For the second packet of the SEND operation, the PSN or MID value remains the same, not incrementing, but the IMPN value increments to 1. The other values remain the same. The RDMA READ request is received next and is identical to the RDMA READ request in FIG. 12A. The next packet is the first packet of the RDMA READ RESPONSE. The PSN or MID is incremented to 0154A8, with the IMPN value being 0 and the RSPQMSN being the RSPQMSN value of the RDMA READ request. To illustrate packet interleaving, the second SEND operation occurs next. The PSN or MID value is incremented to 0154A9 and the RQMSN is the same as in FIG. 12A. Following the second SEND are the three remaining packets of the RDMA READ response. The PSN or MID remains at 0154A8 for each packet and the IMPN value increments. The use of the same PID for multiple packet operations and the incrementing of IMPN allows the receiver to link the packets even though separated and allows packet loss detection.

FIG. 12C illustrates operation using different PID spaces. The packets of the initial SEND operation are the same as in FIG. 12A. Similarly, the RDMA READ request is the same as in FIG. 12A. The first packet of the RDMA READ response has a PID of F4903A, not a PID value sequential with the PID sequence of other packets from the sender as these packets belong to the response flow which uses an independent PID space. The second SEND operation is next and uses a PID value of 0154A9, incrementing from the second packet of the first SEND operation. The three RDMA READ response packets are next, with the PIDs incrementing from the F4903A value of the first RDMA READ response packet, with the IMPN values also incrementing. The use of the separate PID space for the request flow and response flow packets removes potential confusion with any intervening operations provided from the sender, allowing packet level interleaving.

FIGS. 13A and 13B illustrate acknowledgement operation in one phase and two phase operations. FIG. 13A illustrates two WRITE messages and a combined ACK, though individual ACKs could have been provided. FIG. 13B illustrates a READ operation, with the initial READ request and the ACK of that request. Two READ responses are provided with an ACK, though a single coalesced ACK could have been provided. These examples provide further indication of the operation of the Requestor, Responder and Completer functions.

The use of the additional reliability signaling, through the use of SNAK, RACK packets and the additional data provided in those packets, including indications of exhaustion of out-of-order resources in the receiver, allows improved efficiency in BE RDMA communications through the minimization of retransmissions.

State Machines

Figure 6A:
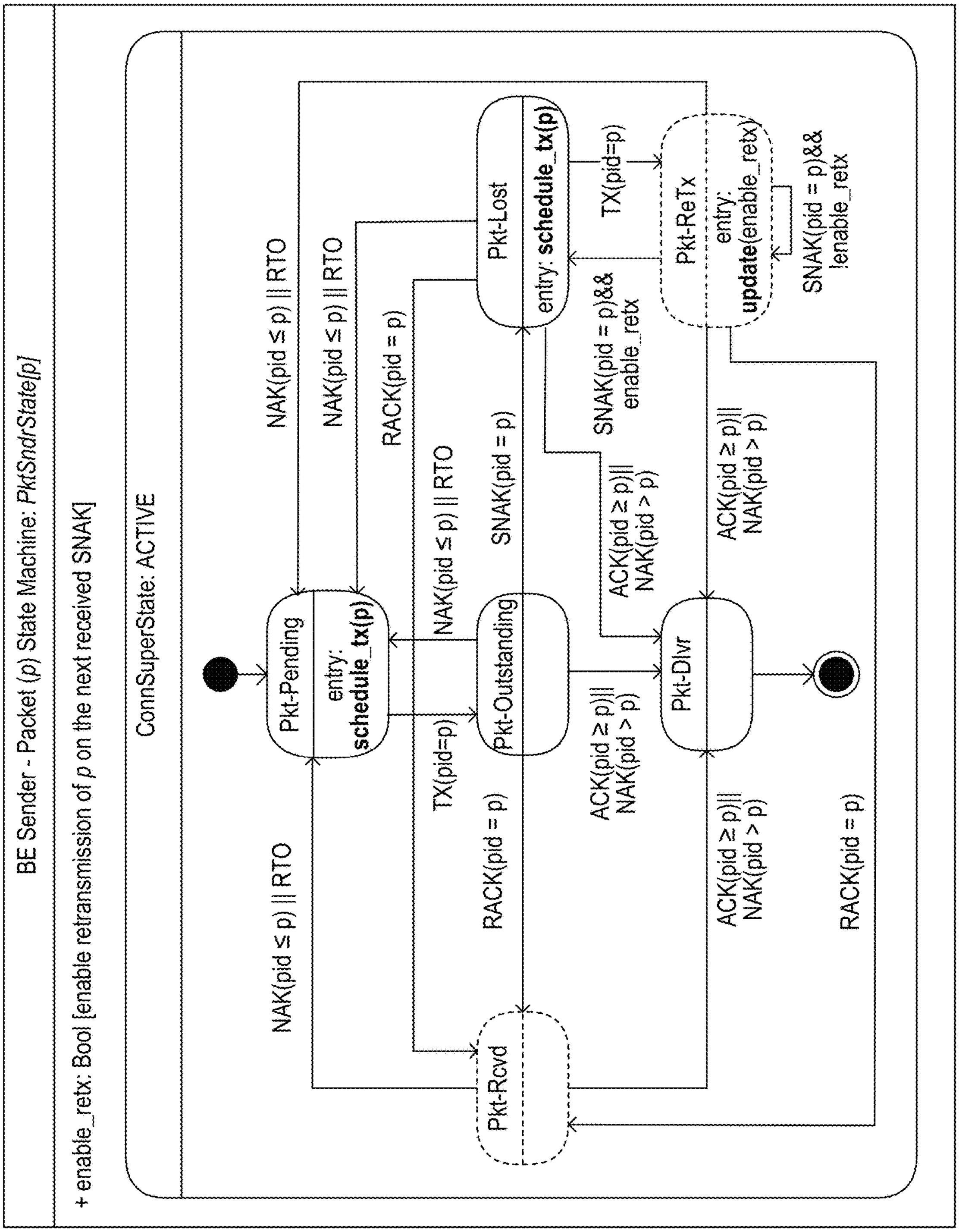
FIGS. 6A and 6B illustrate a Sender packet-level state machine according to examples of the present invention.
Figure 6B:
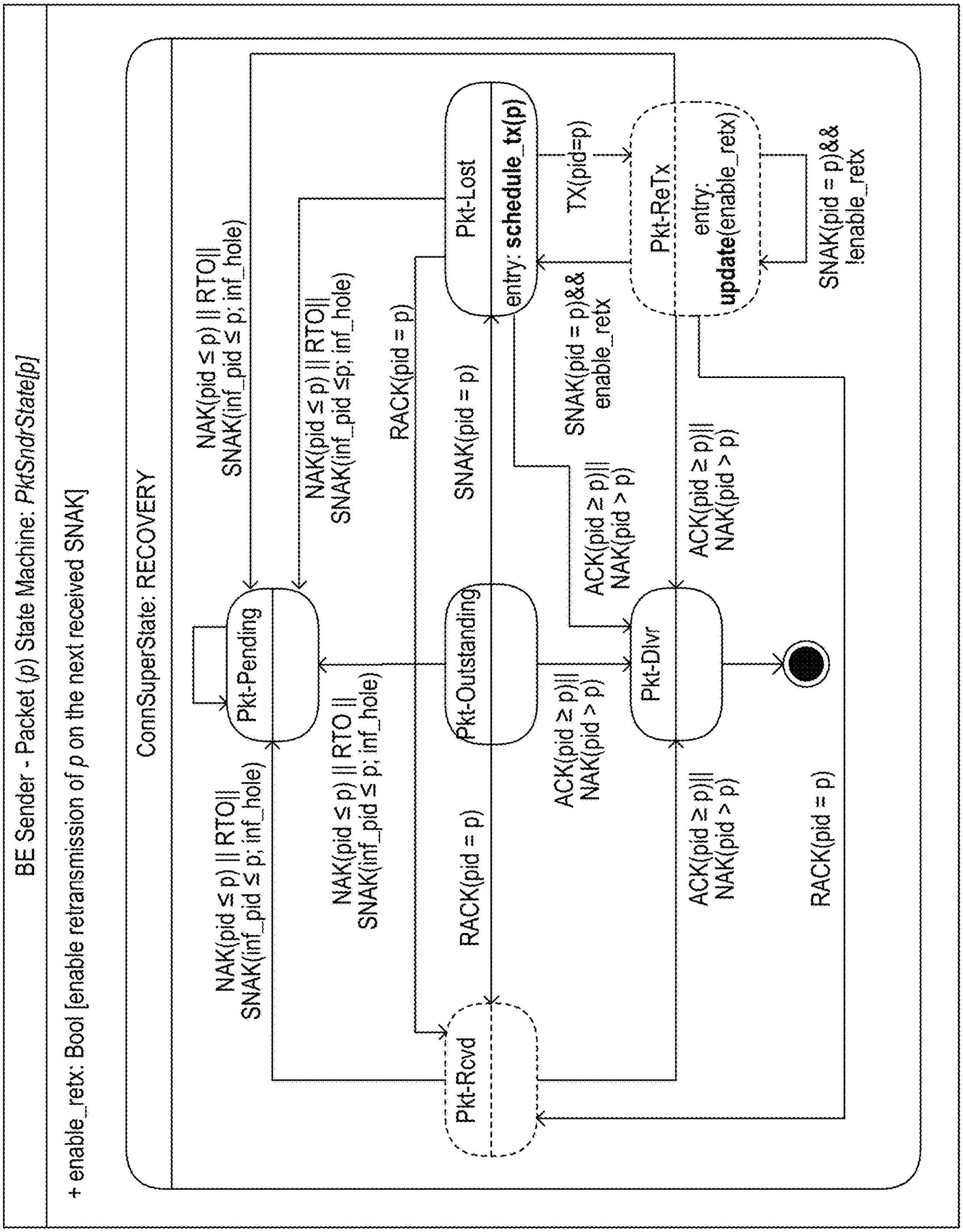

1. A packet-level hierarchical state machine depiction for the reliability protocol in the Sender node is shown in FIGS. 6A and 6B. Such a packet-level state machine is applicable to the Sender node of both request flow and response flow on a BE connection. One instance of this state machine exists for every PacketID 'p' tracked by the Sender node (referred to as 'PktSndrState[p]'). The presented figures for the packet-level state machine show the superset case, i.e. the case where all the optional Sender features are included in the BE transport. In this state machine, the value in the top half of an oval is the state name and the value in the bottom half of the oval are "entry:" statements inside the states which represent entry-actions executed upon entering the state. Values on the lines between the ovals are inputs to the state machine used to transition the state machine. Dashed ovals are optional features.

As an example, the top center oval in FIG. 6A is the Pkt-Pending state. Upon entry to the Pkt-Pending state, a schedule_tx(p) message, to indicate that the packet p is to be transmitted, is provided. Upon receipt of a message TX(pid=p), indicating that the packet having a PID of p has been scheduled for transmission by the Sender, the state machine transitions to the Pkt-Outstanding state. In the Pkt-Outstanding state, if a message indicating receipt of a NAK where the PID of the packet is less than or equal to p is received or if the retransmission timer (RTO) has timed out, the state machine returns to state Pkt-Pending and packet p is again scheduled for transmission. The || symbol indicates a logical OR and the && symbol indicates a logical AND. The ! symbol is an inverse or NOT symbol, as !enable_retx means enable_retx is not set for the condition to be true. Returns from the Pkt-Rcvd, Pkt-Lost and Pkt-ReTx states to the Pkt-Pending state are performed for the same reason as the return from the Pkt-Outstanding state. This is an explanation of the state machine of FIG. 6A for the Pkt-Pending state. Operation of the state machines of FIGS. 6A, 6B, 7A and 7B operate in this fashion and particular transitions and actions are presented in the state machine FIGS. 6A, 6B, 7A and 7B and generally not further explained here.

a. Two copies of the state machine are shown, each encapsulated inside a distinct connection super-state value (i.e. ACTIVE or RECOVERY, described below). Whenever the Sender node's connection transitions between these connection super-state values, each packet-level state machine transitions as well, keeping the same sub-state it had inside the prior connection super-state.
b. All signaling actions are inputs to the state machine (i.e. signaling packets are received by the Sender node), i.e. 'ACK( )', 'NAK( )', 'RACK( )', and 'SNAK( )'.
c. All transmitted packet notifications (request flow or response flow) represent inputs to the state machine (i.e. data packets are transmitted by the Sender node), which are marked in the diagram as 'TX( )'.
i. Note that the transmission of Flush packets (i.e. 'TX_FLSH( )') is not controlled by the packet-level hierarchical state machine, therefore it is not represented in the figures.
ii. Note that 'enable_retx' represents a Boolean state variable for enabling the selective retransmission of packet p, as described above. The update( ) function represents the algorithm or policy that the Sender adopts to decide when to disable/enable the retransmission scheduling for a particular packet (i.e. p).
iii. Note that 'schedule_tx( )' represents the action of scheduling a packet for transmission, with the packet transmitted by the Sender after a scheduling delay.
d. There are four mandatory states, i.e. 'Pkt-Pending', 'Pkt-Outstanding', 'Pkt-Dlvr', 'Pkt-Lost'. The 'Pkt-Rcvd' and 'Pkt-ReTx' are optional (dotted in FIGS. 6A and 6B). 'Pkt-Rcvd' is only required when RACK is configured to indicate PIDs of OOO-received packets. 'Pkt-ReTx' is required when a Sender wishes to reduce the frequency of retransmitting the same packet within a short period of time (e.g. one RTT). Note that when 'Pkt-ReTx' is not supported, the packet state will transition from 'Pkt-Lost' to 'Pkt-Outstanding' once the lost packet is retransmitted (i.e. the arrow of input 'TX( )' from the 'Pkt-Lost' state will lead to 'Pkt-Outstanding').

Pkt-Pending indicates that the packet has been posted to the transmission queue (i.e. either SQ for request flow packets or RSPQ for response flow packets). Pkt-Outstanding then indicates that the packet has been transmitted, but no explicit or implicit signaling for it has been received at the Sender yet. Pkt-Dlvr means that the packet has been received in order. Pkt-Rcvd means that the packet has been received, but at least one packet with prior PID value has not been received yet. Use of these states in combination with RACK and SNAK signaling allows approaching the goal of retransmission of only packets that are positively known to be lost. This reduces the number of packets retransmitted as compared to other transports. In some cases, a packet may be Pkt-Rcvd but be retransmitted as an infinite-hole is signaled, the infinite-hole starting at a PID value that is prior to the OOO-received packet's PID value.

e. Note that the argument pid represents the PID field of a transmitted packet (request or response), or the PID field on a received (signaling) packet. For example,
i. ACK(pid≥p) represents an ACK received for a PID larger than or equal to the PID for the packet tracked by the state machine instance (i.e. p).
ii. TX(pid=p) represents the transmission of the packet tracked by the state machine instance (i.e. p).
f. The primary difference between the ACTIVE and RECOVERY state machines for the Sender is that in the RECOVERY super-state, no new packets are transmitted (i.e. no packets in Pkt-Pending state will be transmitted), only lost packets will be transmitted (i.e. only packets in Pkt-Lost state will be retransmitted). This is appropriate as the RECOVERY super-state is entered when an infinite-hole is signaled, indicating that the Receiver can no longer track more packets in Pkt-Lost state (holes) with a PID posterior to the infinite-hole. This maximizes the rate of lost packet recovery.

Figure 7A:
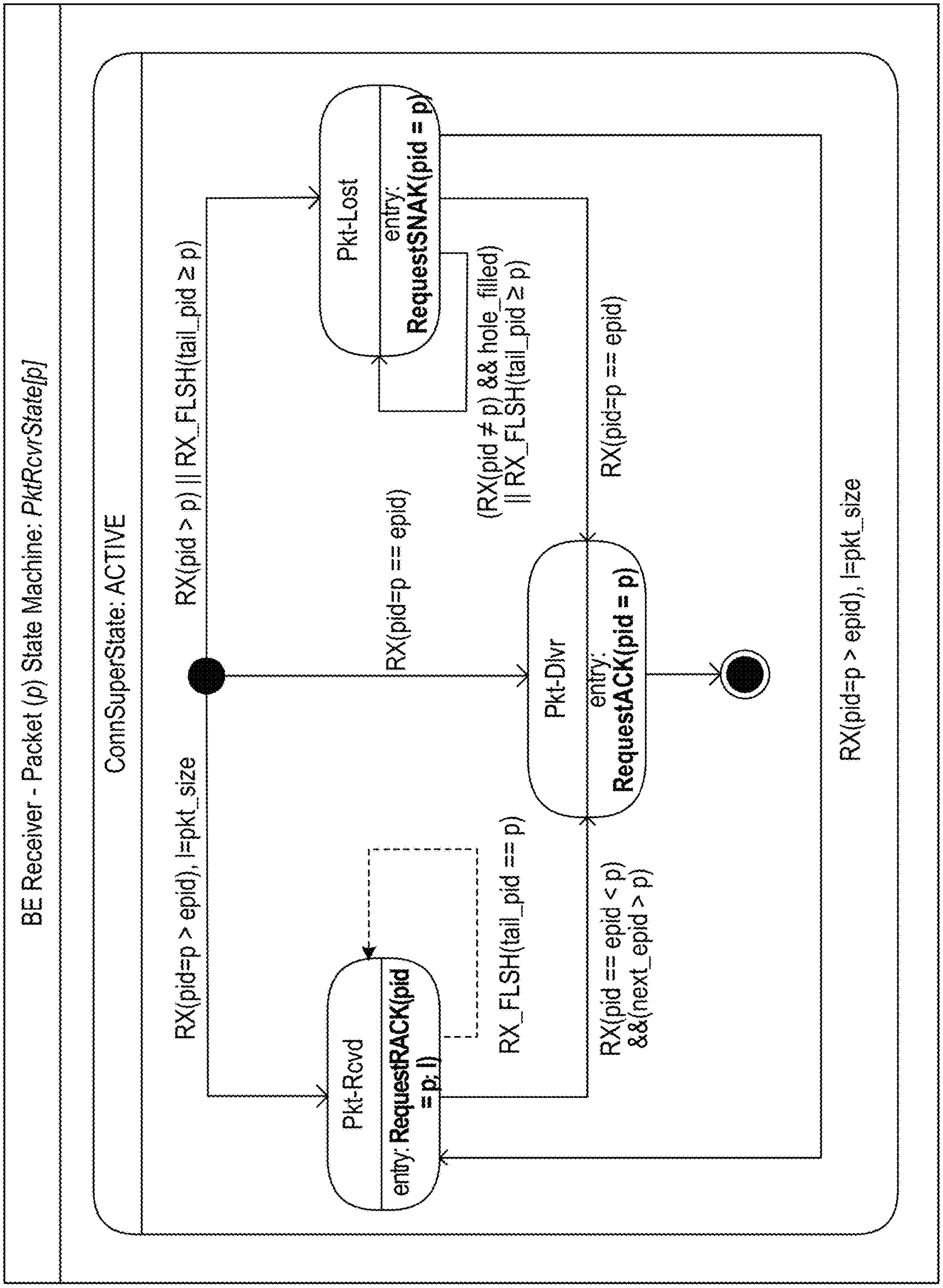
FIGS. 7A and 7B illustrate a Receiver packet-level state machine according to examples of the present invention.
Figure 7B:
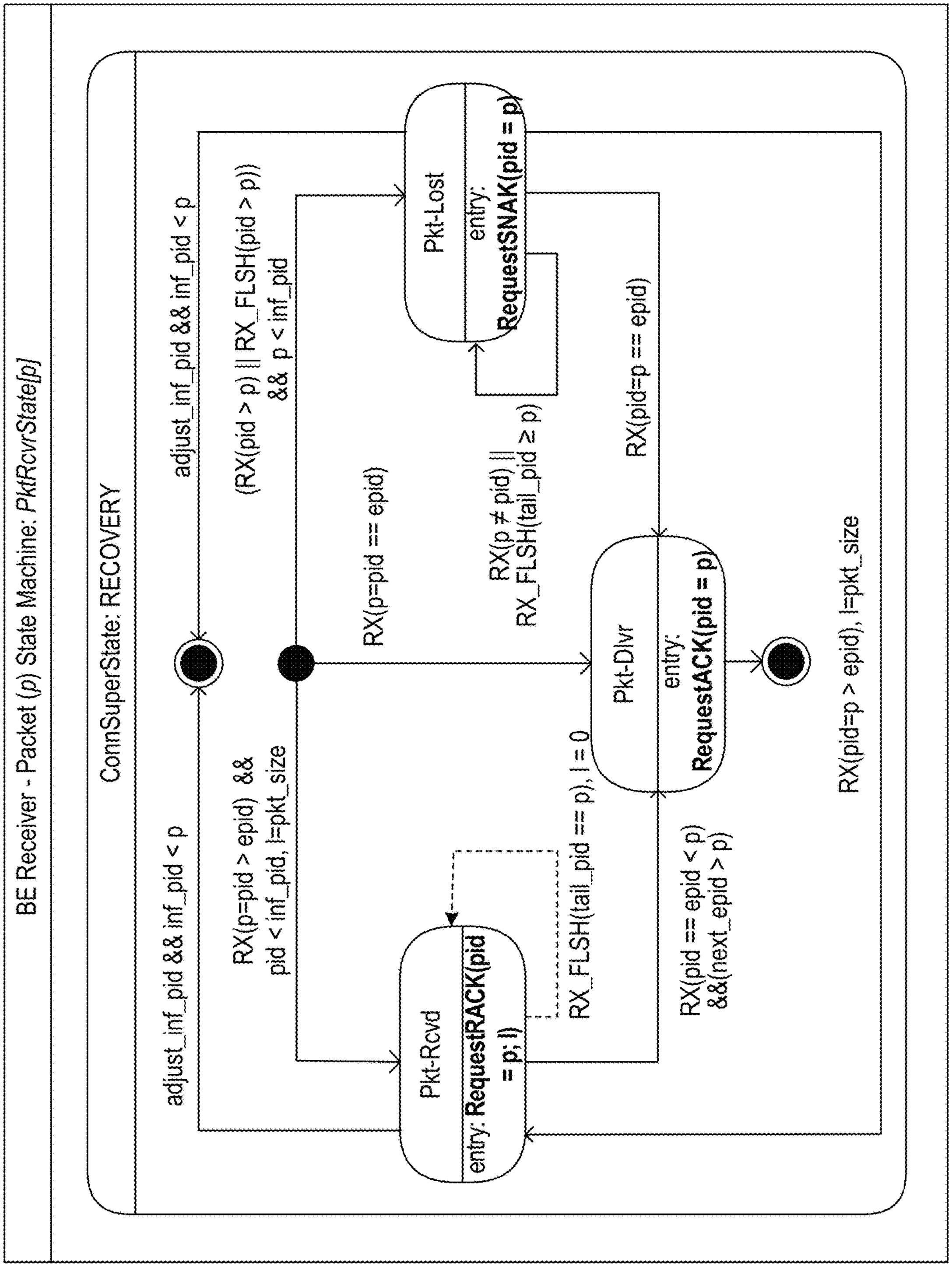

2. A packet-level hierarchical state machine depiction for the reliability protocol in the Receiver node is shown in FIGS. 7A and 7B. Such a packet-level state machine is applicable to the Receiver node of both request flow and response flow on a BE connection. One instance of this state machine exists for every PacketID 'p' tracked by the Receiver node (referred to as 'PktRcvrState[p]'). The presented figure for the packet-level state machine shows the superset case, i.e. the case where all the optional Receiver features are included in the BE transport. In this state machine, the value in the top half of an oval is the state name and the value in the bottom half of the oval are "entry:" statements inside the states which represent entry-actions executed upon entering the state. Values on the lines between the ovals are inputs to the state machine used to transition the state machine.

a. Two copies of the state machine are shown, each encapsulated inside a distinct connection super-state value (i.e. ACTIVE or RECOVERY, see below for the description of connection super-states). Whenever the Receiver node's connection transitions between these connection super-state values, each packet-level state machine transitions as well, keeping the same sub-state it had inside the prior connection super-state.
b. All signaling actions are outputs from the state machine (i.e. signaling packets are transmitted by the Receiver node), represented by 'RequestACK( )', 'RequestRACK( )', and 'RequestSNAK( )'. These outputs shall be understood as requests to generate the actual requested signal, which do not always result in signaling packet(s) generation.

i. ACK is cumulative. Only the highest PID will be included in the ACK packet when multiple packet-level hierarchical state machines tracking packets with consecutive PID values are requesting ACKs.

ii. RACK has a limited number of PID fields. The Receiver will choose the PIDs from multiple packet-level hierarchical state machines that are requesting RACKs to be sent in a single RACK based on a policy (e.g., newest received PID, as many as possible oldest PIDs).

(a). Note that 'RequestRACK( )' has an extra argument l for length for passing the amount of bytes that have been OOO-received.

iii. SNAK has a limited number of PID fields. The Receiver will choose the PIDs from multiple packet-level hierarchical state machines that are requesting SNAKs to be sent in a single SNAK based on a policy (e.g., single newest hole, as many as possible oldest holes).

c. All received message (i.e. non-signaling) packets (request flow or response flow) represent inputs to the state machine (i.e. data packets are received by the Receiver node) which are marked in the diagram as 'RX( )'. The received Flush packets represent inputs to the machine, which are represented by 'RX_FLSH( )'.

i. Note that on 'RX_FLSH( )', the receiver can optionally signal a RACK with l=0, which signals no new traffic has made it out of the network, but the original tail_pid has been received.

d. Note that the argument pid represents the PID field of a received packet (request or response), or the requested PID field for a transmitted signaling packet. For example, i. RX(pid>p) represents an received packet for a PID larger than the PID for the packet tracked by the state machine instance (i.e. p).

ii. RequestACK(pid=p) represents the ACKing request for the packet tracked by the state machine instance (i.e. p).

e. Note that epid is a state variable tracked in connection super-states. It represents the PID of the oldest not received packet.

f. Note that next_epid is a state variable tracked in connection super-states. It represents the PID of the second oldest not received packet. As an example, if the newest delivered PID is pid=5, then epid=6 and next_epid=7.

g. Note that tail_pid is a state variable tracked in connection super-states. It represents the PID which the Sender node believes to be the tail of a stream.

h. Note that inf_pid is a state variable tracked in connection super-states. It represents the PID for the start of an existing infinite-hole.

i. Note that adjust_inf pid is a Boolean event which notifies that inf_pid was updated to the PID of an older received packet due to resource exhaustion.

3. The reliability protocol connection super-states: Active super-state and Recovery super-state a. The connection's Active super-state has the goal to minimize the impact on flow's throughput by preventing retransmission of out-of-order received packets.

i. Sender is allowed to inject new traffic into the network, while prioritizing retransmission of signaled (SNAKed) holes in the outbound PID stream.

ii. Receiver signals a new SNAK on the following conditions:

(a). Detecting a new hole in the inbound PID stream, i.e. when a packet is received OOO, thus there must be a PID hole prior to the received packet's PID.

(b). Filling a hole in the PID stream while other holes remain, i.e. when a selectively retransmitted packet covers a hole currently tracked by the receiver and more holes remain to be covered.

iii. Receiver signals a RACK for every point or (contiguous) range of OOO-received PIDs.

iv. Receiver signals an ACK for every in-order-received PID.

b. The connection's Recovery super-state has the goal of quickly recovering from exhausted hole-tracking resources and limiting wasted bandwidth on dropped packets (i.e. further OOO-received packets with increasing PIDs, beyond the infinite-hole's PID, which will be dropped as they cannot be tracked).

i. Sender is not allowed to inject new traffic into the network and only allowed to retransmit signaled (SNAKed) non-infinite-hole PIDs.

ii. Receiver signals SNAKs on each received message (non-signaling) packet during this super-state (coalescing is still possible as an optimization based on the SNAK policy).

(a). If a received PID belongs within the infinite-hole, the packet is dropped, and tracked holes are notified via the issued SNAK packet, including the infinite-hole notification.

(b). If a received PID belongs within a previously notified range-hole, the packet is accepted and correspondingly signaled (ACK or RACK), and a SNAK is issued indicating an updated list of tracked holes including the infinite-hole notification.

(i). Note this received PID may split a single PID range-hole into up to two sub-ranges (each of which could be a PID point-hole or range-hole), depending on the location of the received PID within the PID range of the range-hole.

(c). If a received PID corresponds to a previously notified PID point-hole, the hole is filled and correspondingly signaled (ACK or RACK), and a SNAK is issued indicating an updated list of tracked holes, if any tracked holes remain including the infinite-hole notification.

iii. Receiver signals a RACK for every point or (contiguous) range of OOO-received PIDs that fill (partially or completely) a previously notified PID point-hole or range-hole.

iv. Receiver signals an ACK for every point or (contiguous) range of in-order-received PIDs. The ACK should cumulatively delivery-acknowledge all received packets up to the leftmost (older) outstanding PID hole.

c. In most examples, the transition from Active super-state to Recovery super-state is triggered by the depletion of the OOO tracking resources at the receiver and signaled to the sender with an infinite-hole SNAK. In some examples, the sender and receiver can negotiate available OOO tracking resources and the sender can track available resources, rather than the receiver, and provide a change to recovery state message to initiate recovery operation for the sender and receiver and a return to active state message when recovered.

d. The transition from Recovery super-state to Active super-state is triggered by the delivery (i.e. filling) of every outstanding PID hole prior to the infinite-hole tracked by the Receiver and is signaled to the sender with a NAK for the PID at the left-edge of the infinite-hole. In order to reduce the likelihood of retransmission timeout at the sender (in case the NAK gets lost) the following optimizations exist:

i. Mandatory: Receiver may (upon filling the last outstanding PID hole prior to the infinite-hole) issue an ACK followed by NAK, both cumulatively acknowledging up to the same PID.

ii. Optional: Sender, upon receiving the ACK that cumulatively acknowledges everything prior to the infinite-hole, could automatically transition to Active super-state.

It is understood that the Sender and Receiver packet-level state machines represent logical flow. Specific implementations of the flow may differ from the illustrated state machines, but the logical flow will remain as shown.

While in most examples the Recovery to Active state transition is made when all holes are filled and out-of-order tracking resources are fully available, in some examples the Recovery to Active state transition can occur while a limited number of holes are available and some out-of-order tracking resources are still utilized but a sufficient number of tracking resources have been recovered to allow new packet transmission to occur, with the remaining holes filled in normal Active operation with nominal impact on transmission rate. This earlier transition can occur at a settable level or based on measured recovery rate and expected complete recovery remaining time.

Figure 8A:
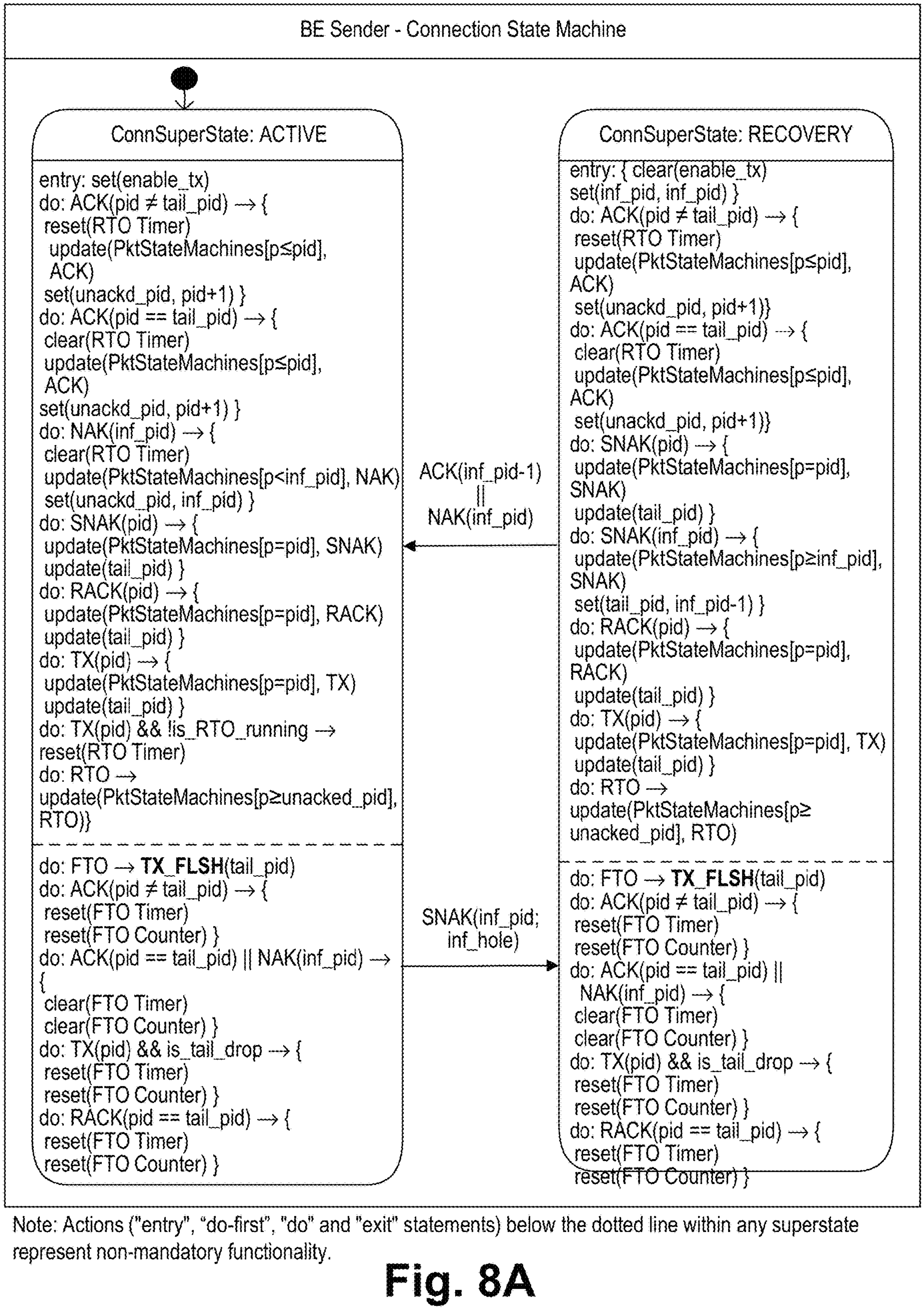

4. The BE Sender node's connection-level state machine (handling the super-states for the Sender) is depicted in FIGS. 8A and 8B. This state machine together with the packet-level hierarchical state machine provides the full view of the BE Sender.

a. If the optional Flush feature is supported on BE Sender this state machine is responsible for the Flush feature (transmitting the Flush packet, maintaining a Flush Timer and Flush Counter), because only the connection-level state machine can detect the tail-drop condition. When a RACK of the tail_pid is received while the BE Sender is in tail-drop condition, the tail_pid must be updated to the hole with the highest PID.

b. In this state machine:

i. The 'entry:' action of each state indicates the actions performed by the BE Sender each time it transitions to such state.

ii. The 'do:' and 'do-first:' actions of each state indicate actions taken by the BE Sender while it remains on such state as a reaction to certain events (the events are the left-hand side argument to the→operator).

iii. Multiple 'do:' actions could be triggered by a certain event. There is no ordering requirement on the actions, except that a 'do-first;' action is done before any other 'do:' actions.

iv. The update(PktStateMachines[ ], <event type>) evaluates the indicated packet-level state machine as being triggered to execute by "event_type", which may result in the instantiation of the state machine for an untracked PID, no-change in state for an existing state machine instance, state transition for an existing state machine instance, or destruction of a pre-existing state machine.

v. The update(tail_pid) function sets tail_pid to the highest PID being tracked that has been transmitted (i.e., not in Pkt-Pending state) from the BE Sender's perspective.

c. The BE Sender requires several variables other than its main connection super-state (ConnSuperState). All variables are listed in FIG. 8B indicating the variable type, the data type and a description with the following format:

i. <var_type><var_name>: <data_type>[<description>]

ii. <var_type>can be '+' representing a state variable updated by the state machine, or '*' representing an auxiliary variable used to convey certain events (triggered under specific conditions) or auxiliary computations tracked by the state machine.

d. The PktStateMachines[N_MAX_PID] is a hash table of type PktSndrState indexed by the tracked packet's PID.

'i. N_MAX_PID' represents the maximum number of tracked packets by the BE Sender node.

e. The BE Sender connection state machine is responsible for the RTO timer.

f. The BE Sender connection state machine is responsible for resolving all the schedule_tx( ) requests received from the associated collection of packet state machines (i.e. if multiple packet state machines request transmission simultaneously, the connection state machine must resolve the order in which they will be scheduled for TX). This resolution is based on policy and not illustrated in FIG. 8A.

g. FIG. 8A does not explicitly depict any of the Connection State Machine policy-based outputs, i.e. outputs generated based on policy which may differ between implementations, yet it is assumed that any implementation of this state machine must support all these outputs (according to its specific policy). For example, the transmission order of data-carrying message packets across the Sender's PktStateMachines are all policy based (i.e. order in which requested retransmissions and requested first-time transmissions are scheduled for transmission) and are not shown in this figure. Therefore, the "TX(pid)" references on any of the actions of this connection state machine do not imply an output, but instead imply the notification of a data-carrying message packet being scheduled for transmission based on the local policy.

h. The BE Sender connection state machine transitions from ACTIVE superstate to RECOVERY superstate when a SNAK signaling packet indicating the presence of an infinite-hole is received. The BE Sender connection state machine transitions from RECOVERY superstate to ACTIVE superstate when receiving a NAK signaling packet signaling the infinite hole PID or upon receiving an ACK signaling packet that cumulatively acknowledges everything prior to the infinite hole.

Figure 8C:
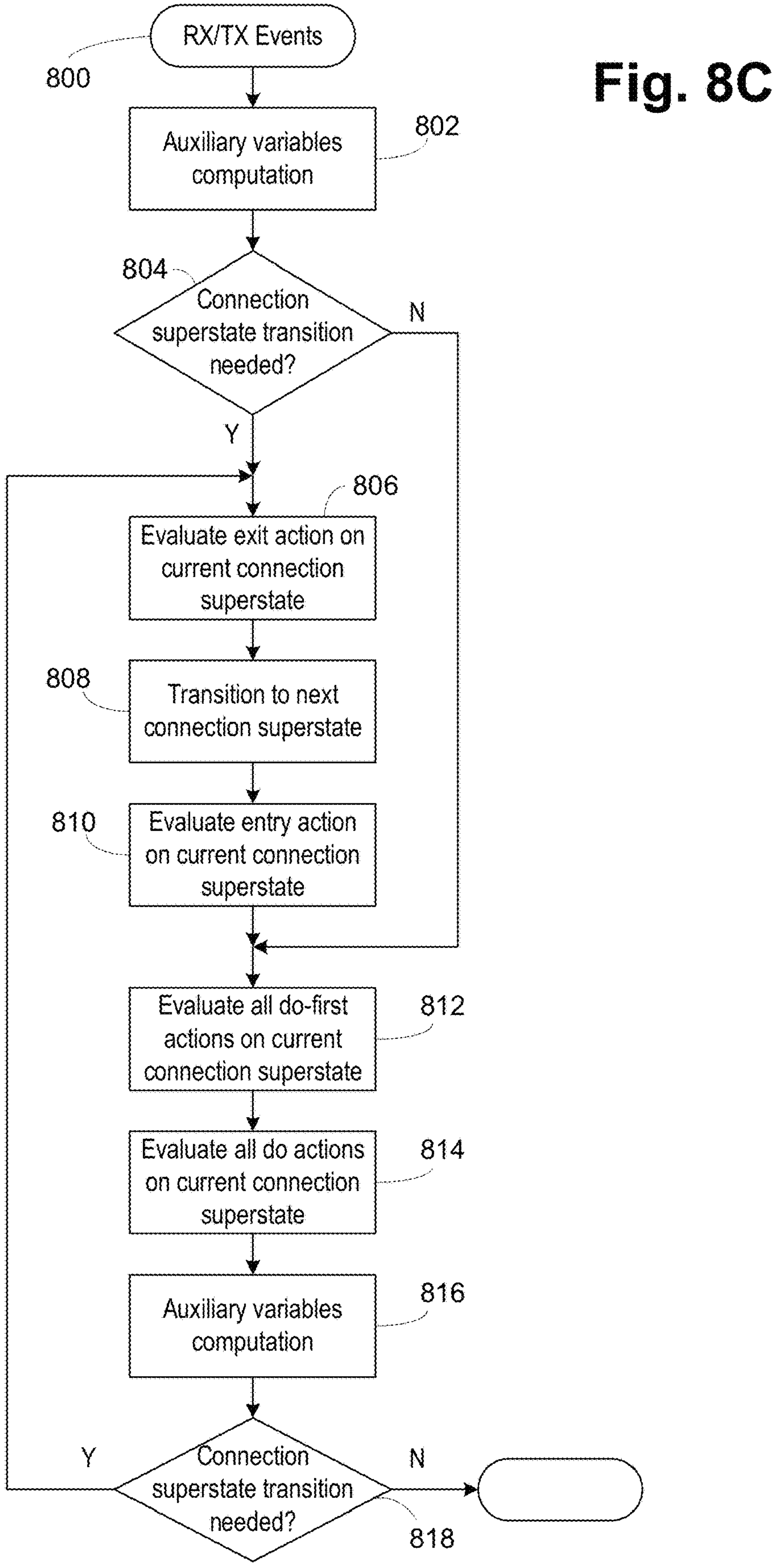
FIG. 8C is a flowchart of operation of the Sender connection state machine and the Receiver connection state machine upon receipt of a packet or transmission of a packet.

5. FIG. 8C is a flowchart of operation of the BE Sender connection state machine and the BE Receiver connection state machine whenever a packet is received or transmitted, as indicated by step 800. In step 802, the auxiliary variables, shown in FIGS. 8B and 9B, the values indicated by *< . . . >, are computed. In step 804, it is determined if a transition between superstates is needed. If so, in step 806, the exit action in the current superstate is evaluated and performed if indicated. In step 808, the connection state machine transitions to the new superstate. In step 810, the entry action for the now current superstate is evaluated and performed if indicated. In step 812, which is after step 810 or where operation flows if step 804 is a no, all do-first actions in the current superstate are evaluated and performed if indicated. In step 814, all do actions in the current superstate are evaluated and performed if indicated. In step 816, the auxiliary variables are recomputed. In step 818, it is determined if a connection superstate transition is needed based on the auxiliary variable recomputation. If so, operation returns to step 806.

Figure 9A:
Figure 9C:
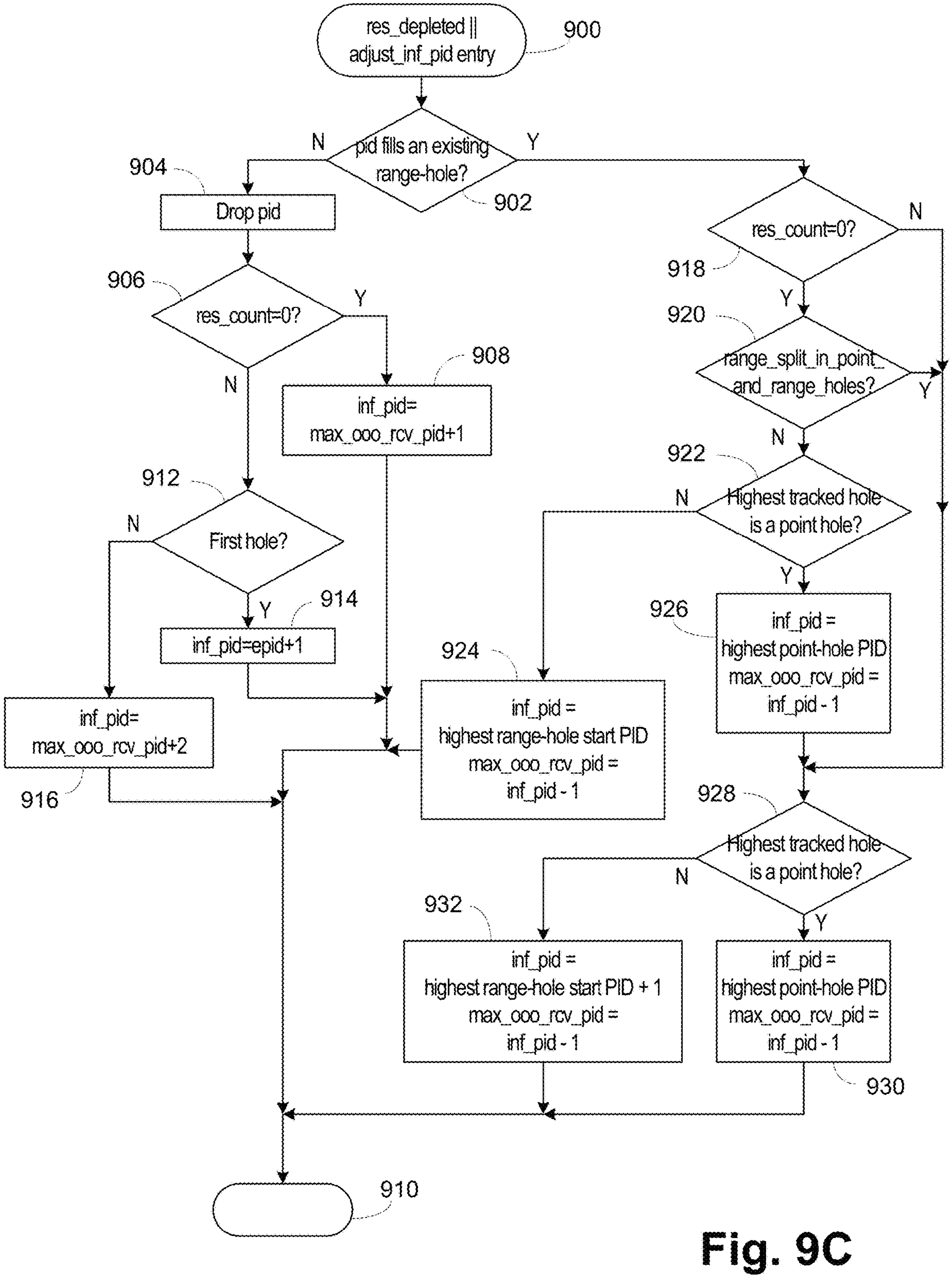
FIG. 9C is a flowchart for determining the value of inf_pid by the Receiver connection state machine upon entry in RECOVERY superstate.

6. The BE Receiver node's connection-level state machine (handling the super-states for the Receiver) is depicted in FIGS. 9A, 9B and 9C. This state machine together with the packet-level hierarchical state machine provides the full view of the BE Receiver.

a. In this state machine:

i. The 'entry:' action of each state indicates the actions performed by the BE Receiver each time it transitions to such state.

ii. The 'do:' and 'do-first:' actions of each state indicate actions taken by the BE Receiver while it remains on such state as a reaction to certain events (the events are the left-hand side argument to the→operator).

iii. Multiple 'do:' actions could be triggered by a certain event. There is no ordering requirement on the actions, except that a 'do-first;' action is done before any other 'do:' actions.

iv. The update(PktStateMachines[ ], <event_type>) function evaluates the indicated packet-level state machine as being triggered to execute by "event_type", which may result in the instantiation of the state machine for an untracked PID, no-change in state for an existing state machine instance, state transition for an existing state machine instance, destruction of a pre-existing state machine.

v. The 'exit:' action of each state indicates the actions performed by the BE Receiver each time it transitions away from such state.

vi. The update(next_epid) function sets next_epid to the second lowest not-received PID (i.e. packet not in Pkt-Rcvd or Pkt-Dlvr state) from the Receiver's perspective.

vii. The update(max_000_rcv_pid) function sets max_000_rcv_pid to the highest out-of-order received PID (i.e. packet in Pkt-Rcvd state) from the Receiver's perspective.

viii. The update(inf_pid) function sets inf_pid to the lowest PID not being tracked (i.e. packet state machine doesn't exist) from the Receiver's perspective. The update(inf_pid) function is described in more detail below.

b. The BE Receiver uses several variables other than its main connection super-state (ConnSuperState). All variables are listed in FIG. 9B indicating the variable type, the data type and a description with the following format:

i. <var_type><var_name>: <data_type>[<description>]

ii. <var_type>can be '+' representing a state variable updated by the state machine, or '*' representing an auxiliary variable used to convey either certain events, triggered under specific conditions, or auxiliary computations tracked by the state machine.

c. The PktStateMachines[N_MAX_PID] is a hash table of type PktRcvrState indexed by the tracked packet's PID.

i. 'N_MAX_PID' represents the maximum number of tracked packets by the BE Receiver node.

d. The BE Receiver connection state machine is responsible for resolving all the ACK( ), RACK( ) and SNAK( ) requests from the associated collection of packet state machines (i.e. if multiple packet state machines request the same kind of signaling simultaneously, the connection state machine must resolve which PIDs are included in the RACK/SNAK packet or which PIDs are coalesced into the same ACK packet. This resolution is based on policy and not illustrated in FIG. 9A.

e. FIG. 9A does not explicitly depict any of the BE Receiver Connection State Machine policy-based outputs, i.e. outputs generated based on policy which may differ between implementations, yet it is assumed that any implementation of this state machine must support all these outputs (according to its specific policy). For example, the generation of multi-PID RACK( ), multi-PID SNAK( ) or cumulative ACK( ) packets (all of which provide signaling associated with multiple PIDs) in reaction to requests issued by the Receiver's Pkt-StateMachines, are all policy based (i.e. which PIDs to include on each RACK or SNAK, or how many PIDs to coalesce per ACK) and therefore are not shown in this figure.

f. The BE Receiver connection state machine transitions from ACTIVE superstate to RECOVERY superstate when value of res_depleted is true, prior to performing any do operations in the ACTIVE state machine. The BE Receiver connection state machine transitions from RECOVERY superstate to ACTIVE superstate when the value of res_count equals the value of res_max, indicating that the desired number of tracking resources have been recovered. Two superstate transitions do not occur sequentially, i.e. without any "do:" operations being performed, as shown in FIG. 8C. Therefore, the "do:" actions in a connection state machine will all be evaluated at least once in any superstate.

As noted above, generally the super-state changes from ACTIVE to RECOVERY when the Receiver sends an infinite-hole indication. Generally, the super-state changes from RECOVERY to ACTIVE when all holes are filled, meaning that resources in the Receiver are recovered, so that the ACTIVE super-state commences with the Receiver at maximum available resources.

When an infinite-hole is determined, the value of inf_pid, a known pid for the start of the infinite-hole, the infinite-hole starting at inf_pid, must be determined. A flow chart is provided in FIG. 9C.

Addressing FIG. 9C, entry begins at step 900 from the Receiver connection state machine having its hole tracking resources depleted, either due to a new hole being found or a previously tracked hole being split into multiple holes. In step 902, it is determined if the pid fills an existing range-hole, which would then result in splitting the range-hole into two non-contiguous holes. If not, the pid creates a new hole and in step 904 the pid is dropped. In step 906, it is determined if res_count=0. If so, in step 908 the inf_pid value is set as the max_000_rcv_pid value plus 1. If res_count was not 0 in step 906, the pid is for a new range hole and must be tracked as a new point hole, so in step 910 it is determined if this is the first hole. If so, in step 914 the inf_pid value is set at the epid value plus 1. If not the first hole in step 912, in step 916 the inf_pid value is set as the max_000_rcv_pid value plus 2.

If the pid did fill an existing range-hole in step 902, in step 918 it is determined if res_count is 0. If so, in step 920 it is determined if the value range_split_in_point_and_range_holes is true. If not, two resources must be released and in step 922 it is determined if the highest tracked hole is a point hole. If not, this means that the highest tracked hole is a range hole which must be discarded to release two resources and in step 924 the inf_pid value is set at the highest range-hole start PID and max_000_rcv_pid is set to inf_pid minus 1. If the highest tracked hole is a point hole, tracking is stopped on that highest point hole and one resource is released and in step 926 the inf_pid value is set as the highest point-hole PID and the max_000_rcv_pid value is set at inf_pid minus 1.

After step 926, if the res_count was not 0 in step 918 or if the value range_split_in_point_and_range_holes is true, both indicating the need to release one resource, in step 928 it is determined if the highest tracked hole is a point hole. If so, the tracking on that point hole is stopped and in step 930 the inf_pid value is set to the highest point-hole PID and the max_000_rcv_pid value is set to inf_pid minus 1. If the highest tracked hole is not a point hole in step 928, the highest tracked hole is a range hole, which must be tracked as a point hole and one resource released, and in step 932 the inf_pid value is set to the highest range-hole start PID plus 1 and the value of max_000_rcv_pid is set to inf_pid minus 1.

This algorithm for developing the inf_pid value is the most efficient algorithm because it never "wastes" an available tracking resource, yet it is not the only possible updating algorithm that would be functionally correct. Other algorithms can be used in some examples. For example, a simpler algorithm, from the complexity standpoint, would waste a single available tracking resource when two resources are needed, e.g. because a new range-hole was found, but only one resource is available.

While a series of six different state machines have been illustrated, sender packet state machine in FIGS. 6A and 6B, receiver packet state machines in FIGS. 7A and 7B, sender connection state machine in FIGS. 8A and 8B and receiver connection state machine in FIGS. 9A and 9B, it is understood that this is a logical representation and the actual implementation may differ by combining sender or receiver state machines as desired for the particular implementation of the state machines.

FIGS. 10A-10E illustrate exemplary packet formats for transaction packets. FIGS. 11A-11C illustrate exemplary packet formats for reliability protocol signaling packets. FIGS. 11D-11F illustrate changes for packet level interleaving.

The BE Transport combines pre-existing features in an innovative way to enable symmetric goodput in request flows and response flows by using out-of-order reception, avoiding reliance on GoBackN and avoiding the use of data-reorder buffers while minimizing the RTO likelihood. The list of pre-existing features combined to achieve this unique property are:

- Symmetric reliability protocol for request and response flows.
- Out-of-order data placements for both request and response flows.
- Scatter-support on inbound response data placement.
- RTO avoidance by means of FLUSH packets triggered by FTO.

The BE Transport includes a modular architecture (clearly defining Requester, Responder and Completer roles with independent capabilities, each of which may be enabled or disabled on each connection) that enables granular resource allocation independently tailored to the needs of each connection.

The BE Transport includes a new reliability protocol with ACK/NAK/RACK/SNAK, mandatory packet-level state machine (Pkt-Pending, Pkt-Outstanding, Pkt-Dlvr, Pkt-Lost for Sender and Pkt-Rcvd, Pkt-Dlvr, Pkt-Lost for Receiver).

RACK packets prevent unnecessary retransmissions of OOO-received packets and enable CC to avoid over-reacting (by over-constraining the transmission rate) to delayed ACKs.

SNAK packets explicitly signal hole(s) in the PID stream (i.e., avoids inferred holes) to reduce the likelihood of reaching an infinite-hole. Moreover, SNAK allows for the same hole to be explicitly signaled multiple times, as opposed to once in NAK, further reducing the likelihood of reaching an infinite-hole. In ACTIVE superstate, signaling the newest hole is mandatory. In RECOVERY superstate, signaling the infinite-hole is mandatory. In both superstates, signaling the older holes included in the SNAK is policy-based.

The BE Transport includes new goodput optimization super-states (Active and Recovery) to prevent wasted bandwidth when an infinite-hole is detected (OOO-tracking resources at the receiver are depleted). While this condition may occur infrequently, the Recovery super-state allows the connection to reach a stable point before transitioning back to Active state (which maximizes goodput).

The BE transport includes request/response flow packet-level interleaving options to improve QoS between request and response flows on the BE connection.

Figure 14:
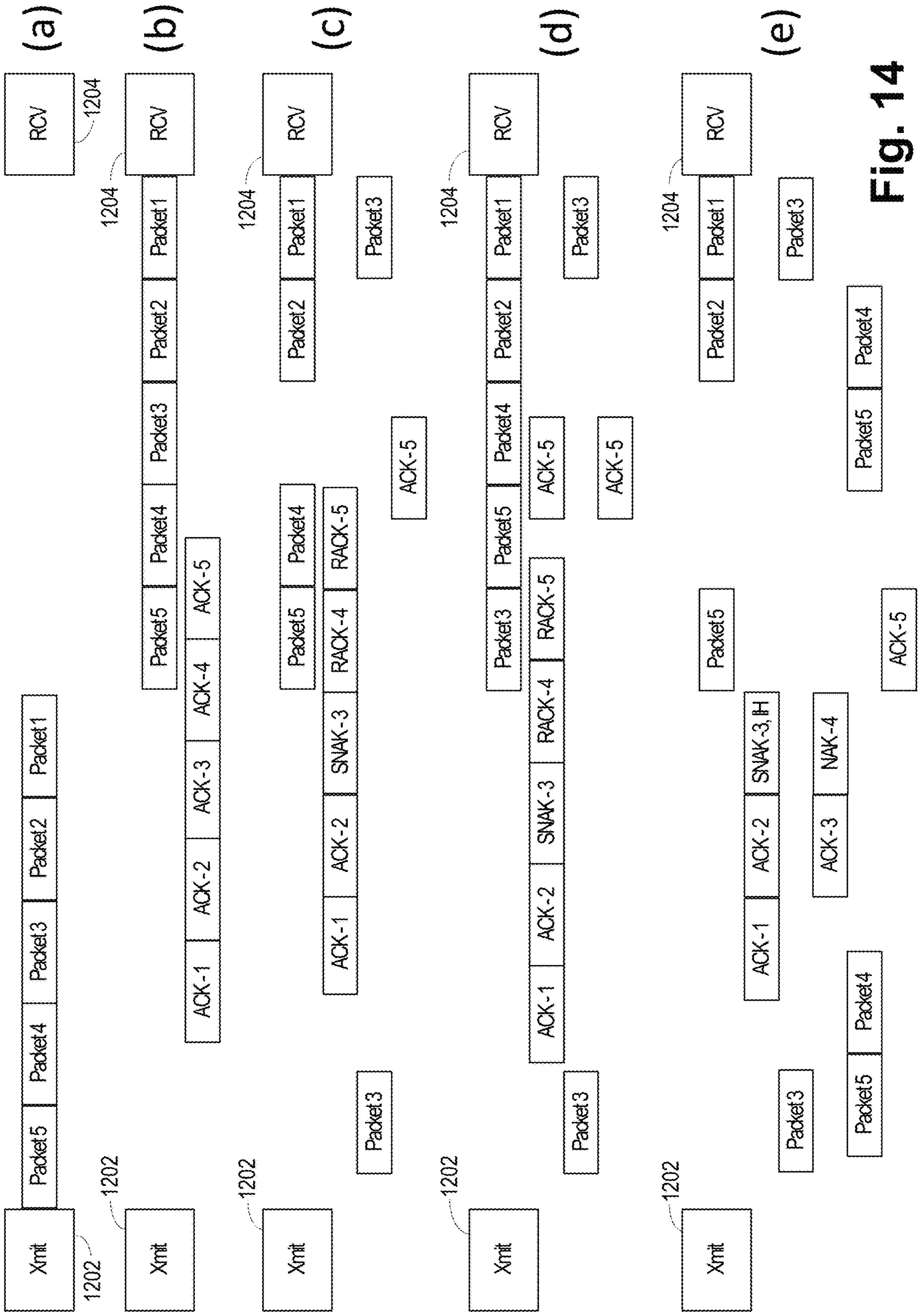
FIG. 14 illustrates transmission of packets and various alternatives for reception of packets.
Figure 18:
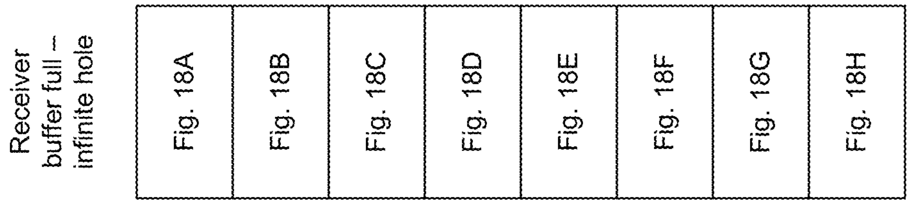
FIG. 18 illustrates the relationship of FIGS. 18A-18H.
Figure 17:
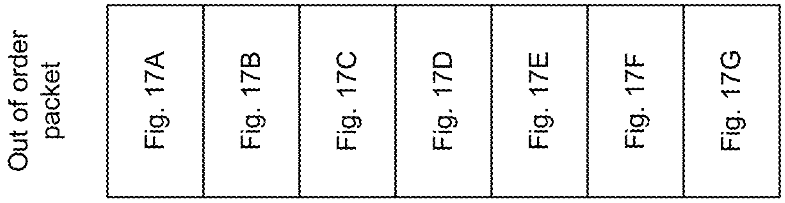
FIG. 17 illustrates the relationship of FIGS. 17A-17G.

FIG. 14 illustrates various examples of packet flow and packet flow problems. An example of transmitting five packets is used to simplify this description, it being understood that transmissions can vary from a single packet to thousands of packets. In row (a), a transmitter 1202 transmits packets 1 to 5 to be received by a receiver 1204. This transmission of five packets sequentially by transmitter 1202 is utilized in the four exemplary packet transfer conditions of rows (b) to (e).

In row (b), the five packets are received successfully and in order at the receiver 1204. In response, the receiver 1204 transmits ACK-1 to ACK-5 response signaling packets to acknowledge the successful receipt of packets one through five.

In row (c), packet three is dropped during transmission, so that the receiver 1204 only receives packets 1, 2, 4 and 5. In response, the receiver 1204 provides an ACK-1, ACK-2, SNAK-3, RACK-4 and RACK-5 response signaling packets. Upon receiving the SNAK-3 response signaling packet, the transmitter 1202 retransmits packet 3. This time, the receiver 1204 successfully receives packet 3 and responds with an ACK-5 response signaling packet.

Row (d) illustrates out of order packet reception, as the receiver 1204 receives packet 1, followed by packet 2, followed by packet 4, followed by packet 5 and concluding with packet 3. The receiver 1204 responds by providing ACK-1, ACK-2, SNAK-3, RACK-4 and RACK-5 response signaling packets. Then, when the receiver 1204 receives the out of order packet 3, the receiver 1204 provides the ACK-5 response signaling packet. The transmitter 1202 will have provided a retransmitted packet 3 based on the SNAK-3 response signaling packet and the receiver 1204 replies with an ACK-5.

Row (e) illustrates the receiver no longer being able to track packet states, which creates an infinite-hole. The receiver 1204 receives packets 1, 2 and 5, with packets 3 and 4 lost. The loss of the two packets is exemplified as sufficient to exceed OOO tracking resources (i.e. in this example, the Receiver can only track a single point-hole at a time), so that a loss of packet state occurs and an infinite-hole is generated with the receipt of packet 5. The receiver 1204 provides ACK-1, ACK-2 and SNAK-3 with infinite-hole response signaling packets. Upon receiving the SNAK-3 with infinite-hole response signaling packet, the transmitter 1202 enters RECOVERY mode and retransmits packet 3. The receiver 1204 receives packet 3 and because the internal tracking resources have been refreshed upon the receipt of packet 3, the receiver 1204 responds with ACK-3 and NAK-4 response signaling packets, the ACK-3 and NAK-4 response signaling packets both indicating a return to ACTIVE mode. The transmitter 1202 responds by sending packets 4 and 5. The receiver 1204 returns an ACK-5, completing the transmission.

Figure 16:
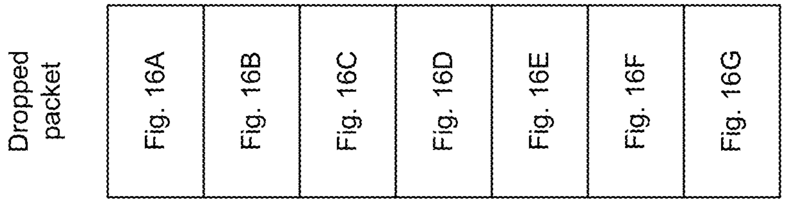
FIG. 16 illustrates the relationship of FIGS. 18A-18G.
Figure 15:
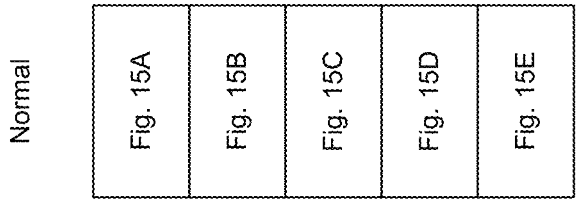
FIG. 15 illustrates the relationship of FIGS. 15A-15E.

FIG. 15 illustrates the relationship of FIGS. 15A-15E. Similarly, FIG. 16 illustrates the relationship of FIGS. 16A-16G, FIG. 17 illustrates the relationship of FIGS. 17A-17G, and FIG. 18 illustrates the relationship of FIGS. 18A-18I.

Figure 15A:
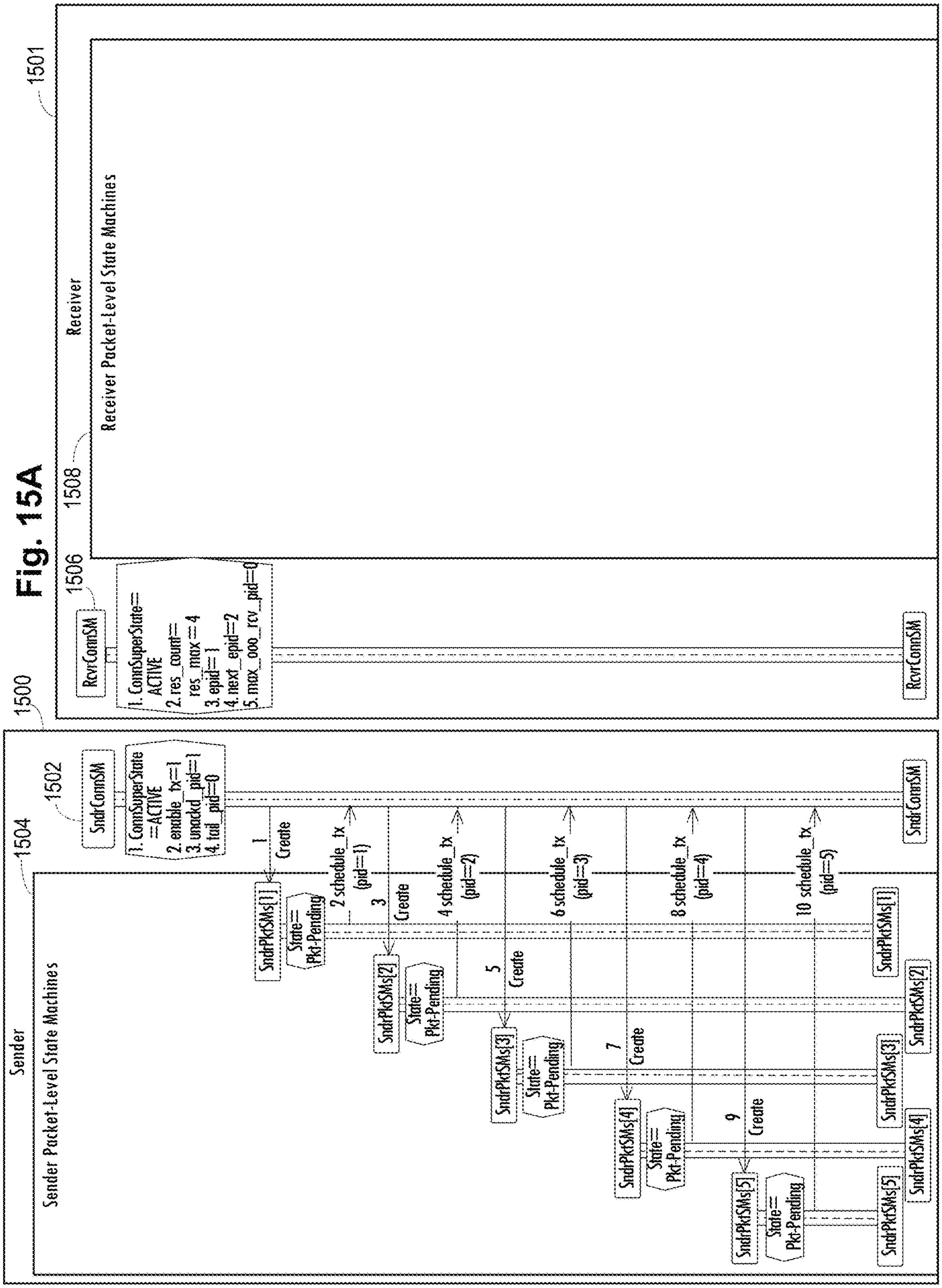
FIGS. 15A-15E illustrate sender and receiver connection-level and packet-level state machine operation for the (b) alternative of reception of packets.

Referring now to FIGS. 15A-15E, this is the state machine operation for the situation of FIG. 14, row (b), where all packets are delivered in order. FIG. 15A illustrates a sender 1500 with a sender connection state machine 1502 and a series of sender packet level state machines 1504 for a single BE RDMA connection. A receiver 1501 with a receiver connection state machine 1506 is illustrated along with receiver packet level state machines 1508 for the BE RDMA connection. The sender connection state machine 1502 and the receiver connection state machine 1506 each belong to a distinct (peer) node and are both in the active connection superstate indicating normal operation. The sender connection state machine 1502 has an unackd_pid value of 1 and enable_tx value of 1. The tail_pid value is 0. The receiver connection state machine 1506 has a res_count and res_max values of 4, an epid value of 1 and a max_000_rcv_pid value of 0. In operation 1, the sender connection state machine 1502 provides a create indication to the sender packet level state machines 1504 and sender packet state machine 1 is created. The sender connection state machine 1502 is informed of the receipt of packets by the host interface 256 or egress buffer memory 268 and the relevant packet context obtained and stored in relevant state machine state and contexts area of the appropriate BE portion in the RAM 263. The sender packet state machine 1 has a state of Pkt-Pending, as shown in FIG. 6A. In operation 2, the sender packet state machine 1 provides a schedule_tx message for PID=1 to the sender connection state machine 1502, as this is the entry action for the Pkt-Pending state. The schedule_tx message is received at the Sender connection state machine 1502 and forward to the egress memory buffer 268 and the egress packet building hardware 259 to cause the packet to be dequeued and placed in the transmit path. In operation 3, the sender connection state machine 1502 provides a create or RX message to the sender packet level state machines 1504, which create sender packet state machine 2 with a state of packet pending. With every message provided to a state machine, connection or packet, the needed context and state are obtained from the relevant state machine state and contexts area of the appropriate BE portion in the RAM 263 and provided with the message to the pool of hardware state machines 283 to allow a particular state machine to operate. In operation 4, the sender packet state machine 2 provides a schedule_tx message for PID=2 to the sender connection state machine 1502. Similar operations 4-10 occur to create sender packet state machines 3, 4 and 5, each with a state of packet pending and send schedule_tx messages for packets 3, 4 and 5.

Figure 15B:
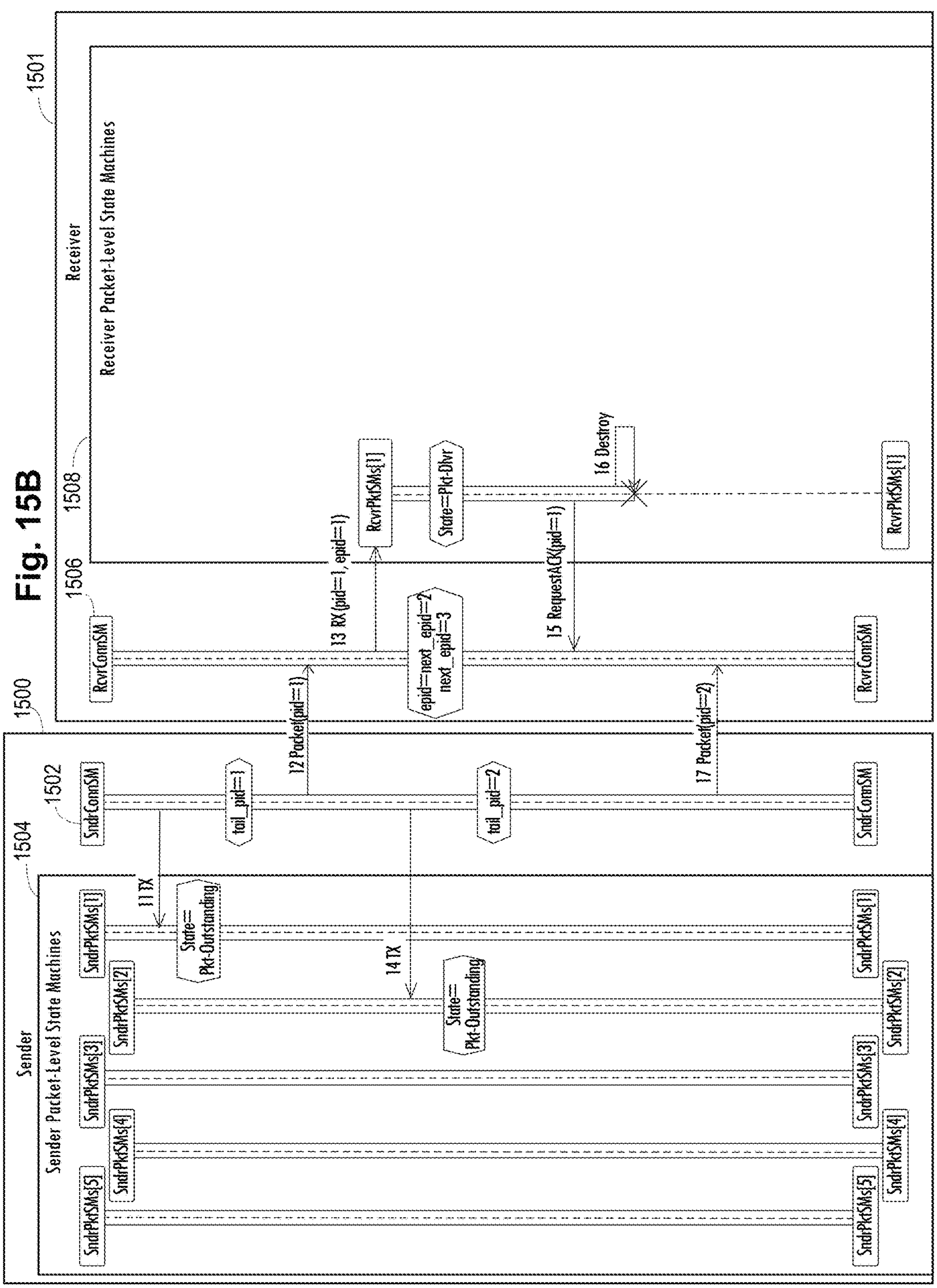

Moving to FIG. 15B, in operation 11, the sender connection state machine 1502 provides a transmit or TX message to the sender packet state machine 1 to indicate packet 1 is being sent. The sender connection state machine 1502 performs this action based on the receipt of a transmit indication from the egress memory buffer 268 and the egress packet building hardware 259 that the packet is in the transmit queue of the Ethernet module 267. This action is the do: TX(pid)→{update(PktStateMachines[p=pid], TX) update(tail_pid)} statement in the sender connection state machine ACTIVE superstate of FIG. 8A. Sender packet state machine 1 proceeds to packet outstanding state. The sender connection state machine 1502 increments the tail PID value to 1. In operation 12, the sender connection state machine 1502 transmits packet 1 (PID=1) to the receiver connection state machine 1506. It is understood that the sender connection state machine 1502 does not actually send the packet but does instruct the packet handling hardware, such as the egress buffer memory 268 and egress packet building hardware 259, to send the packet based on receipt of a schedule_tx message or on its own accord. Similarly, the receiver connection state machine 1506 does not actually receive the packet but is provided an indication by the ingress packet handling hardware, such as the ingress buffer memory 266 and the ingress packet processing and routing hardware 257, that the packet has arrived. With that indication of packet arrival, the context and state for the relevant hardware state machine are retrieved from the relevant BE portion in the RAM 263.

Based on the packet receipt indication, the receiver connection state machine 1506 performs the do-first: RX(pid≥epid)→update(PktStateMachines[p≥epid], RX) statement in the ACTIVE state machine of FIG. 9A, and in operation 13, the receiver connection state machine 1506 provides an RX message with a PID of 1 and an expected PID of 1 to the receiver packet level state machines 1508, which creates receiver packet state machine 1 with a state of packet delivered, as shown in FIG. 7A based on the RX(pid=p==epid) condition. In operation 14, the sender connection state machine 1502 provides a transmit message to the sender packet state machine 2, which transitions to state packet outstanding. The sender connection state machine 1502 increments the tail PID value to 2. In operation 15, the receiver packet state machine 1 provides a request ACK message for PID=1 to the receiver connection state machine 1506 as that is the entry action of the Pkt-Dlver state and in operation 16, the receiver packet state machine 1 terminates operation, as that the exit from the Pkt-Dlver state, referred to as destroying itself. On receipt of the request ACK message, the receiver connection state machine 1506 informs the egress packet building hardware 259 to prepare an ACK signaling packet for the indicated PID. The receiver connection state machine 1506 advances to an expected PID or epid value of 2, the previous next_epid value, and the next_epid value is increased to 3. In operation 17, packet 2 (PID=2) is provided by the sender connection state machine 1502 and received by the receiver connection state machine 1506.

Figure 15C:
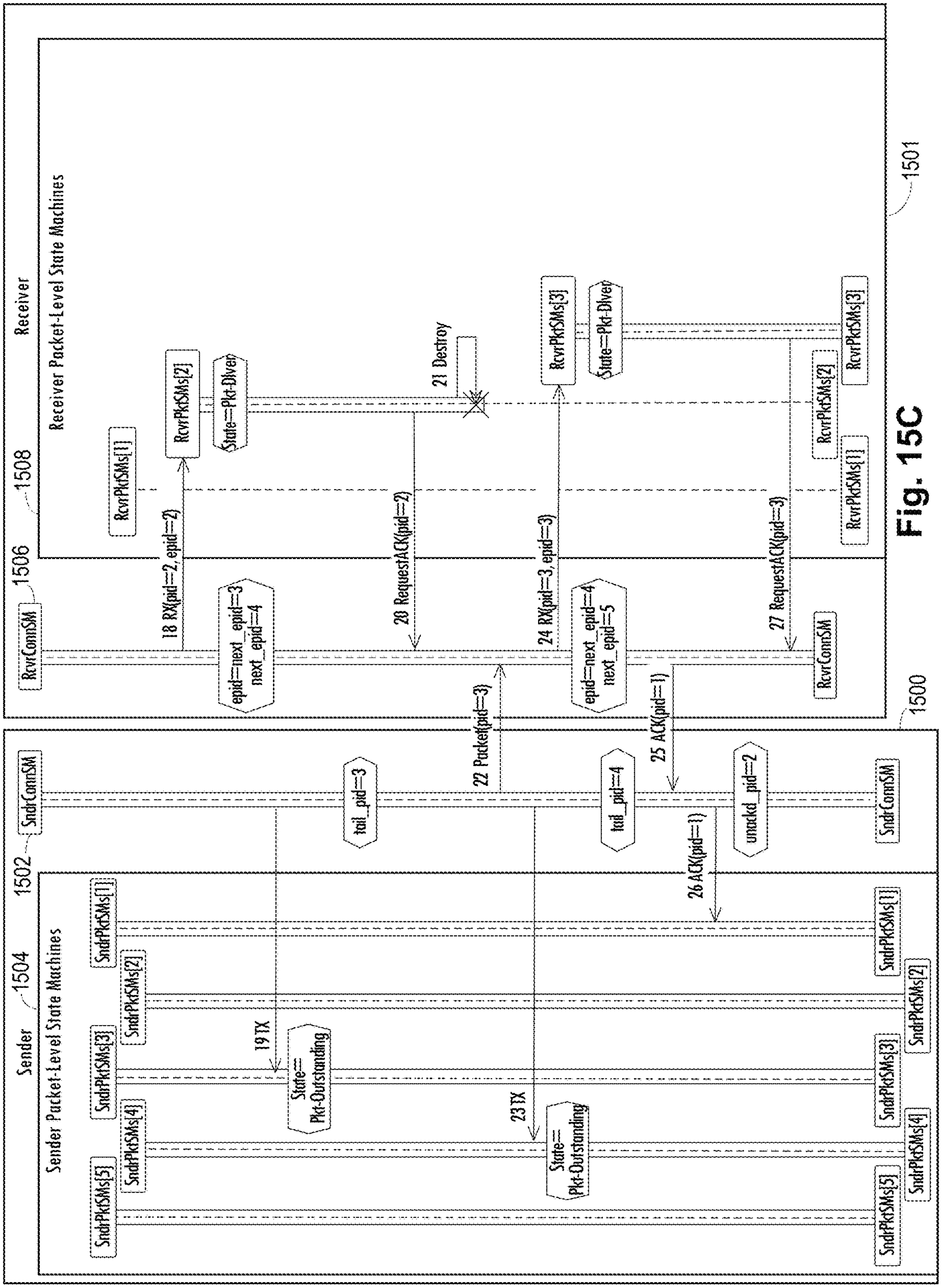

In FIG. 15C, in response, in operation 18 the receiver connection state machine 1506 provides an RX message, with PID of 2 and expected PID of 2, to the receiver packet level state machines 1508, which creates receiver packet state machine 2 with a state of packet delivered. The epid value is updated to the next_epid value of 3 and the next_epid value is incremented to 4. In operation 19, the sender connection state machine 1502 provides a transmit message to the sender packet state machine 3, which advances to a state of packet outstanding. The sender's connection state machine increments the tail PID value to 3. In operation 20, the receiver packet state machine 2 issues a request ACK message for PID=2 to the receiver connection state machine 1506 and in operation 21 terminates itself. In operation 22, the sender connection state machine 1502 provides packet 3 (PID=3) to the receiver connection state machine 1506. In operation 23, the sender connection state machine 1502 provides a transmit message to the sender packet state machine 4, which advances to a state of packet outstanding. The sender connection state machine 1502 increments the tail PID value to 4. In operation 24, the receiver connection state machine 1506 provides an RX message, with PID of 3 and expected PID of 3, to the receiver packet level state machines 1508, which causes the creation of receiver packet state machine 3 with a state of packet delivered. The epid value is updated to the next_epid value of 4 and the next_epid value is incremented to 5. In operation 25, the receiver connection state machine 1506 provides an ACK response signaling packet with PID=1 to the sender connection state machine 1502. As above, the sender connection state machine 1502 does not actually receive the packet but is provided an indication by the ingress packet handling hardware, such as the ingress buffer memory 266 and the ingress packet processing and routing hardware 257, that the packet has arrived. With that indication of packet arrival, the context and state for the relevant hardware state machine are retrieved from the relevant BE portion in the RAM 263.

Figure 15D:
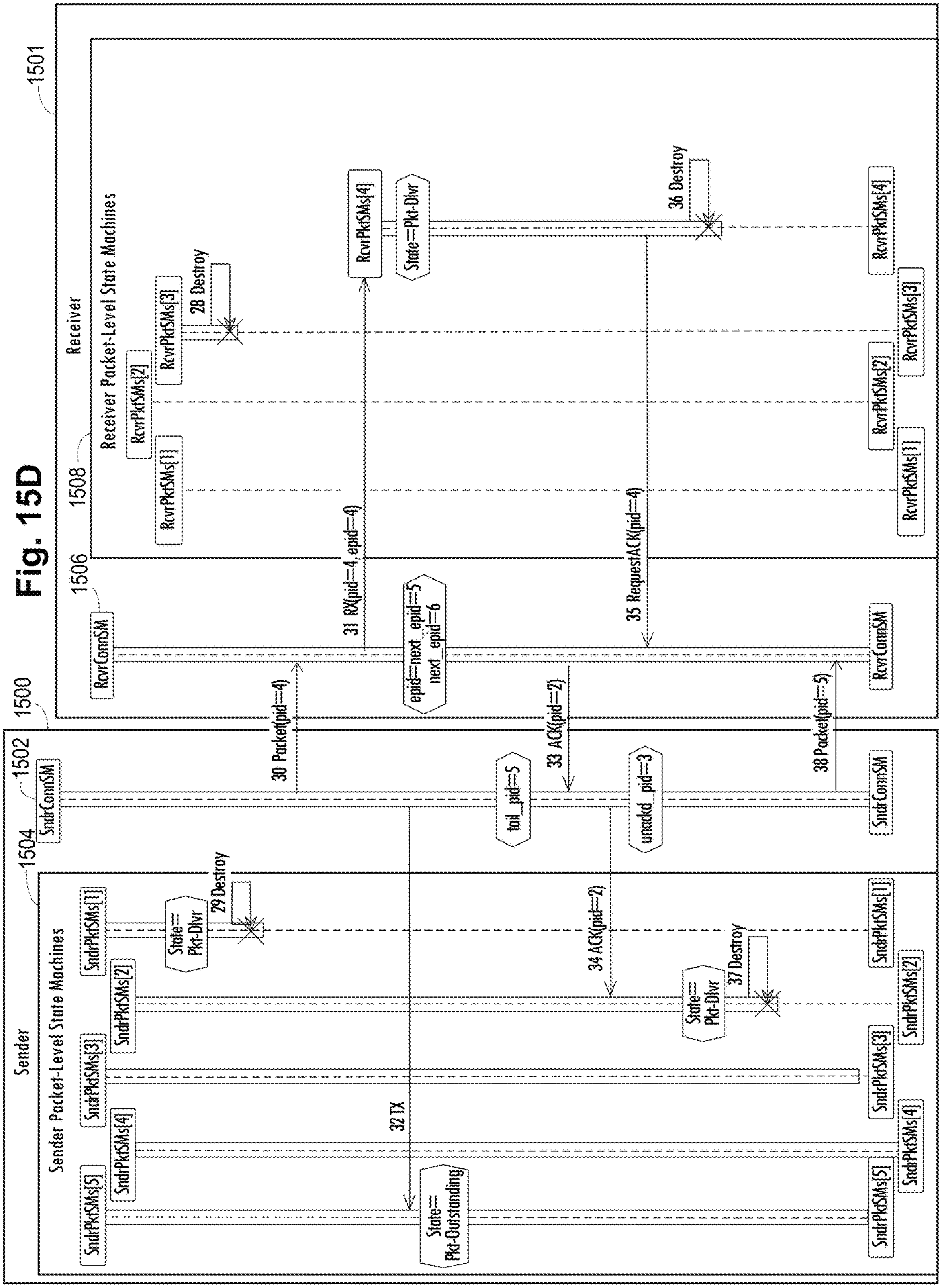

In operation 26, the sender connection state machine 1502 provides an ACK message with a PID of 1 to the sender packet state machine 1, which advances to a state of packet delivered (FIG. 15D). The ACK message is based on the do: ACK(pid≠tail_pid)→{reset(RTO Timer); update(PktStateMachines[p≤pid], ACK); set(unackd_pid, pid+1)} statement in FIG. 8A. The sender packet state machine 1 advancing to state Pkt-Dlvr is based on the ACK(pid≥p) condition as seen in FIG. 6A. The sender connection state machine 1502 increments the unacknowledged PID value to two, having had packet 1 acknowledged. In operation 27, the receiver packet state machine 3 provides a request ACK message for PID=3 to the receiver connection state machine 1506.

Referring to FIG. 15D, in operation 28 the receiver packet state machine 3 terminates itself. In operation 29, the sender packet state machine 1 terminates operation. In operation 30, the sender connection state machine 1502 transmits packet 4 (PID=4) to the receiver connection state machine 1506. In operation 31, the receiver connection state machine 1506 provides an RX message, with a PID of 4 and expected PID of 4, to the receiver packet level state machines 1508, which causes the creation of receiver packet state machine 4 with the state of packet delivered. The receiver connection state machine 1506 changes the epid value to the next_epid value of 5 and increments the next_pid value to 6. In operation 32, the sender connection state machine 1502 provides a transmit message to the sender packet state machine 5, which enters a state of packet outstanding. The sender connection state machine 1502 increments the tail PID value to 5. In operation 33, the receiver connection state machine 1506 provides the ACK response signaling packet with a PID of 2 to the sender connection state machine 1502. The sender connection state machine 1502 forwards an ACK message with a PID of 2 in operation 34 to the sender packet state machine 2 and increments the unacknowledged PID value to 3. The sender packet state machine 2 advances to packet delivered state. In operation 35, the receiver packet state machine 4 provides a request ACK message for PID of 4 to the receiver connection state machine 1506. In operation 36, the receiver packet state machine 4 terminates operation. The sender packet state machine 2 terminates in operation 37. In operation 38, the sender connection state machine 1502 provides packet 5 (PID=5) to the receiver connection state machine 1506.

Figure 15E:
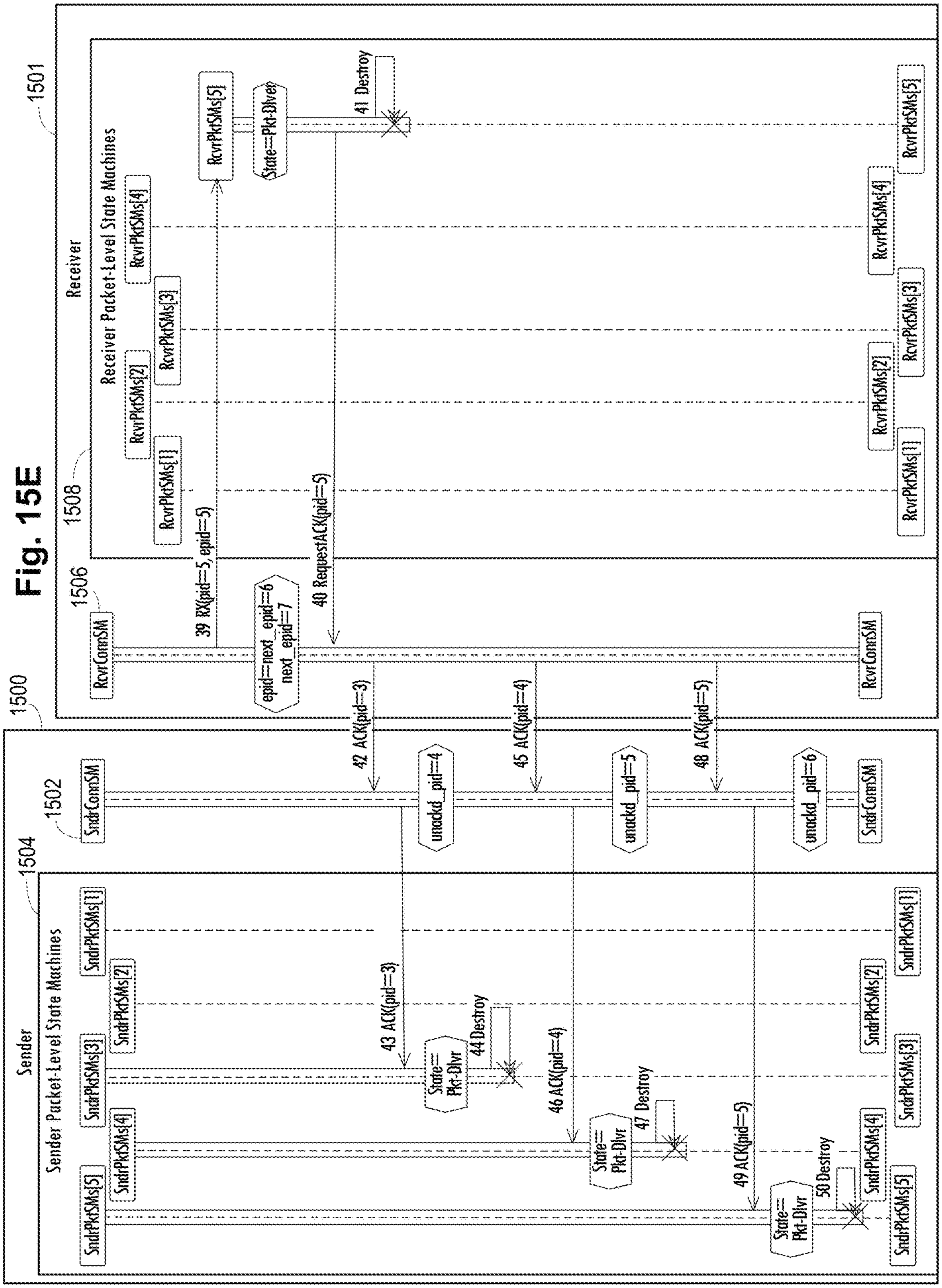

Moving to FIG. 15E, in operation 39, the receiver connection state machine 1506 provides an RX message, with a PID of 5 and expected packet ID of 5, to the receiver packet level state machines 1508, which causes the creation of receiver packet state machine 5 with a state of packet delivered. The receiver connection state machine 1506 changes the epid value to the next_epid value of 6 and increments the next_pid value to 7. In operation 40, the receiver packet state machine 5 provides a request ACK message for PID of 5 to the receiver connection state machine 1506. In operation 41, receiver packet state machine 5 terminates operation. In operation 42, the receiver connection state machine 1506 provides an ACK response signaling packet with a PID of 3 to the sender connection state machine 1502. In operation 43, the sender connection state machine 1502 provides an ACK message with a PID of 3 to the sender packet state machine 3, which advances to a state of packet delivered and in operation 44 terminates operation. The sender connection state machine 1502 increases the unackd_pid value to 4. In operation 45, the receiver connection state machine 1506 provides an ACK response signaling packet for PID of 4 to the sender connection state machine 1502. The sender connection state machine 1502 provides an ACK message with a PID of 4 in operation 46 to the sender packet state machine 4, which advances to packet delivered state. The sender connection state machine 1502 advances the unacknowledged PID value to 5. In operation 47, the sender packet state machine 4 terminates operation. In operation 48, the receiver connection state machine 1506 provides the ACK response signaling packet for PID of 5 to the sender connection state machine 1502. Upon receipt of the ACK response signaling packet for PID of 5, the sender connection state machine 1502 provides an ACK message with a PID of 5 in operation 49 to the sender packet state machine 5 and increments the unackd_pid value to 6. The sender packet state machine 5 advances to the state of packet delivered and in operation 50 terminates operation.

Referring now to FIGS. 16A-16G, this is the state machine operation for the situation of FIG. 14, row (c) where packet 3 is dropped. Operations are the same as FIGS. 15A and 15B through operation 21. Beginning in operation 22 in FIG. 16C, the operations begin differing because of the dropped packet 3. Operation 22 indicates that packet 3 is dropped. In operation 23, the sender connection state machine 1502 provides a transmit message to sender packet state machine 4, which then enters packet state packet outstanding. The sender connection state machine 1502 increments the tail PID value to 4. In operation 24, the receiver connection state machine 1506 provides the ACK response signaling packet for packet 1 to the sender connection state machine 1502. In operation 25, the sender connection state machine 1502 provides an ACK message with a PID of 1 to the sender packet state machine 1, which changes state to packet delivered. The unackd_pid value is increased to 2 by the sender connection state machine 1502.

Figure 16A:
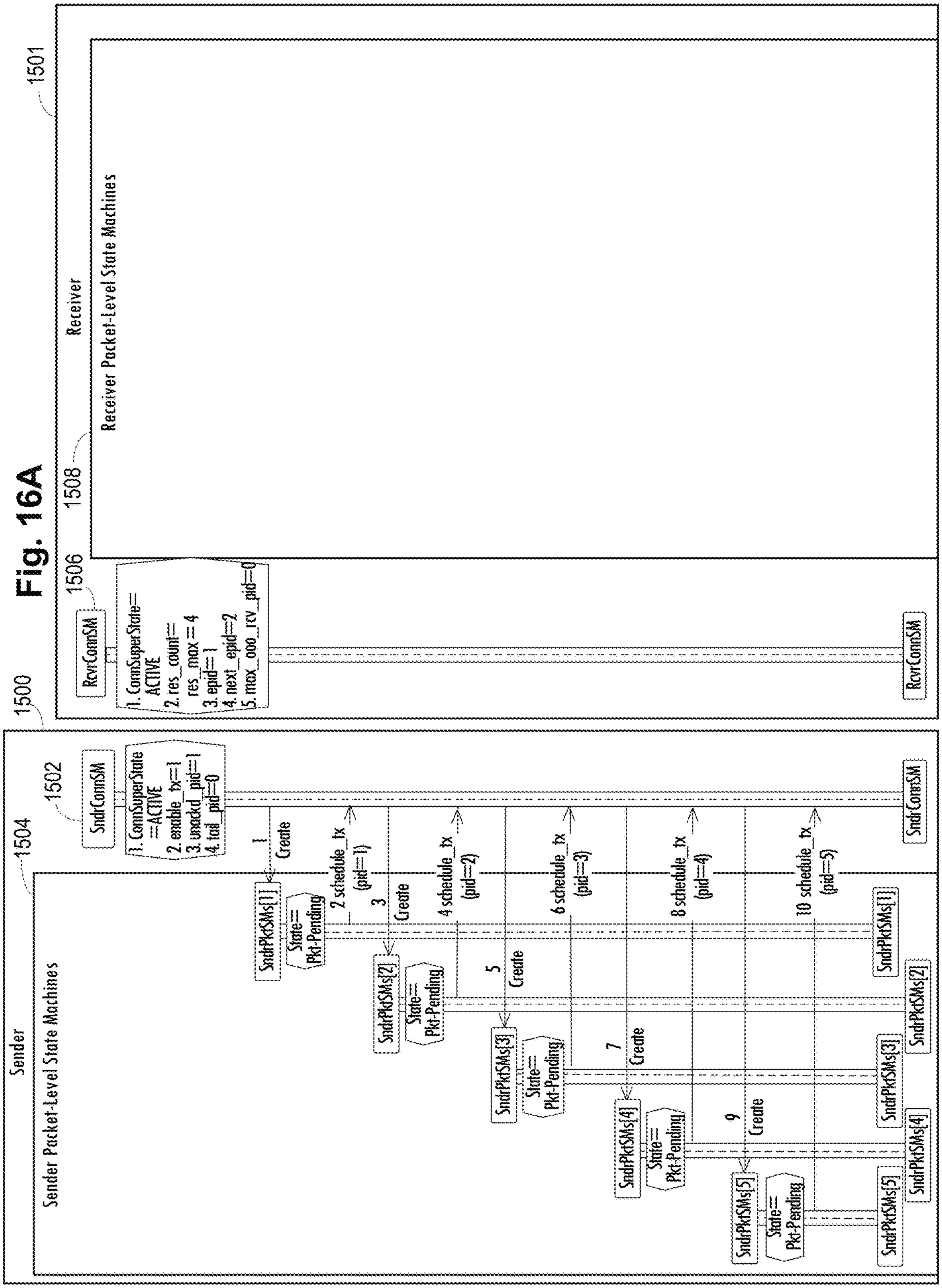
FIGS. 16A-16G illustrate sender and receiver connection-level and packet-level state machine operation for the (c) alternative of reception of packets.
Figure 16B:
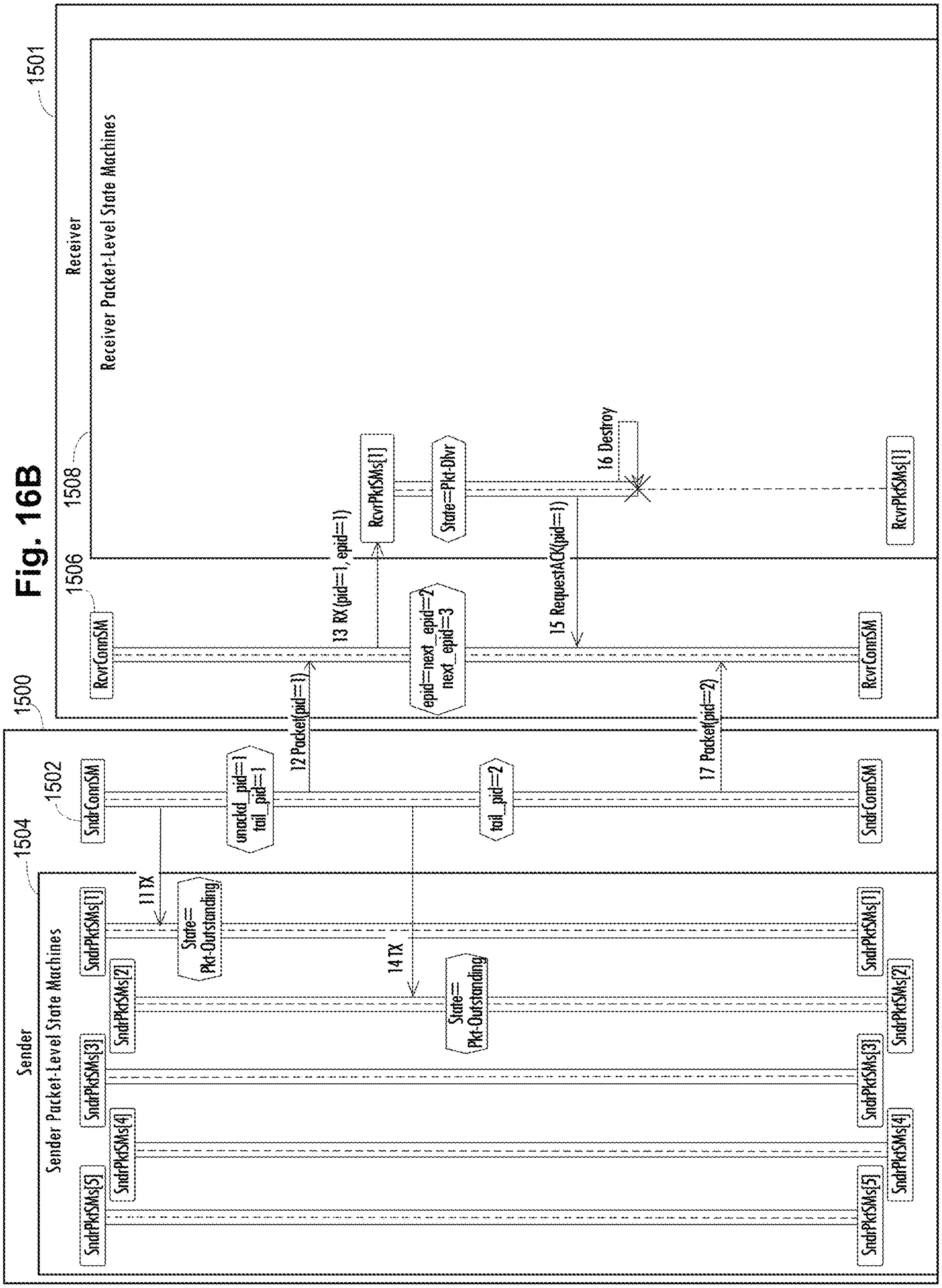
Figure 16C:
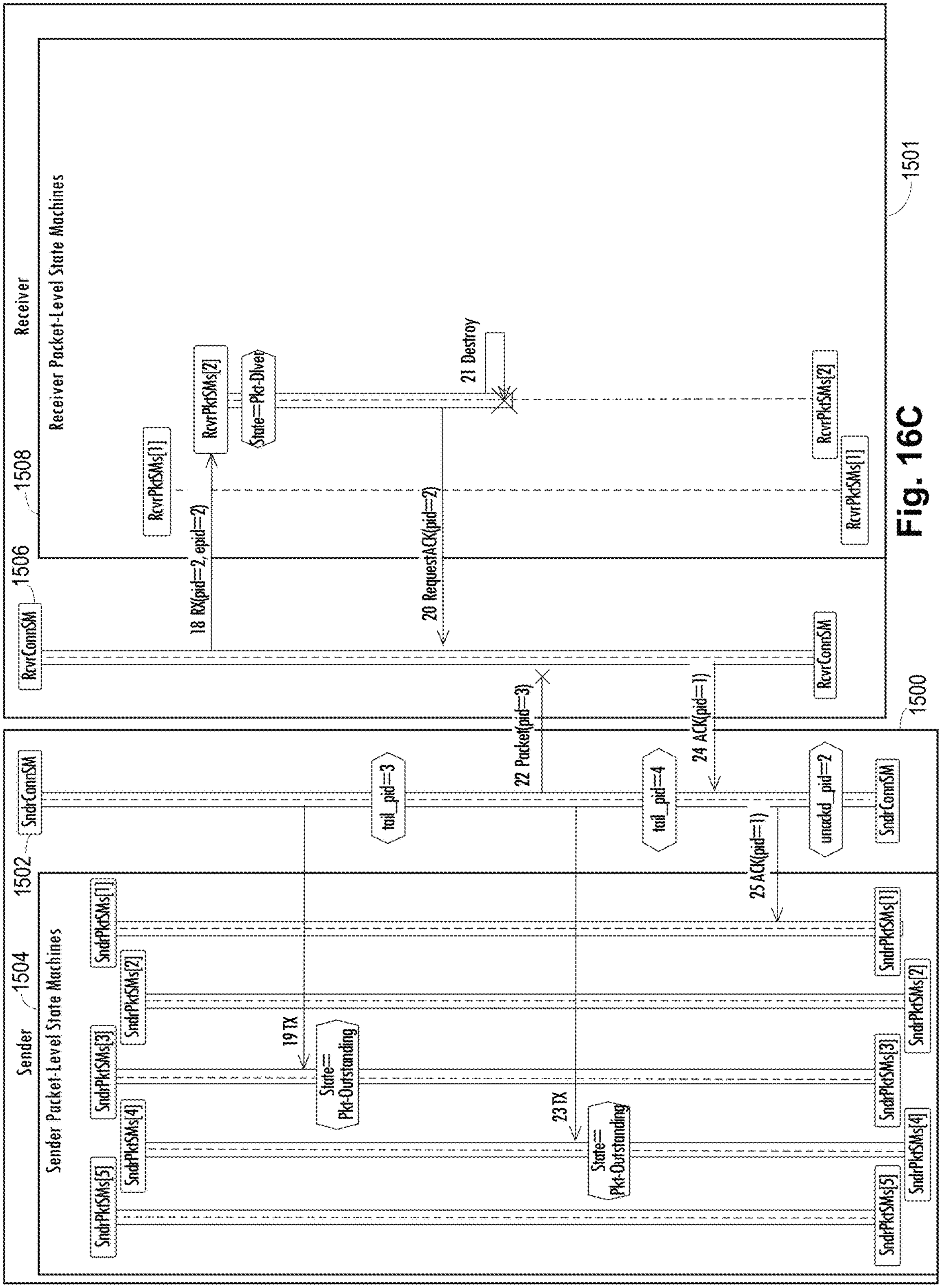
Figure 16D:
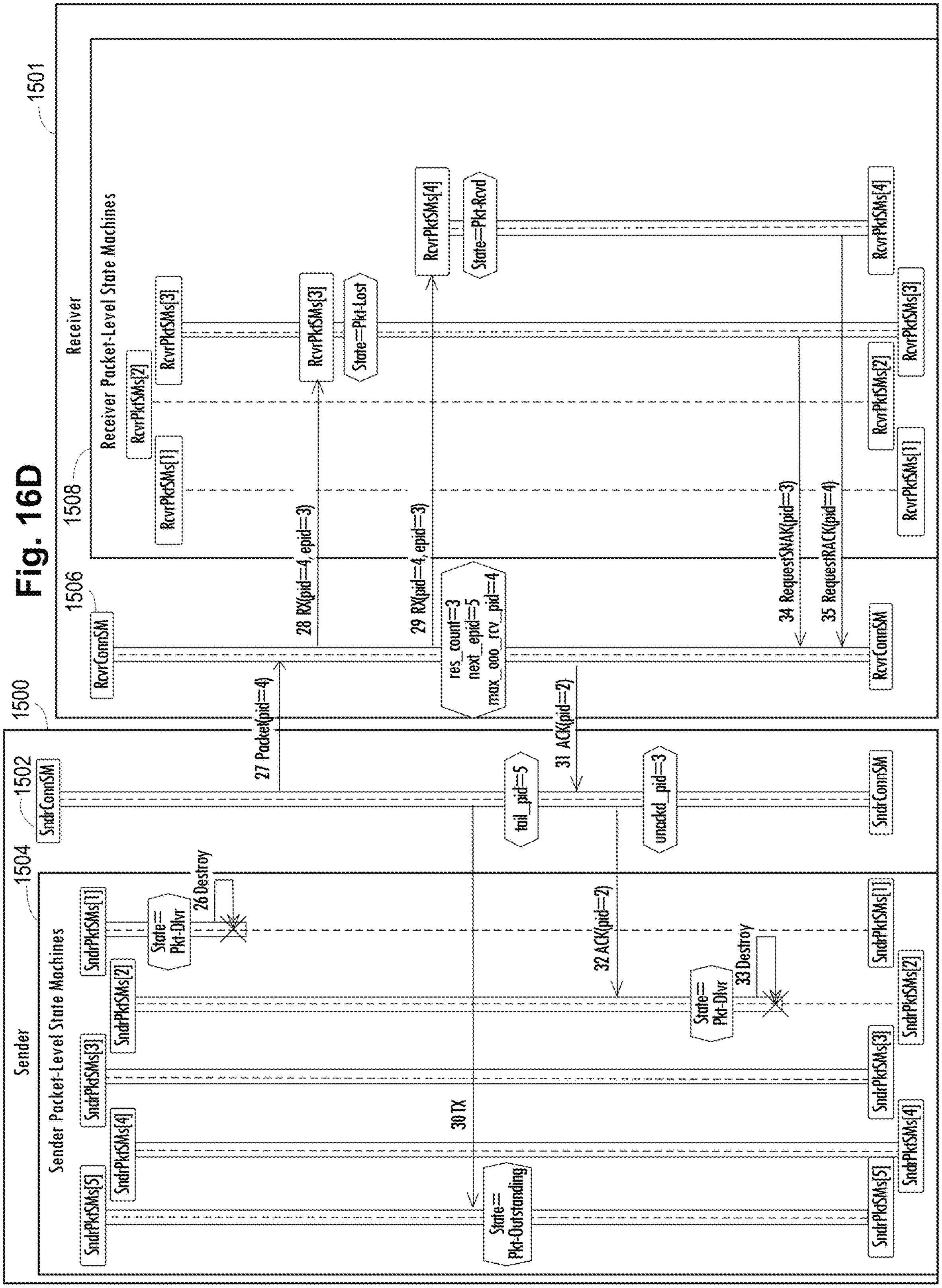

In FIG. 16D, in operation 26 the sender packet state machine 1 terminates. In operation 27, the sender connection state machine 1502 provides packet 4 (PID=4) to the receiver connection state machine 1506. The receiver connection state machine 1506 performs the do-first: RX(pid≥epid)→update(PktStateMachines[p≥epid], RX) statement of FIG. 8A which causes RX messages to be transmitted for receiver packet state machines 3 and 4. In operation 28, an RX message to create receiver packet state machine 3 is provided and the receiver packet state machine 3 starts in a state of packet lost, because packet 4 has been received but packet 3 has not been received, as indicated by the pid=4, epid=3 parameter of the RX message, which causes the state machine to follow the RX(pid>p) condition. In operation 29, a create receiver packet state machine 4 request is provided. Receiver packet state machine 4 starts in a packet received state. Here the state machine uses the pid=4, epid=3 parameter of the RX message to take the RX(pid=p>epid) condition to the Pkt-Rcvd state. The receiver connection state machine 1506 decreases the res_count value to 3, as one out of order resource has been used. The next_epid value increments to 5 and a max_000_rcv_pid value is set to 4. In operation 30, the sender connection state machine 1502 provides a transmit message to sender packet state machine 5, which advances to packet outstanding state. The sender connection state machine 1502 increments the tail PID value to 5. In operation 31, the receiver connection state machine 1506 provides the ACK response signaling packet for packet 2 to the sender connection state machine 1502. An ACK message with a PID value of 2 is provided in operation 32 to the sender packet state machine 2. The sender packet state machine 2 advances to the packet delivered state and in operation 33 terminates. After operation 32, the sender connection state machine 1502 increments the unacknowledged PID value to 3. In operation 34, the receiver packet state machine 3 provides a request SNAK message for packet 3 to the receiver connection state machine 1506 as that is the entry action of the Pkt-Lost state. In operation 35, receiver packet state machine 4 provides a request RACK message indicating packet 4 to the receiver connection state machine 1506, as that is the entry action of the Pkt-Rcvd state.

Figure 16E:
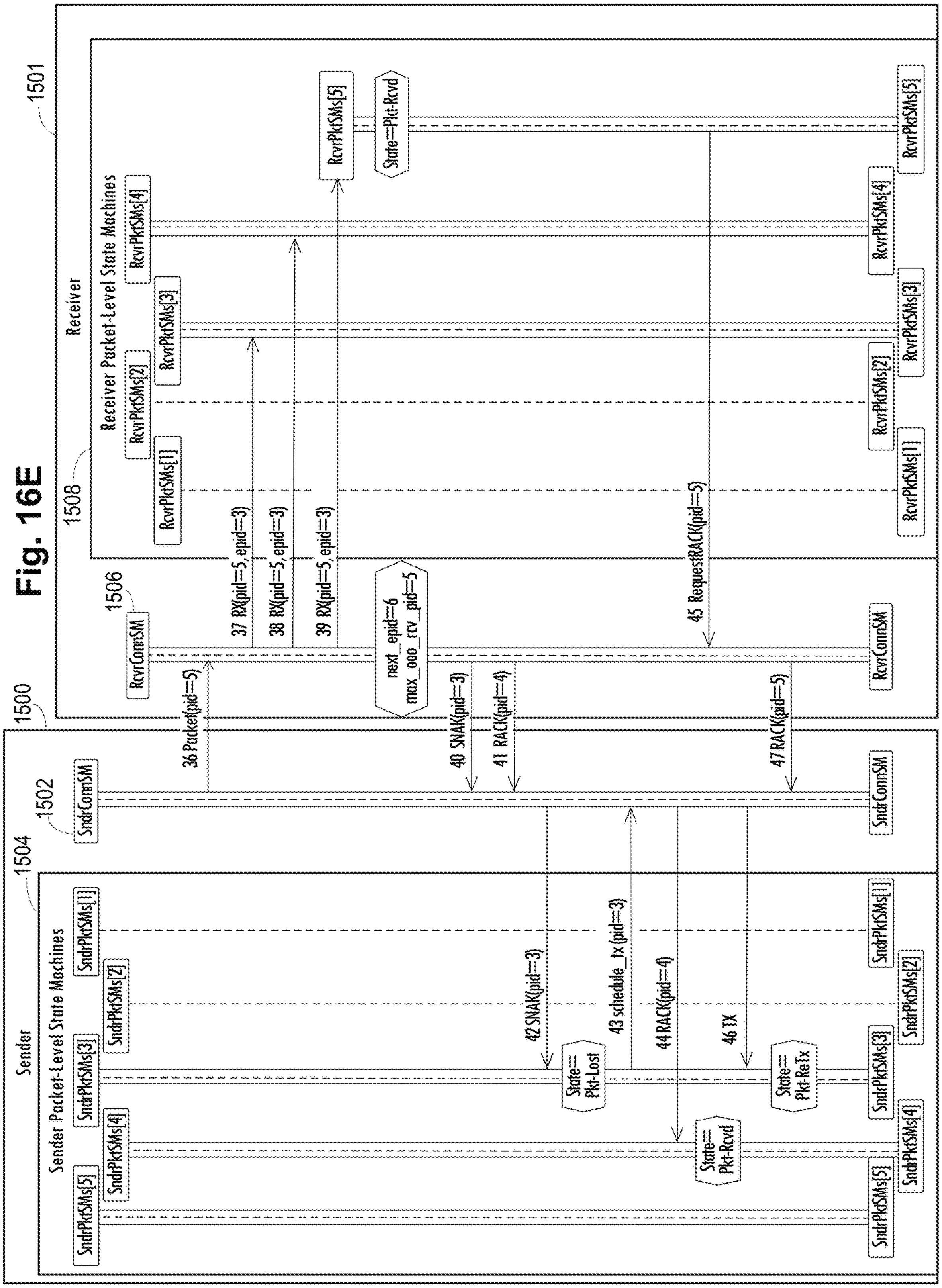

In FIG. 16E, in operation 36, the sender connection state machine 1502 provides packet 5 (PID=5) to the receiver connection state machine 1506. In operation 37, the receiver connection state machine 1506 provides a packet 5 received packet message with an epid of 3 to the receiver packet state machine 3 and in operation 38 provides a received packet 5 message with an epid of 3 to receiver packet state machine 4, and in both cases it has no effect in the packet state machine. In operation 39, receiver packet state machine 5 is created from a message with a PID value of 5 and an expected PID value of 3 and opens in a state of packet received. The receiver connection state machine 1506 increments the next_epid value to 6 and the max_000_rcv_pid value to 5. In operation 40, the SNAK response signaling packet for packet 3 is provided from the receiver connection state machine 1506 to the sender connection state machine 1502. In operation 41, the RACK response signaling packet for packet 4 is provided from the receiver connection state machine 1506 to the sender connection state machine 1502. In operation 42, the sender connection state machine 1502 provides a SNAK message with a PID of 3 to sender packet state machine 3 based on the do: SNAK(pid)→{update (PktStateMachines[p=pid], SNAK); update(tail_pid)} statement. Sender packet state machine 3 enters the packet lost state based on the SNAK(pid=p) condition. In operation 43, the sender packet state machine 3 provides a schedule_tx message for packet 3 to the sender connection state machine 1502 to have packet 3 retransmitted, the entry action of the Pkt-Lost state. In operation 44, the sender connection state machine 1502 provides a RACK message with a PID of 4 to the sender packet state machine 4 based on the do: RACK (pid)→{update(PktStateMachines[p=pid], RACK); update (tail_pid)} statement. Sender packet sate machine 4 enters the packet received state based on the RACK (pid=p) condition. In operation 45, the receiver packet state machine 5 provides a RACK request for packet 5 to the receiver connection state machine 1506. In operation 46, the sender connection state machine 1502 provides a transmit message for packet 3 to the sender packet state machine 3, which enters a packet retransmitted state. In operation 47, the RACK response signaling packet for packet 5 is provided from the receiver connection state machine 1506 to the sender connection state machine 1502.

Figure 16F:
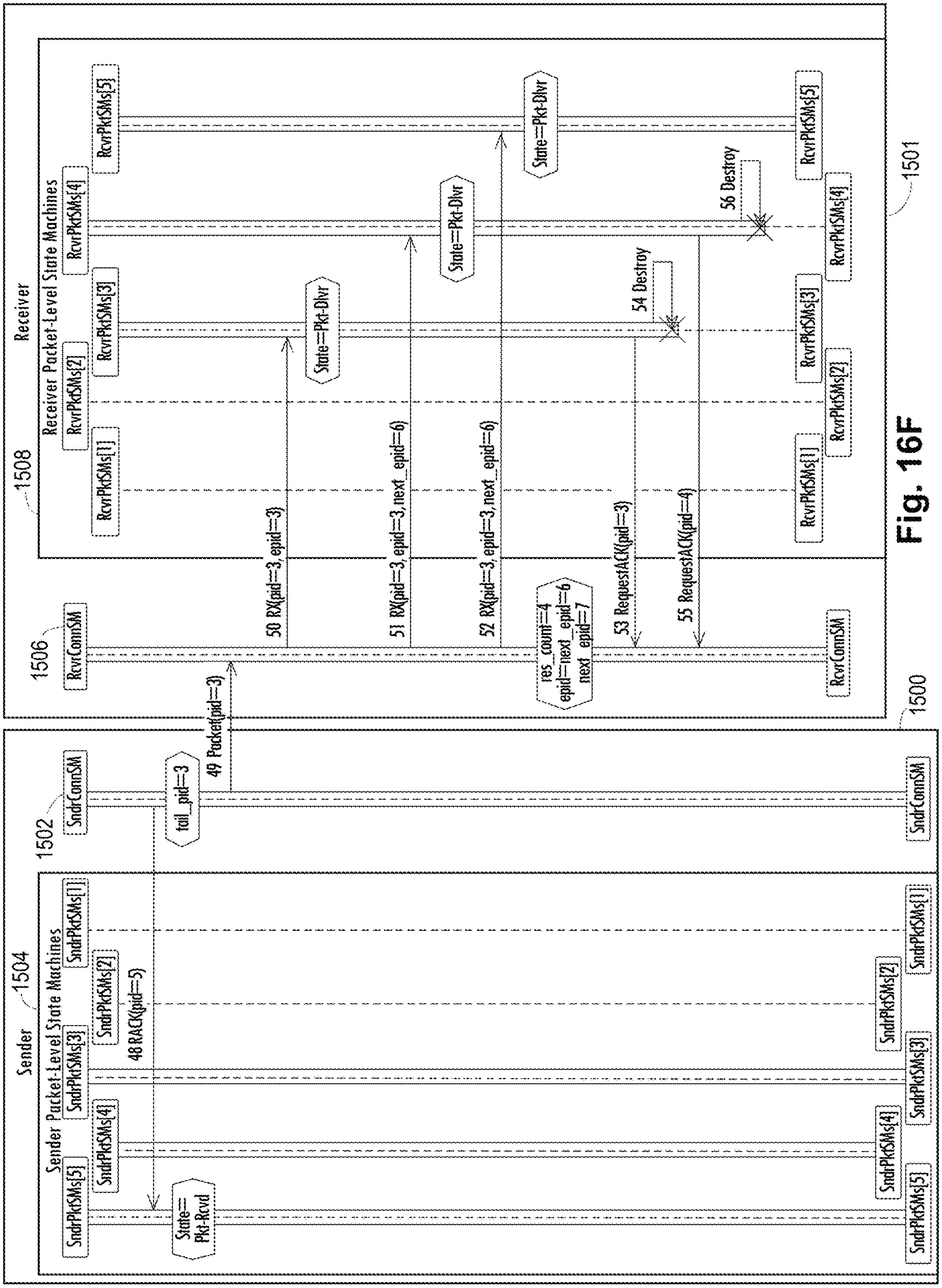

Referring to FIG. 16F, in operation 48, the sender connection state machine 1502 provides a RACK message with a PID of 5 to the sender packet state machine 5, which advances to packet received state. The tail PID value is updated back to 3 for the sender connection state machine 1502. In operation 49, the sender connection state machine 1502 provides the retransmitted packet 3 (PID=3) to the receiver connection state machine 1506. Based on the do-first: RX(pid≥epid)→update(PktStateMachines[p≥epid], RX) statement the receiver connection state machine 1506 updates receiver packet state machines 3, 4 and 5. In operation 50, the receiver connection state machine 1506 provides a received message for packet 3, with a PID value of 3 and an expected PID value of 3, to receiver packet state machine 3, which then advances to the packet delivered state based on the RX(pid=p==epid) condition. In operation 51, the receiver connection state machine 1506 provides a received message for packet 3, with PID value of 3, expected PID value of 3 and next_epid of 6, to receiver packet state machine 4, which enters packet delivered state based on the RX(pid==epid<p) condition. In operation 52, the receiver connection state machine 1506 provides the received packet 3 indication, with PID value of 3, the expected PID value of 3 and next_epid of 6, to the receiver packet state machine 5. The received packet state machine 5 advances to the packet delivered state based on the RX(pid==epid<p) condition. The resource counter, res_count, increases to 4 now that the missing packet has been received. The epid value is set to the next_epid value of 6 and next_epid increases to 7. In operation 53, receiver packet state machine 3 provides a request for an ACK message for a PID of 3 to the receiver connection state machine 1506, the entry action of the Pkt-Dlvr state. In operation 54, the receiver packet state machine 3 terminates. In operation 55, receiver packet state machine 4 provides the request ACK message for a PID of 4 to the receiver connection state machine 1506, the entry action of the Pkt-Dlvr state. In operation 56, receiver packet state machine 4 terminates.

Figure 16G:
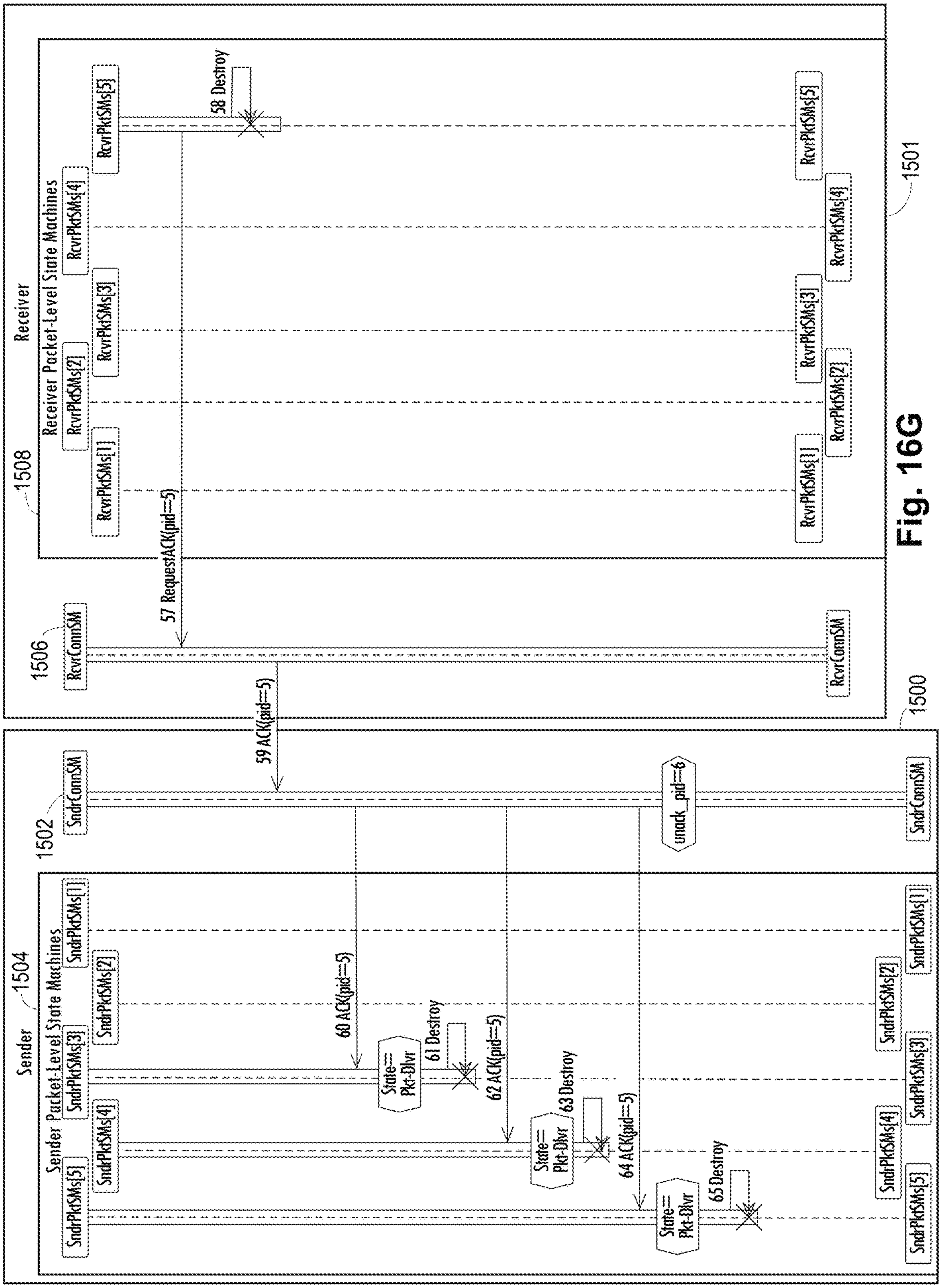

Referring to FIG. 16G, in operation 57, the receiver packet state machine 5 provides the request ACK message for PID of 5 to the receiver connection state machine 1506, the entry action of the Pkt-Dlvr state. In operation 58, the receiver packet state machine 5 completes operation. In operation 59, the ACK response signaling packet for packet 5 is provided from the receiver connection state machine 1506 to the sender connection state machine 1502, cumulatively acknowledging packets 3, 4 and 5. Based on the do: ACK(pid==tail_pid)→{clear(RTO Timer); update(PktStateMachines[pspid], ACK); set(unackd_pid, pid+1)} in operation 60, the sender connection state machine 1502 provides an ACK message for packet 5 to the sender connection state machine 3, which goes into a state of packet delivered based on the ACK(pid≥p) condition. In operation 61, the sender packet state machine 3 terminates. Based on the do: ACK(pid≠tail_pid)→{reset(RTO Timer); update (PktStateMachines[pspid], ACK); set(unackd_pid, pid+1)} statement, in operation 62, an ACK message for packet 5 is provided by the sender connection state machine 1502 to the sender packet state machine 4, which enters a state of packet delivered and in operation 63 terminates. In operation 64, an ACK message for packet 5 is also provided to the sender packet state machine 5 which enters a state of packet delivered. The sender connection state machine 1502 increases the unack_pid value to 6. In operation 65 the sender packet state machine 5 terminates. With this, the scenario of FIG. 14 row (c) is complete.

Figure 17A:
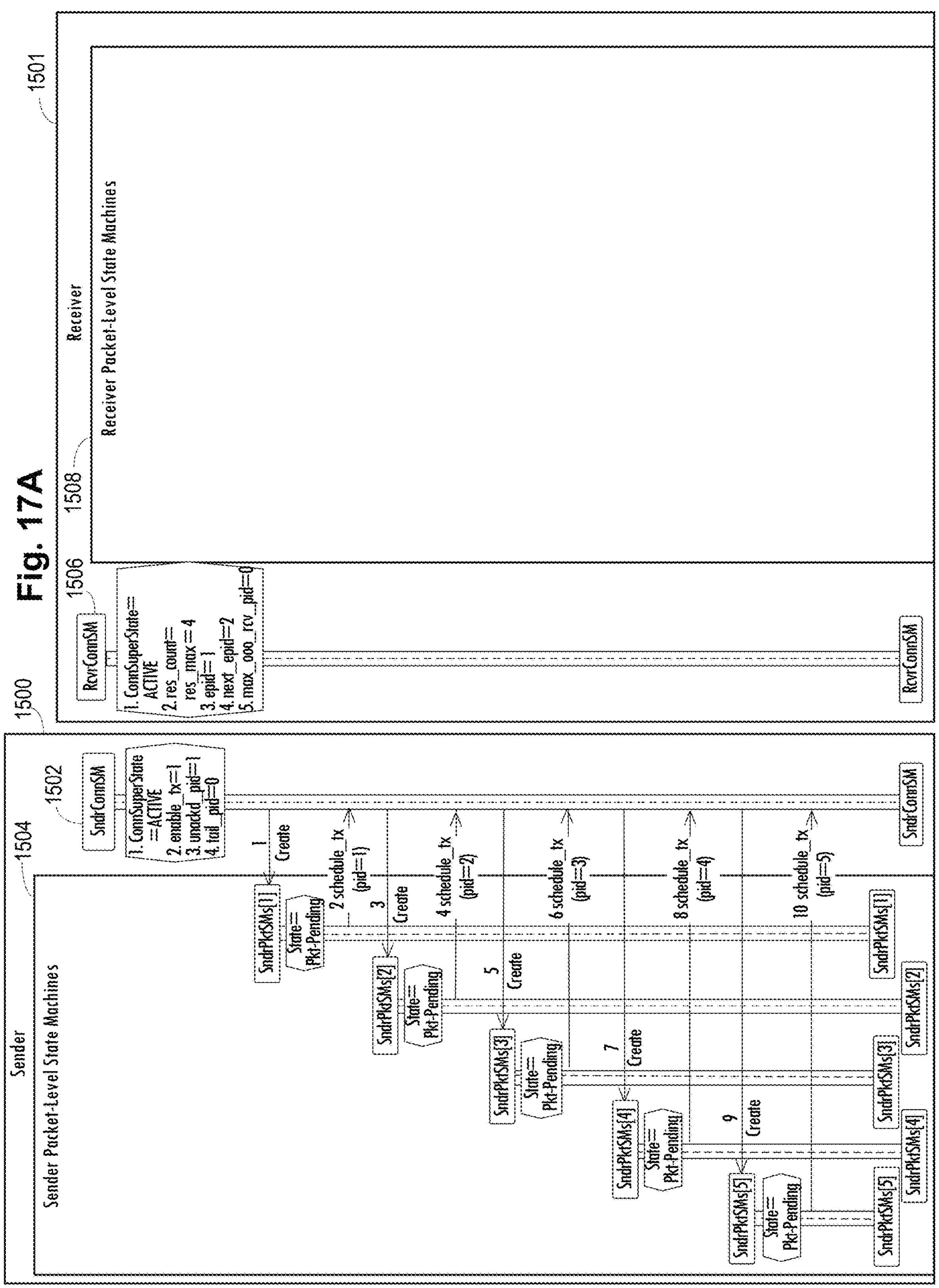
FIGS. 17A-17G illustrate sender and receiver connection-level and packet-level state machine operation for the (d) alternative of reception of packets.
Figure 17B:
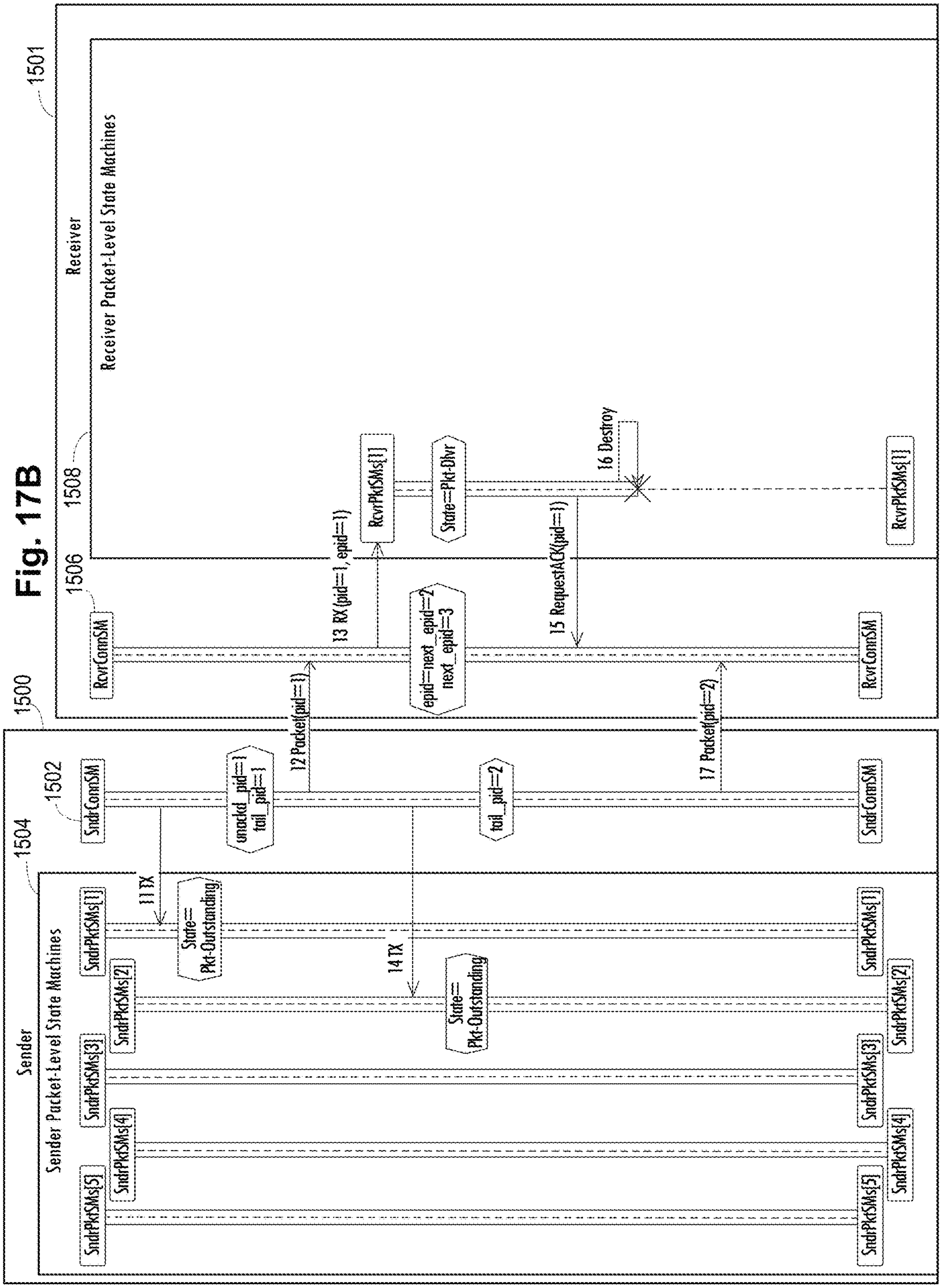
Figure 17C:
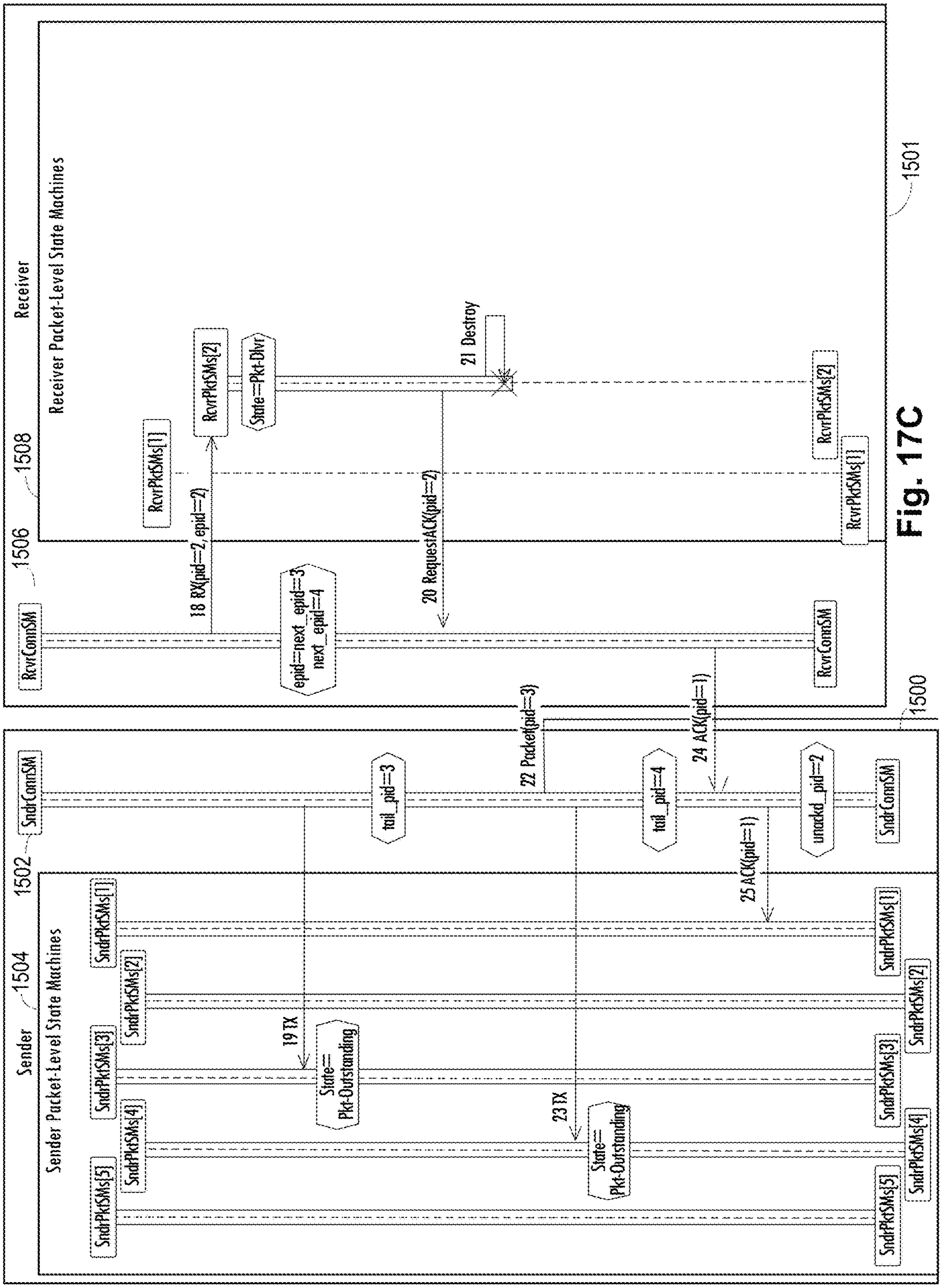

FIGS. 17A to 17G illustrate the state machine operations of FIG. 14 row (d), where packet 3 is delayed, not lost. Again, operations 1 through 21 are the same as in FIGS. 15A and 15B. In FIG. 17C, in operation 22, packet 3 (PID=3) is provided by the sender connection state machine 1502 but delivery is delayed as indicated by the line exiting FIG. 17C. In operation 23, a transmit message is provided from the sender connection state machine 1502 to the sender packet state machine 4. The sender packet state machine 4 enters the packet outstanding state. The sender connection state machine 1502 increments the tail PID value to 4. In operation 24, the ACK response signaling packet for packet 1 is provided from the receiver connection state machine 1506. In operation 25 the sender connection state machine 1502 provides an ACK message for PID of 1 to the sender packet state machine 1. The sender connection state machine 1502 increments the unacknowledged packet ID value to 2.

Figure 17D:
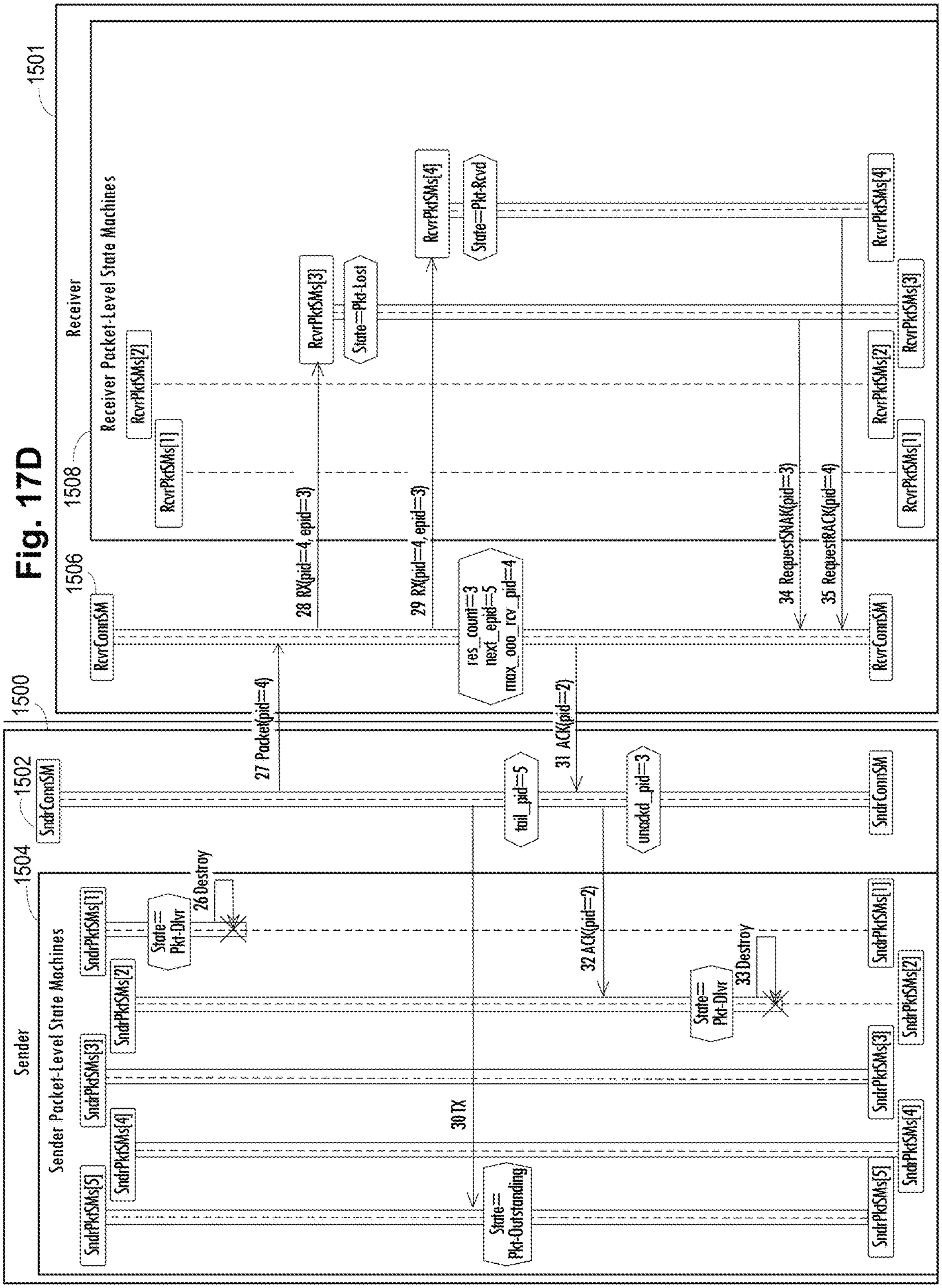

Referring to FIG. 17D, upon receipt of the ACK signaling response for packet 1, the sender packet state machine 1 advances to state packet delivered and in operation 26 terminates. In operation 27, the sender connection state machine 1502 provides packet 4 (PID=4) to the receiver connection state machine 1506. In operation 28, the receiver connection state machine 1506 provides an RX message with the PID value of 4 and expected PID value of 3 to create receiver packet state machine 3, which starts at a packet lost state. In operation 29, an RX message, with PID value of 4 and expected PID value of 3, is provided to the receiver packet level state machines 1508, which causes the creation of receiver packet state machine 4 and its entry into the packet received state.

The res_count value is decremented to 3, the next_epid value is 5 and the max_000_rcv_pid value is 4. In operation 30, the sender connection state machine 1502 provides a transmit message to the sender packet state machine 5, which advances to a state of packet outstanding. The tail_pid value is incremented to 5. In operation 31, the receiver connection state machine 1506 provides the ACK response signaling packet for packet 2 to the sender connection state machine 1502. In operation 32, the sender connection state machine 1502 provides an ACK message with a PID of 2 to the sender connection state machine 2. The sender connection state machine 1502 increments the unacknowledged PID value to 3. Upon receipt of the ACK message, sender packet state machine 2 advances to packet delivered state and in operation 33 ceases operation. In operation 34, the receiver packet state machine 3 provides a request SNAK response signaling indication with the PID value of 3 to the receiver connection state machine 1506. In operation 35, the receiver packet state machine 4 provides a request for a RACK message for packet 4 to the receiver connection state machine 1506.

Figure 17E:
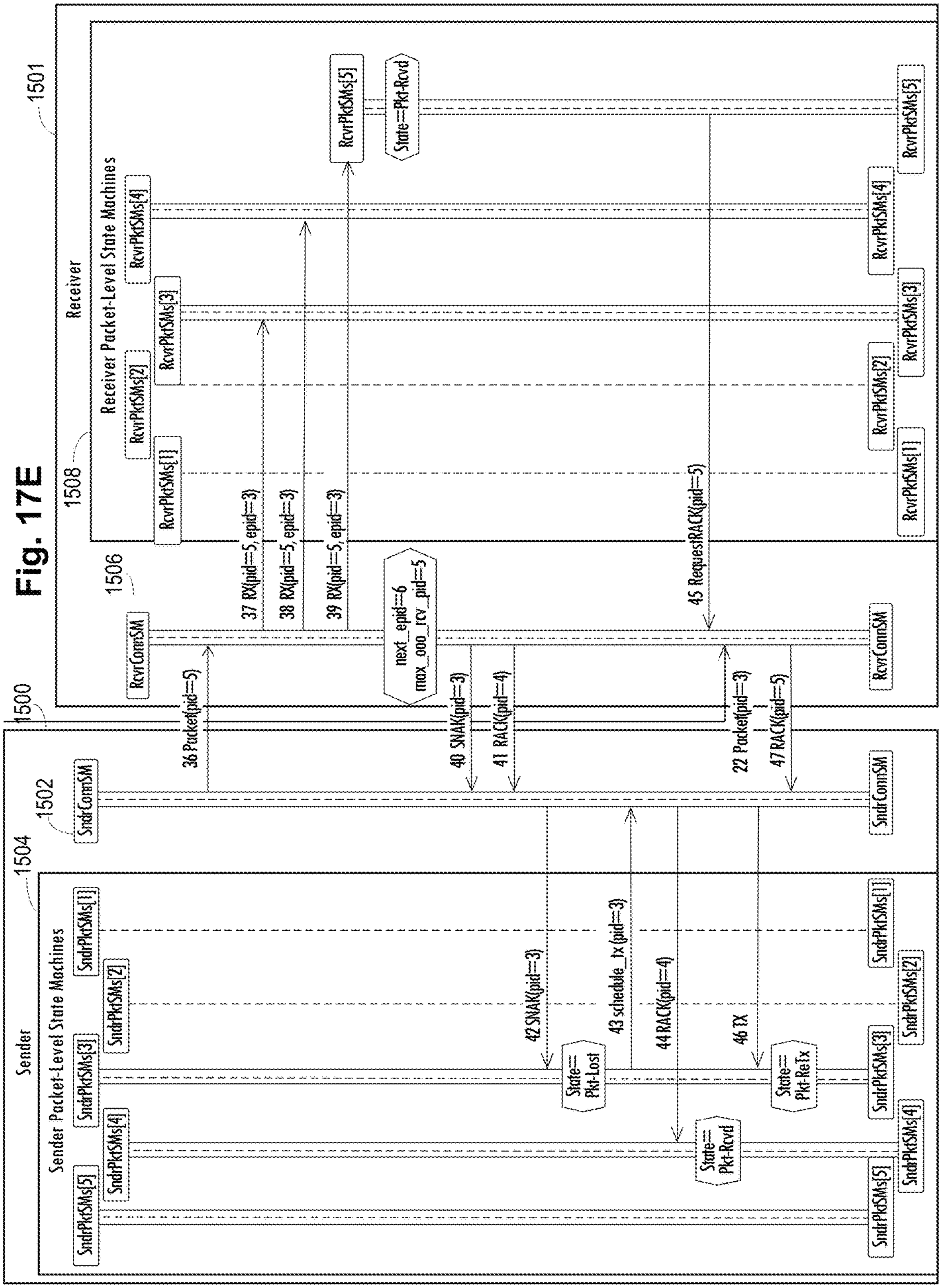

Referring to FIG. 17E, in operation 36, the sender connection state machine 1502 provides packet 5 (PID=5) to the receiver connection state machine 1506. The receiver connection state machine 1506 provides a received packet message with a received PID value of 5 and an epid value of 3 to the receiver packet state machine 3 in operation 37 and in operation 38 to the received packet state machine 4. In operation 39, the receiver connection state machine 1506 provides an RX message with a PID value of 5 and an expected PID value of 3, to cause the creation of the receiver packet state machine 5 in the packet received state. The receiver connection state machine 1506 increments next_epid to 6 and max_000_rcv_pid to 5. In operation 40, the receiver connection state machine 1506 provides the SNAK response signaling packet for packet 3 to the sender connection state machine 1502. In operation 41, the receiver connection state machine 1506 provides the RACK response signaling packet for packet 4 to the sender connection state machine 1502. In operation 42, the sender connection state machine 1502 provides a SNAK message with a PID of 3 to the sender packet state machine 3, which enters a state of packet lost. In operation 43, the sender packet state machine 3 provides a schedule_tx for packet 3 to the sender connection state machine 1502 to cause the retransmission of packet 3. In operation 44, the sender connection state machine 1502 provides a RACK message with PID of 4 to the sender packet state machine 4, which enters a state of packet received. In operation 45, the receiver packet state machine 5 provides a request for a RACK signaling response for packet 5 to the receiver connection state machine 1506. After operation 45, packet 3 of operation 22 is finally received and packet 3 is provided to the receiver connection state machine 1506. In operation 46, the sender connection state machine 1502 provides a transmission of packet 3 indication to sender packet state machine 3, which enters the packet retransmit state. In operation 47, the receiver connection state machine 1506 provides the RACK response signaling packet for packet 5 to the sender connection state machine 1502.

Figure 17F:
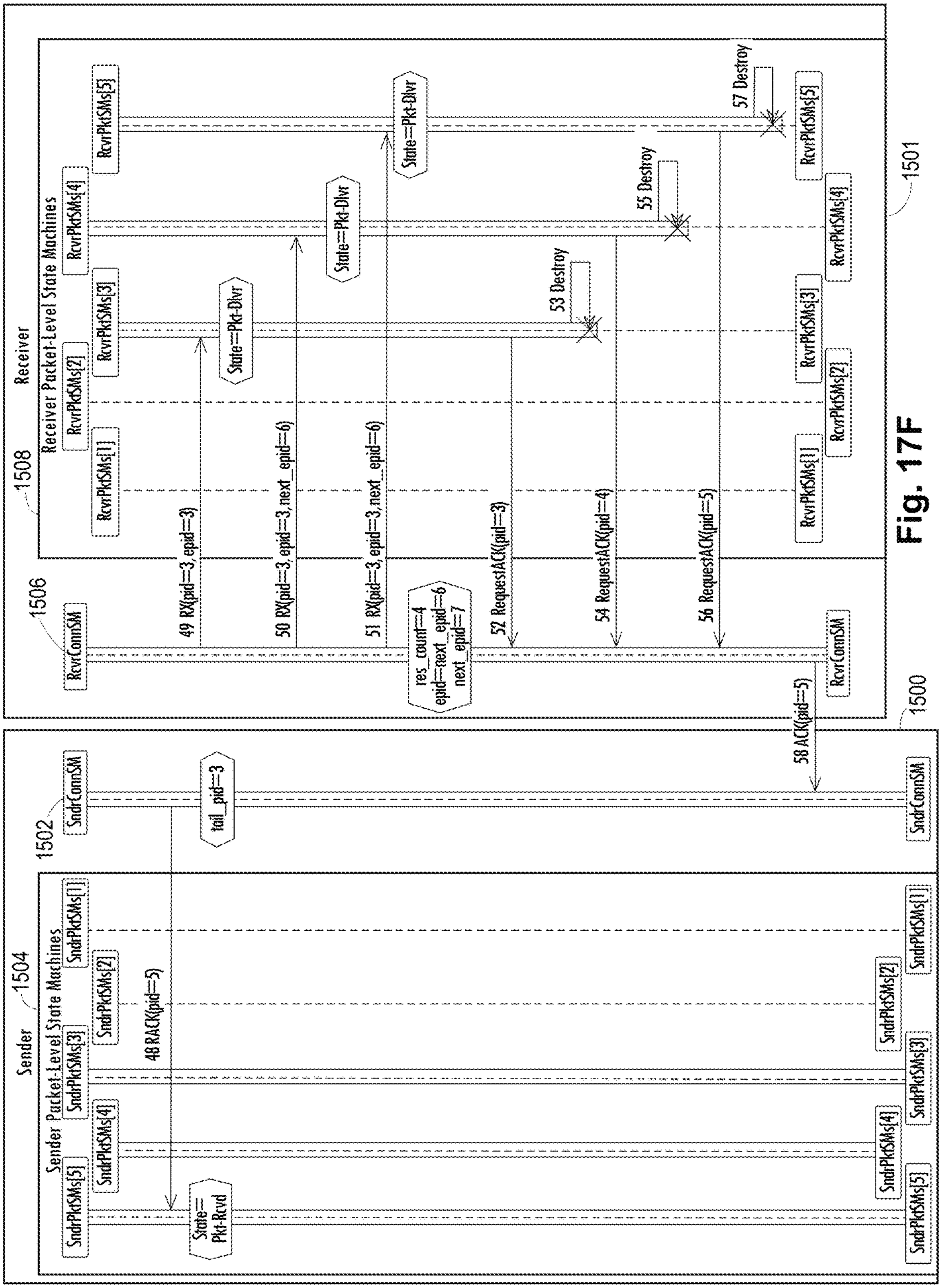

Referring to FIG. 17F, in operation 48, the sender connection state machine 1502 provides a RACK message with a PID of 5 to the sender packet state machine 5, which moves into a state of packet received. The sender connection state machine 1502 updates the tail PID value to 3. In operation 49, the receiver connection state machine 1506 provides a received indication for packet 3, with an expected PID of 3, to the receiver packet state machine 3. Receiver packet state machine 3 advances to packet delivered state. Similarly, in operation 50, the received indication for packet 3, with an expected PID of 6, is provided to the receiver packet state machine 4, which advances to the packet delivered state. In operation 51, the received indication for packet 3, with an expected PID of 6, is provided to the receiver packet state machine 5, which enters a state of packet delivered. The receiver connection state machine 1506 increments the res_count value to 4, indicating all tracking resources are available. The next_epid value is transferred to epid and next_epid increments to 7. In operation 52, the receiver packet state machine 3 provides a request for an ACK response signaling for packet 3 to the receiver connection state machine 1506. In operation 53, the receiver packet state machine 3 stops operation. In operation 54, the receiver packet state machine 4 provides a request for an ACK response signaling for packet 4 to the receiver connection state machine 1506. In operation 55, the receiver packet state machine 4 terminates. in operation 59, the sender connection state machine 1502 provides the retransmitted packet 3 to the receiver connection state machine 1506. In operation 56, the receiver packet state machine 5 provides a request for an ACK response signaling for packet 5 to the receiver connection state machine 1506. In operation 57, the receiver packet state machine 5 completes operation. In operation 58, the receiver connection state machine 1506 provides the ACK response signaling packet for packet 5 to the sender connection state machine 1502, cumulatively acknowledging packets 3, 4 and 5.

Figure 17G:
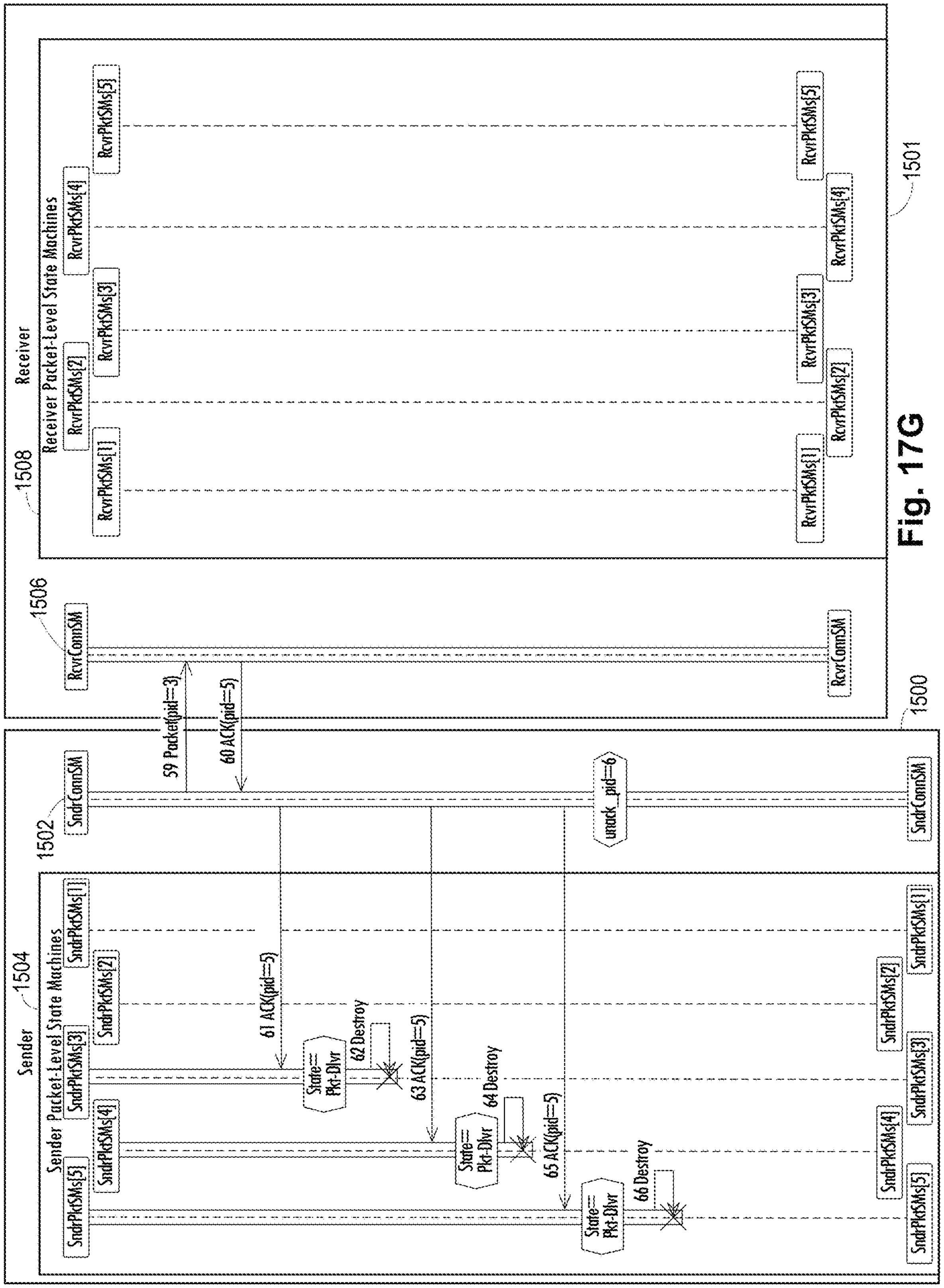

Referring to FIG. 17G, In operation 60, the receiver connection state machine 1506 provides an ACK response for the received retransmitted packet 3, the ACK having a pid value of 5. As the ACK with pid of 5 is a duplicate, the sender connection state machine 1502 would update the unack_pid value to the same 6 but would not duplicate the updates to the sender packet state machines, as the updates are already commenced based on the ACK of operation 58. In operation 61, an ACK message with a PID of 5 is provided from the sender connection state machine 1502 to the sender packet state machine 3, where the state is advanced to packet delivered, and in operation 62 is terminated. In operation 63, an ACK message with a PID of 5 is provided to the sender packet state machine 4, which enters a state of packet delivered and in operation 64 terminates. In operation 65, the sender connection state machine 1502 provides an ACK message with a PID of 5 to the sender packet state machine 5, which enters a state of packet delivered and in operation 66 terminates. The unack_pid value is increased to 6 based on receipt of the ACK of operation 58. This completes the scenario of FIG. 14, row (d).

Referring now to FIGS. 18A to 18H, the operation of the state machines for FIG. 14, row (e), where the receiver 1501 runs out of tracking resources and declares an infinite-hole is illustrated. Operations 1 through 26 are the same as operations 1 to 26 for FIG. 16A to 16D. One change for purpose of the example is that the res_count is set to 1 and res_max value is set to 1, rather than 4 in the previous examples. This is done to limit the tracking resources in the receiver 1501 for the example.

Figure 18A:
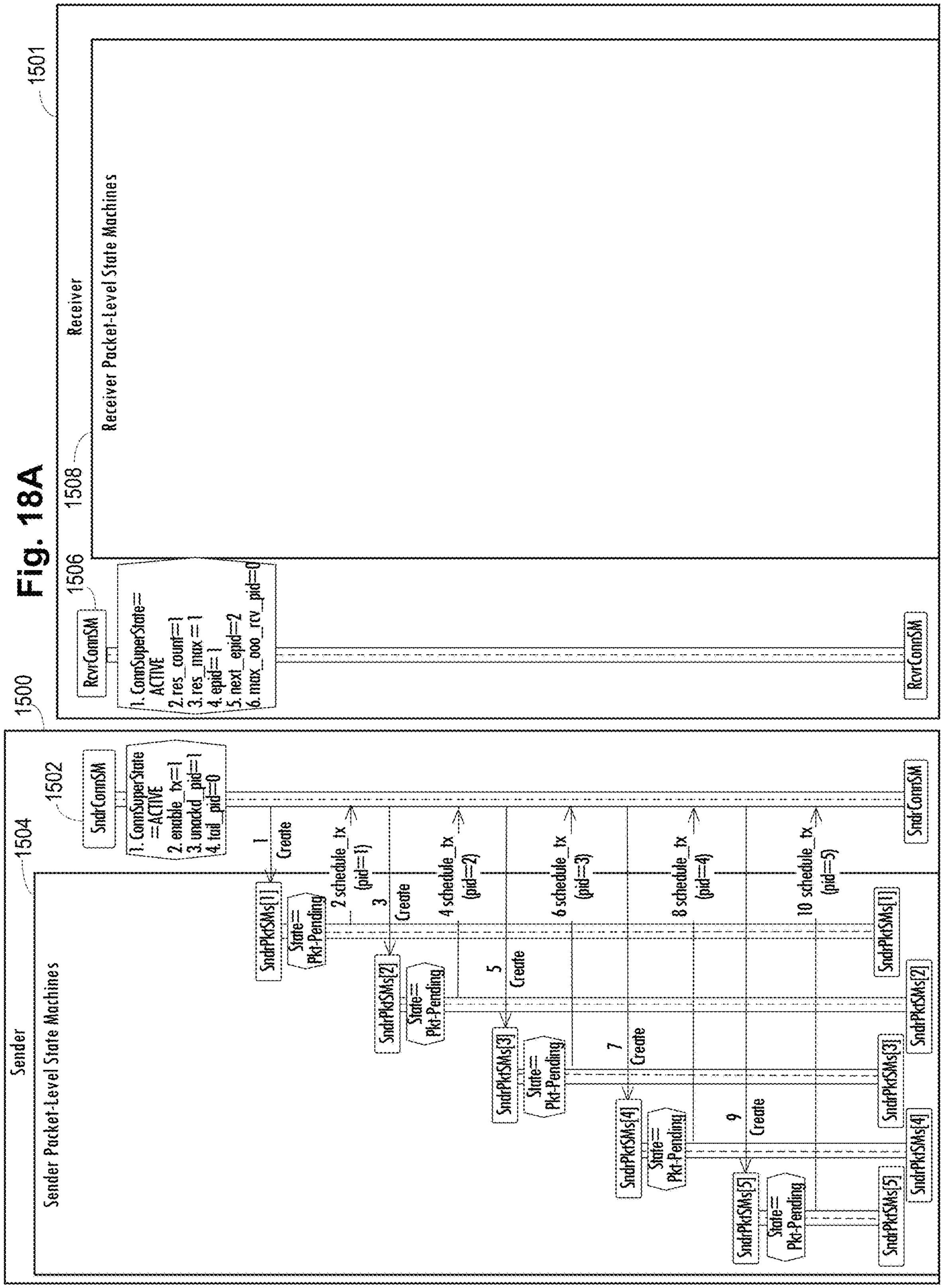
FIGS. 18A-18H illustrate sender and receiver connection-level and packet-level state machine operation for the (e) alternative of reception of packets.
Figure 18B:
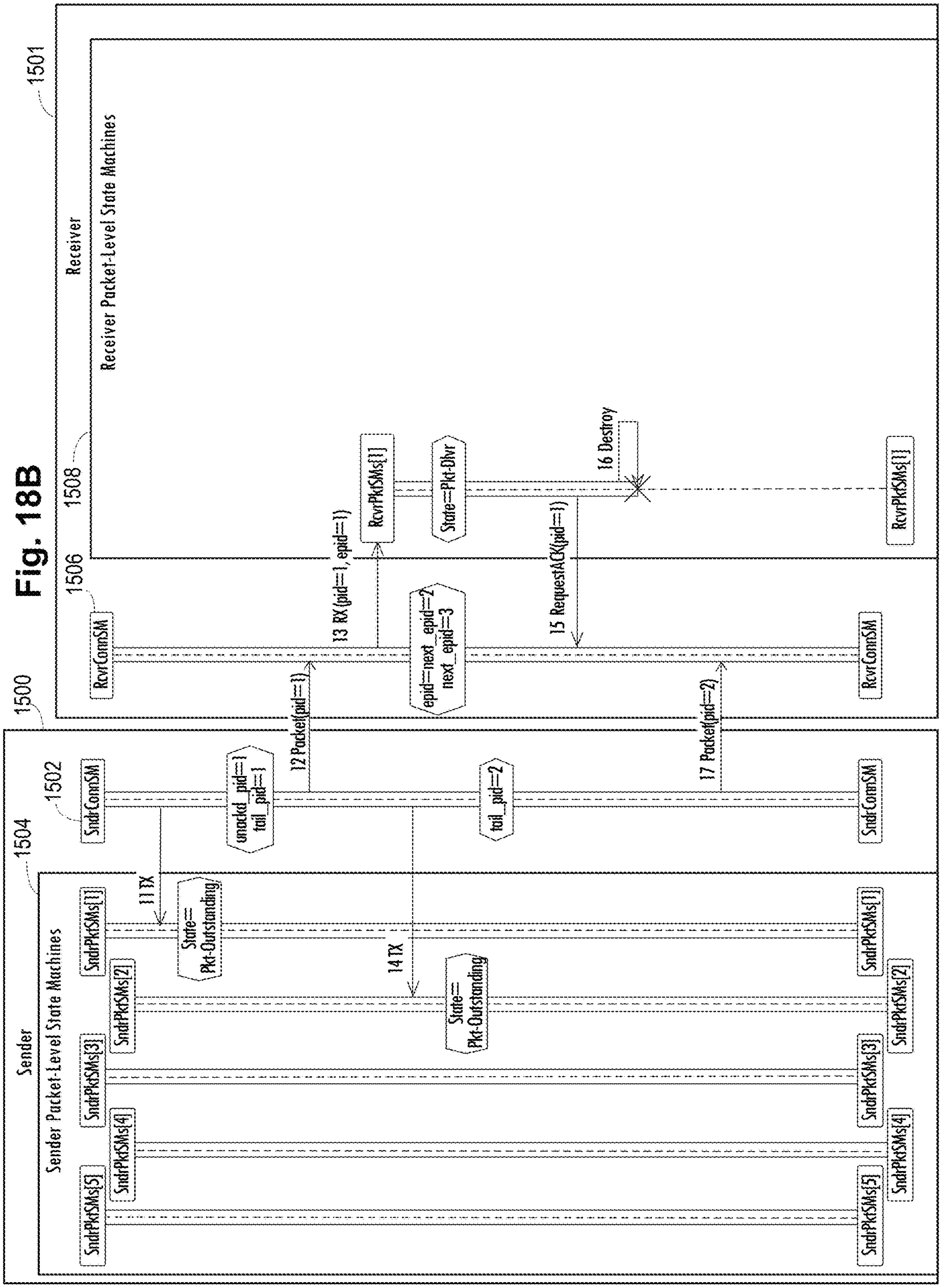
Figure 18C:
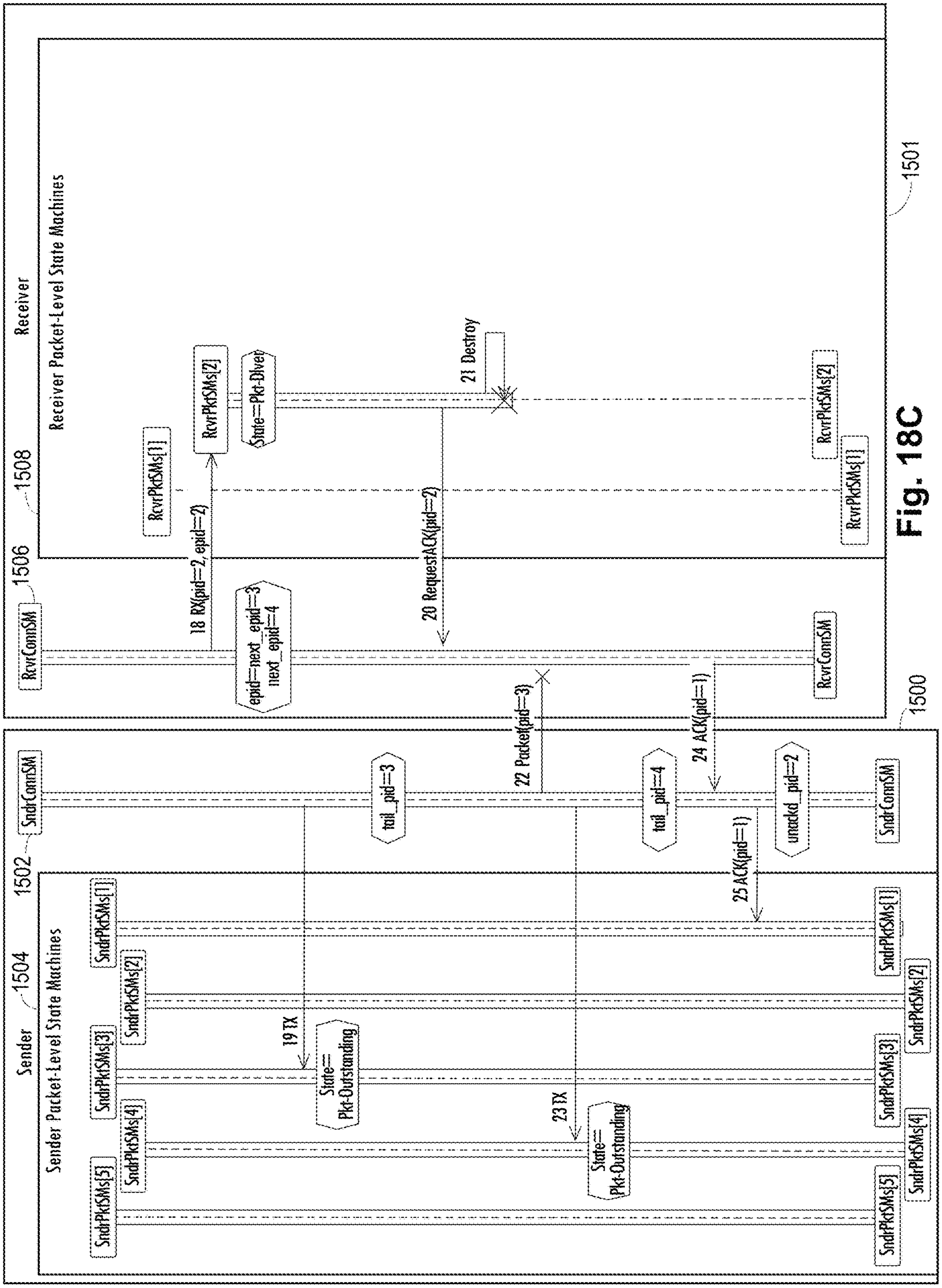
Figure 18D:
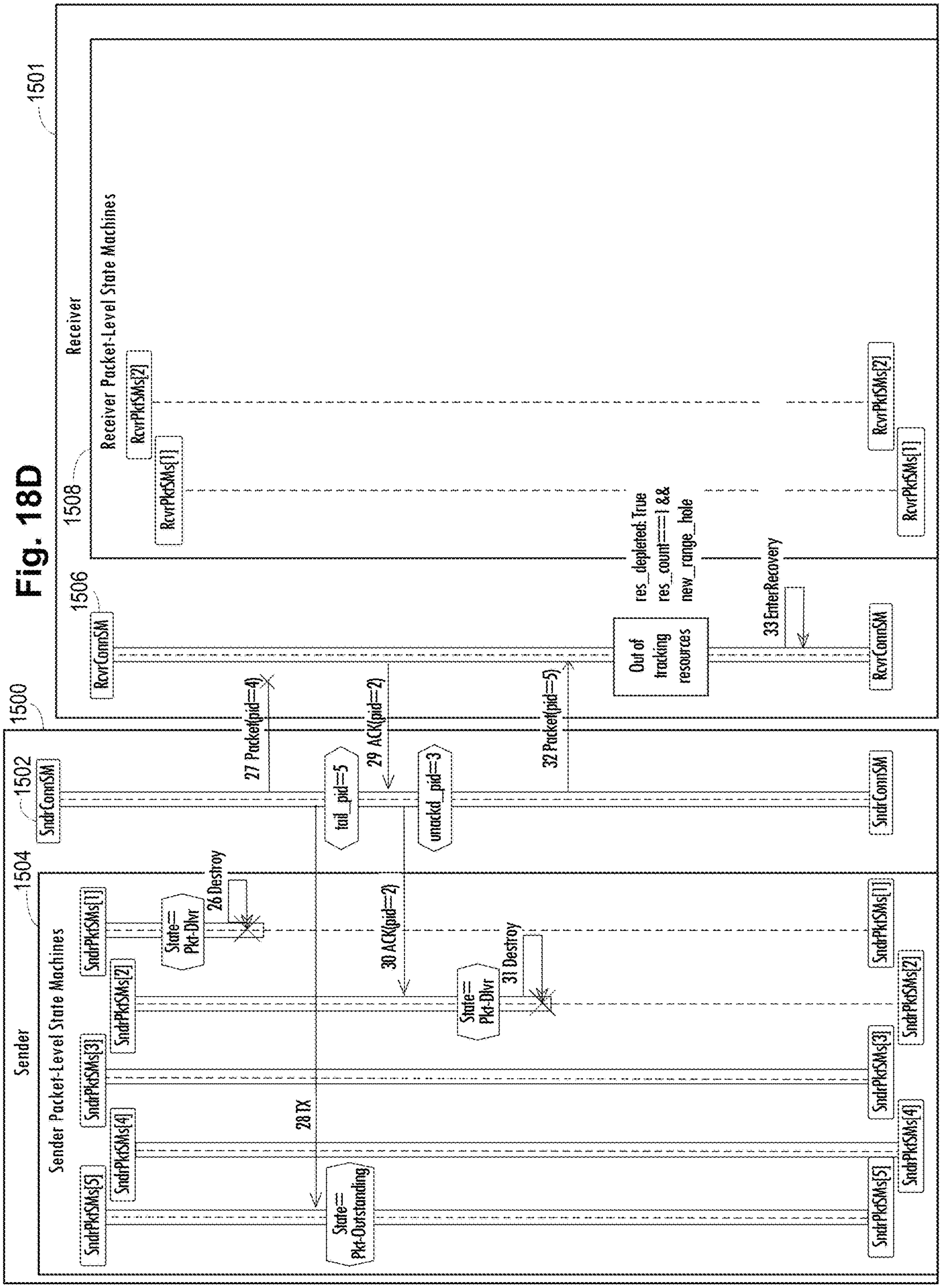

Referring to FIG. 18D, in operation 27, the sender connection state machine 1502 provides packet 4 (PID=4) to the receiver connection state machine 1506. Packet 4 is also lost, creating two lost packets, which creates a range hole. In operation 28, the sender connection state machine 1502 provides a transmit message to sender packet state machine 5, which advances to packet outstanding state. The sender connection state machine 1502 increments the tail PID value to 5. In operation 29, the receiver connection state machine 1506 provides the ACK response signaling packet for packet 2 to the sender connection state machine 1502. An ACK message with a PID of 2 is provided in operation 30 to the sender packet state machine 2. The sender packet state machine 2 advances to the packet delivered state and in operation 31 terminates. After operation 30, the sender connection state machine 1502 increments the unacknowledged PID value to 3. In operation 32, the sender connection state machine 1502 provides packet 5 (PID=5) to the receiver connection state machine 1506. Upon receipt of packet 5, the receiver connection state machine 1506 evaluates the res_depleted variable and determines that the tracking resources are depleted as the res_count value was 1 and a new range hole has been detected. The value of the res_depleted variable being true causes the receiver connection state machine 1506 to transition from ACTIVE superstate to RECOVERY superstate as shown in FIG. 9A, without evaluating any of the do statements present in the ACTIVE state machine. This transition is indicated at operation 33, the entry into RECOVERY state.

Figure 18E:
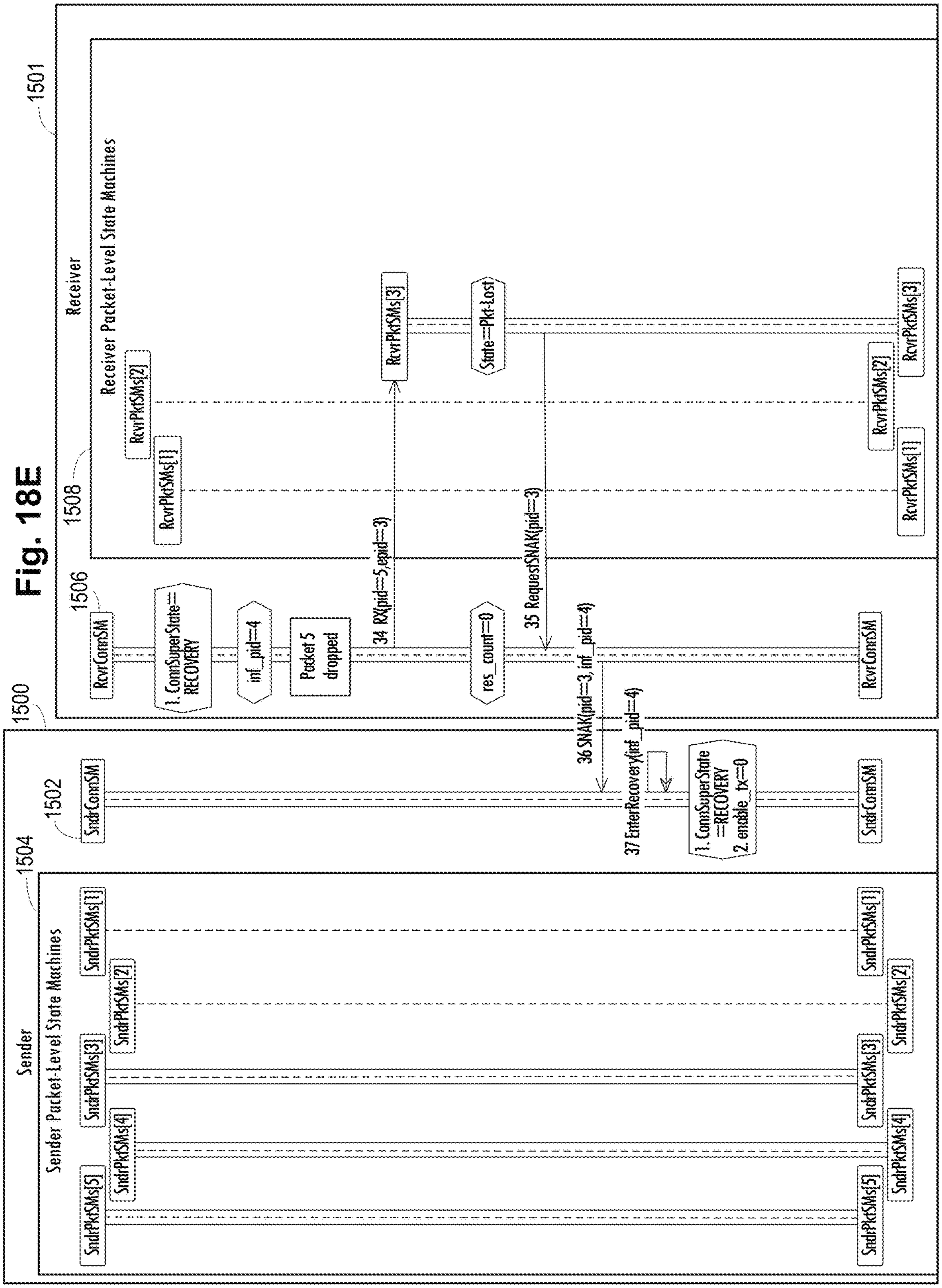

Referring to FIG. 18E, the receiver connection state machine 1506 is in RECOVERY superstate. The inf pid value is 4, based on the evaluation as shown in FIG. 9C, specifically the step 902 to step 904 to step 906 to step 912 to step 914 path. The receiver connection state machine 1506 drops packet 5, as packet 5 falls into the infinite-hole and will be retransmitted once the recovery process completes. This is a simplified illustration. The receiver connection state machine 1506 provides RX messages for receiver packet state machines 3, 4 and 5 based on the do-first: RX(pid≥epid)→update(PktStateMachines[p≥epid], RX) statement in the RECOVERY superstate state machine of FIG. 9A. However, receiver packet state machines are not created for packets 4 and 5. A receiver packet state machine 4 is not created as no condition of FIG. 7B applies for packet 4. The inf_pif value is 4, so the condition for Pkt-Lost state is not met as the term p<inf_pid is not true. The condition for Pkt-Rcvd state is not met as the term pid<inf_pid is not true. The condition for Pkt-Dlver is not met as p+pid==epid is not true. The receiver packet state machine 5 is not created for the same reasons. Because packet 5 has been received, but no state machine 5 is created, the packet is dropped.

In operation 34, the receiver connection state machine 1506 provides an RX message with a pid value of 5 and an epid of 3 to create receiver packet state machine 3, in a state of Pkt_Lost. The receiver packet state machine 3 is created because the condition RX(pid>p) and p<inf_pid is true. The receiver connection state machine 1506 reduces the res_count value to 0. In operation 35, the receiver packet state machine 3 provides a SNAK request message with a pid of 3 to the receiver connection state machine 1506. The receiver connection state machine 1506 will have determined the need to send a SNAK infinite-hole signaling packet based on the do: RX(pid)→SNAK(inf_pid; inf_hole) statement but has held sending the infinite-hole indication, waiting on the SNAK for packet 3. The receiver connection state machine 1506 combines the requested SNAK for the pid of 3 with the infinite-hole SNAK and in operation 36 provides a SNAK signaling packet with a pid value of 3 and with infinite-hole indication of inf_pid value 4 to the sender connection state machine 1502. The sender connection state machine 1502 detects the infinite-hole SNAK signaling packet and in operation 37 enters RECOVERY superstate, with an inf_pid value of 4. The sender connection state machine 1502 sets the enable_tx value to 0 to stop transmission of any not previously transmitted packets.

Figure 18F:
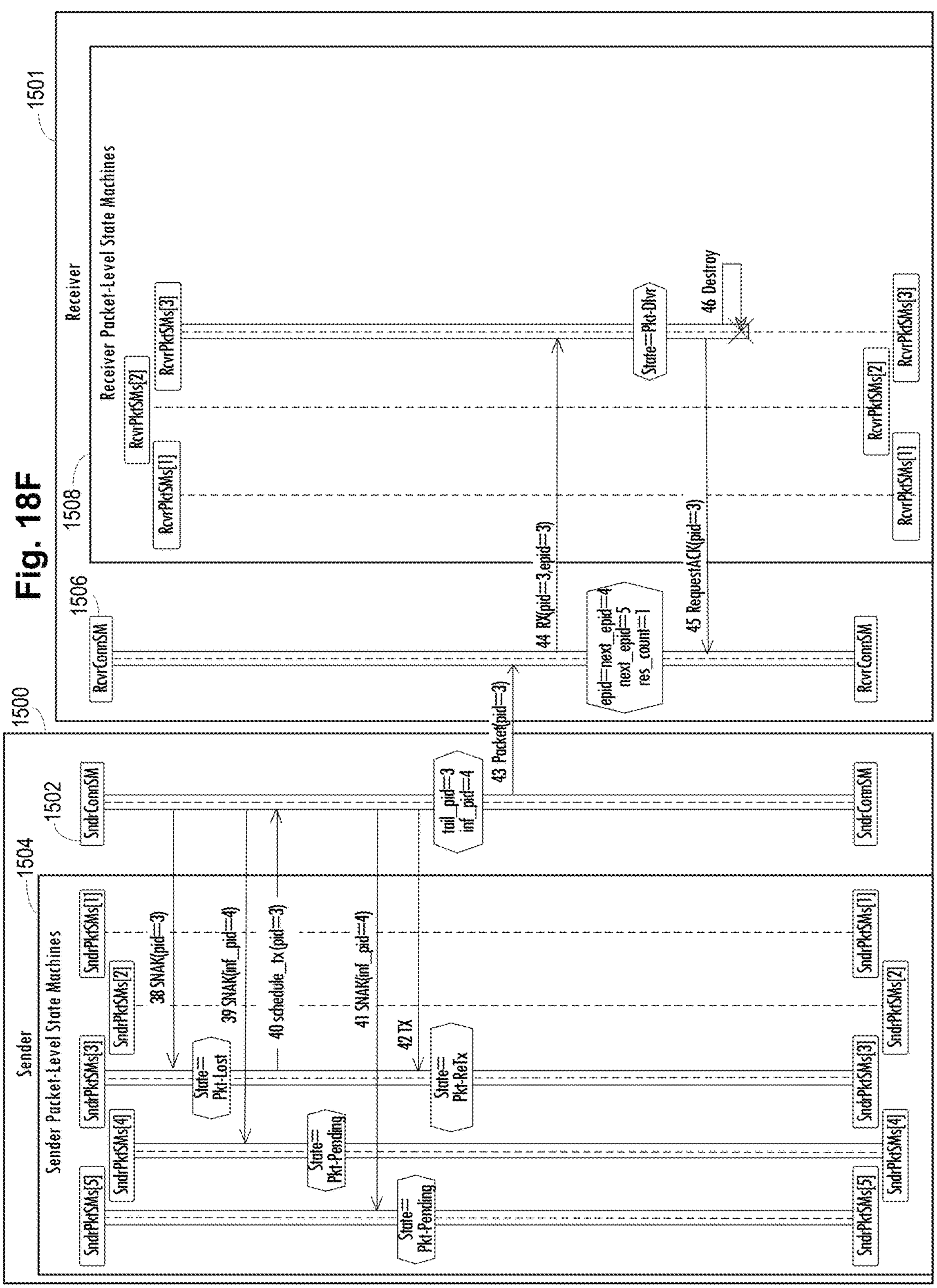

Referring to FIG. 18F, the sender connection state machine 1502 uses the do: SNAK(inf_pid)→{update(PktStateMachines[p≥inf_pid], SNAK); set(tail_pid, inf_pid−1)} statement in the RECOVERY state machine of FIG. 8A to provide infinite-hole messages to sender packet state machines 3, 4 and 5. In operation 38, the sender connection state machine 1502 provides a SNAK message with a pid of 3 to sender packet state machine 3 to cause the state machine to advance the state to Pkt-Lost based on the SNAK(pid=p) condition of FIG. 6B. In operation 39, the sender connection state machine 1502 provides the SNAK message with inf_pid of 4 to sender packet state machine 4 to return the state machine to packet pending based on the SNAK(inf_pid≤p; inf hole) condition. In operation 40, sender packet state machine 3 provides a schedule_tx message with a PID value of 3 to the sender connection state machine 1502, to cause packet 3 to be retransmitted. In operation 41, the sender connection state machine 1502 provides the SNAK message with inf_pid of 4 to the sender packet state machine 5 to return it to state of packet pending. In operation 42, the sender connection state machine 1502 provides a transmit indication to the sender packet state machine 3, which advances to packet retransmission state. The sender connection state machine 1502 sets the tail_pid value to 3 and inf_pid to 4. In operation 43, the sender connection state machine 1502 provides packet 3 (PID=3) to the receiver connection state machine 1506. In operation 44, the receiver connection state machine 1506 provides an RX message, with a PID value of 3 and an expected PID value of 3, to the received packet state machine 3, which advances to the packet delivered state. The receiver connection state machine 1506 sets the epid value to 4 and the next_epid value to 5. The value of res_count is increased to 1 based on the received packet 3. In operation 45, the receiver packet state machine 3 provides an ACK request message for packet 3 to receiver connection state machine 1506. In operation 46, the receiver packet state machine 3 terminates operation.

Figure 18G:
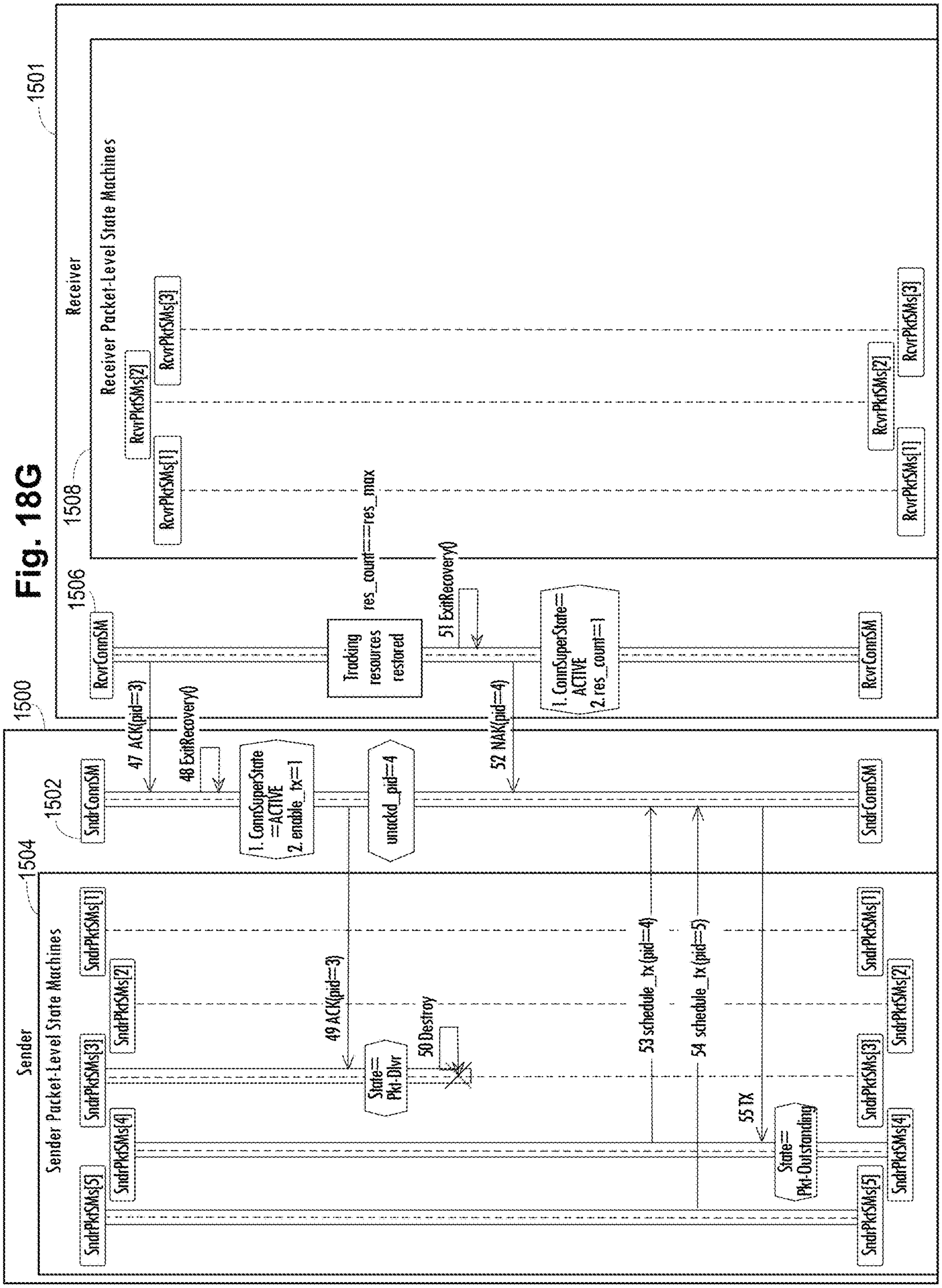

Referring to FIG. 18G, in operation 47, the receiver connection state machine 1506 provides an ACK signaling message with a PID value of 3 to the sender connection state machine 1502. The sender connection state machine 1502 determines that this is an ACK signaling message with a pid value of inf_pid minus 1 (ACK(inf_pid−1)). This is an optional condition of returning to ACTIVE superstate, along with a NAK signaling packet with a pid value of inf pid. In operation 48, the sender connection state machine 1502 exits RECOVERY superstate and then sets enable_tx to 1 to allow new packet transmission. In operation 49, the sender connection state machine 1502 provides an ACK message with a PID value of 3 to sender packet state machine 3. Sender packet state machine 3 advances to state Pkt-Dlvr and in operation 50 ceases operation. The unackd_pid value is increased to 4.

At this time, the receiver connection state machine 1506 determines that res_count equals to res_max and the tracking resources are again available. In operation 51, the receiver connection state machine 1506 exits RECOVERY superstate and returns to ACTIVE superset. On exiting the RECOVERY superstate, in operation 52 the receiver connection state machine 1506 provides a NAK signaling packet with a pid value of 4, which is the inf_pid value, to inform the sender connection state machine of the return to ACTIVE superstate. As the sender connection state machine 1502 has already entered ACTIVE superstate, the NAK is essentially ignored. If the optional return to ACTIVE susperstate on ACK(inf_pid−1) is not implemented, this receipt of the NAK(inf_pid), NAK(pid=4) in this example, triggers the transition to ACTIVE superstate, with the sender connection state machine 1502 actions described occurring at this time, so that the ACK message to sender packet state machine 3 is just slightly later. The return to ACTIVE superstate causes the sender packet state machines 4 and 5 to provide schedule_tx messages, with PID values of 4 and 5, respectively, in operations 53 and 54. The schedule_tx( ) operation occurs because the transition from the RECOVERY superstate to the ACTIVE superstate is an entry into the existing state of the state machine. As sender packet state machines 4 and 5 were in the Pkt-Pending state, reentering that state triggers the schedule_tx entry operation. In operation 55, the sender connection state machine 1502 provides a TX message to sender packet state machine 4 to indicate that packet 4 is being transmitted. Sender packet state machine 4 advances to Pkt-Outstanding state.

Figure 18H:
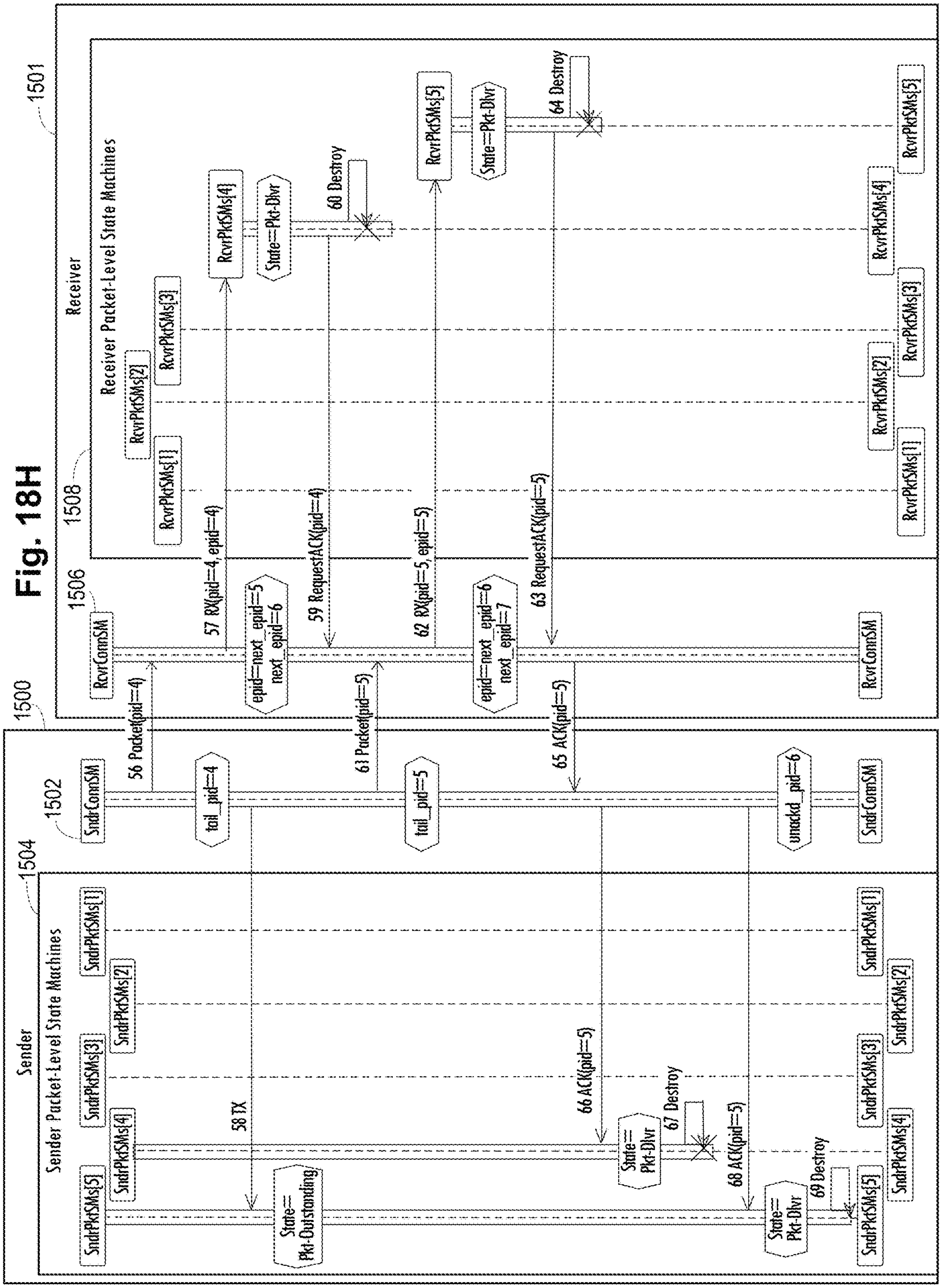

Referring to FIG. 18H, in operation 56 packet 4 is provided to receiver connection state machine 1506 and the sender connection state machine 1502 increases the tail_pid value to 4. In operation 57, the receiver connection state machine 1506 provides an RX message, with a PID value of 4 and an expected PID value of 4, to create the receiver packet state machine 4, which starts in packet delivered state. The receiver connection state machine 1506 increments the expected packet ID value to 5 and the next_epid value to 6. In operation 58, the sender connection state machine 1502 provides a TX message to sender packet state machine 5 to cause the sender packet state machine 5 to advance to state Pkt-Outstanding state. In operation 59, the receiver packet state machine 4 provides an ACK request message for packet 4 to receiver connection state machine 1506. In operation 60, the receiver packet state machine 4 terminates. In operation 61, the sender connection state machine 1502 provides the PID-5 packet to the receiver connection state machine 1506 and then advances the tail_pid value to 5. In operation 62, the receiver connection state machine 1506 provides an RX message with a pid value of 5 and an epid value 5, which causes the creation of receiver packet state machine 5 in the Pkt-Dlver state. The receiver connection state machine 1506 increments the expected packet ID value to 6 and next_epid value to 7. In operation 63, the receiver packet state machine 5 provides an ACK request message with a PID of 5 to the receiver connection state machine 1506 and in operation 64 terminates. In operation 65, the receiver connection state machine 1506 provides an ACK signaling packet for packet 5 to the sender connection state machine 1502, acknowledging packets 4 and 5. In operation 66, the sender connection state machine 1502 provides an ACK message with a PID of 5 to the sender packet state machine 4, which enters packet delivered state. In operation 68, the sender state packet machine 4 terminates. In operation 68, the sender connection state machine 1502 forwards an ACK message for PID of 5 to the sender packet state machine 5, which advances to the packet delivered state. The sender connection state machine 1502 increases the unackd_pid value to 6. In operation 69, the sender packet state machine 5 terminates. This completes transmission of FIG. 14, row (e), including the entry into recovery state and return to active state for the sender connection state machine 1502 and receiver connection state machine 1506.

By using state machines with states and superstates, with certain functions changing between superstates, the operation in two different modes is simplified. In the illustrated examples, the use of RECOVERY and ACTIVE superstates allows recovery from an out of resources condition to be accelerated without the need for additional reliability signaling or hardware.

While the above examples have focused on SEND, RDMA READ, RDMA WRITE and ATOMIC operations, inclusion of similar packet headers, repurposing of existing header fields, state machine operations and the like apply to other RDMA operations not specifically described, so that the full range of RDMA operations will function under the described approach.

The above description is intended to be illustrative, and not restrictive. For example, the above-described examples may be used in combination with each other. Many other examples will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A remote direct memory access (RDMA) network interface controller (NIC) for connection to a network to communicate with a remote RDMA NIC by providing request messages and response messages to the remote RDMA NIC, the RDMA NIC comprising:

a network interface for connection to the network;

an RDMA NIC processor coupled to the network interface;

RDMA header processing logic which builds RDMA packet headers to include values identifying individual packets in request packet flows and response packet flows so that request message packets can be interleaved with response message packets on a packet basis without ambiguity and allowing packet reliability operations;

RDMA NIC memory coupled to the RDMA NIC processor, the RDMA header processing logic and the network interface; and RDMA NIC non-transitory storage for programs to execute from the RDMA NIC memory on the RDMA NIC processor.

2. The RDMA NIC of claim 1, wherein the RDMA header processing logic builds RDMA packet headers to include an added header and repurposes the packet sequence number (PSN) field of the base transport header (BTH) header so that one of the added header and the repurposed PSN field provides a message number and the other of the added header and the repurposed PSN field provides an intra message packet number, the message number incrementing with each new message and staying the same for each packet in the message and the intra message packet number incrementing for each packet in the message.

3. The RDMA NIC of claim 2, wherein the RDMA NIC non-transitory storage includes a RDMA NIC reliability protocol program; and wherein the RDMA NIC reliability protocol program is configured to determine holes in a received stream of packets by examining the added header and the repurposed PSN field in the received packets.

4. The RDMA NIC of claim 1, wherein the RDMA header processing logic which builds RDMA packet headers so that request messages use a first sequence of packet sequence number (PSNs) and response messages utilize a second, different sequence of PSNs, the first sequence of PSNs increasing with each packet in a request message and the second sequence of PSNs increasing with each packet in a response message.

5. The RDMA NIC of claim 4, wherein the RDMA NIC non-transitory storage includes a RDMA NIC reliability protocol program; and wherein the RDMA NIC reliability protocol program is configured to determine holes in a received stream of packets by examining the first sequence of PSNs and the second sequence of PSNs.

6. A computer system comprising:

a computer including:

a computer processor;

a memory controller coupled to the computer processor;

computer memory coupled to the computer processor and the memory controller;

a computer peripheral device interface coupled to the computer processor and to the computer memory; and computer non-transitory storage for programs to execute from computer memory on the computer processor; and a remote direct memory access (RDMA) network interface controller (NIC) for connection to an Ethernet network to communicate with a remote RDMA NIC by providing request messages and response messages to the remote RDMA NIC, the RDMA NIC including:

an RDMA NIC peripheral device interface for connection to the computer;

a network interface for connection to the network;

an RDMA NIC processor coupled to the network interface;

RDMA header processing logic which builds RDMA packet headers to include values identifying individual packets in request packet flows and response packet flows so that request message packets can be interleaved with response message packets on a packet basis without ambiguity and allowing packet reliability operations;

RDMA NIC memory coupled to the RDMA NIC processor, the RDMA header processing logic and the network interface, the RDMA NIC memory; and RDMA NIC non-transitory storage for programs to execute from the RDMA NIC memory on the RDMA NIC processor.

7. The computer system of claim 6, wherein the RDMA header processing logic builds RDMA packet headers to include an added header and repurposes the packet sequence number (PSN) field of the base transport header (BTH) header so that one of the added header and the repurposed PSN field provides a message number and the other of the added header and the repurposed PSN field provides an intra message packet number, the message number incrementing with each new message and staying the same for each packet in the message and the intra message packet number incrementing for each packet in the message.

8. The computer system of claim 7, wherein the RDMA NIC non-transitory storage includes a RDMA NIC reliability protocol program; and wherein the RDMA NIC reliability protocol program is configured to determine holes in a received stream of packets by examining the added header and the repurposed PSN field in the received packets.

9. The computer system of claim 6, wherein the RDMA header processing logic which builds RDMA packet headers so that request messages use a first sequence of packet sequence number (PSNs) and response messages utilize a second, different sequence of PSNs, the first sequence of PSNs increasing with each packet in a request message and the second sequence of PSNs increasing with each packet in a response message.

10. The computer system of claim 9, wherein the RDMA NIC non-transitory storage includes a RDMA NIC reliability protocol program; and wherein the RDMA NIC reliability protocol program is configured to determine holes in a received stream of packets by examining the first sequence of PSNs and the second sequence of PSNs.

11. A method of operating a remote direct memory access (RDMA) network interface controller (NIC) for connection to a lossy Ethernet network to communicate with a remote RDMA NIC by providing request messages and response messages to the remote RDMA NIC, the RDMA NIC comprising:

a network interface for connection to the network;

an RDMA NIC processor coupled to the network interface;

RDMA header processing logic which builds RDMA packet headers;

RDMA NIC memory coupled to the RDMA NIC processor, the RDMA header processing logic and the network interface; and RDMA NIC non-transitory storage for programs to execute from the RDMA NIC memory on the RDMA NIC processor, the method comprising:

including values in the RDMA packet headers identifying individual packets in request packet flows and response packet flows so that request message packets can be interleaved with response message packets on a packet basis without ambiguity and allowing packet reliability operations.

12. The method of claim 11, further comprising building RDMA packet headers to include an added header and repurposes the packet sequence number (PSN) field of the base transport header (BTH) header so that one of the added header and the repurposed PSN field provides a message number and the other of the added header and the repurposed PSN field provides an intra message packet number, the message number incrementing with each new message and staying the same for each packet in the message and the intra message packet number incrementing for each packet in the message.

13. The method of claim 12, wherein the RDMA NIC non-transitory storage includes a RDMA NIC reliability protocol program; and the method further comprising determining holes in a received stream of packets by examining the added header and the repurposed PSN field in the received packets.

14. The method of claim 11, further comprising building RDMA packet headers so that request messages use a first sequence of packet sequence number (PSNs) and response messages utilize a second, different sequence of PSNs, the first sequence of PSNs increasing with each packet in a request message and the second sequence of PSNs increasing with each packet in a response message.

15. The method of claim 14, wherein the RDMA NIC non-transitory storage includes a RDMA NIC reliability protocol program, and the method further comprising determining holes in a received stream of packets by examining the first sequence of PSNs and the second sequence of PSNs.

* * * * *